US007515211B2

(12) United States Patent (10) Patent No.: US 7,515,211 B2
Asamura et al. (45) Date of Patent: Apr. 7, 2009

(54) VIDEO SIGNAL PROCESSING CIRCUIT, VIDEO SIGNAL DISPLAY APPARATUS, AND VIDEO SIGNAL RECORDING APPARATUS

(75) Inventors: Masako Asamura, Tokyo (JP); Yoshito Suzuki, Tokyo (JP); Toshihiro Gai, Tokyo (JP); Koji Minami, Tokyo (JP); Masaki Yamakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 491 days.

(21) Appl. No.: 10/568,598

(22) PCT Filed: Aug. 25, 2004

(86) PCT No.: PCT/JP2004/012178

§ 371 (c)(1),
(2), (4) Date: Feb. 17, 2006

(87) PCT Pub. No.: WO2005/022928

PCT Pub. Date: Mar. 10, 2005

(65) Prior Publication Data

US 2006/0290818 A1 Dec. 28, 2006

(30) Foreign Application Priority Data

Aug. 29, 2003 (JP) .............................. 2003-305998

(51) Int. Cl.
*H04N 9/77* (2006.01)
*H04N 9/45* (2006.01)
(52) U.S. Cl. ..................... 348/663; 348/505; 348/549; 348/539
(58) Field of Classification Search ................. 348/665, 348/505, 506–509, 536, 537, 549, 663, 666, 348/539
See application file for complete search history.

(56) References Cited

U.S. PATENT DOCUMENTS

| 4,443,821 A | 4/1984 | Kato et al. |
| 5,220,413 A | 6/1993 | Jeong et al. |
| 5,243,412 A * | 9/1993 | Goukura et al. ............. 348/505 |
| 5,523,798 A | 6/1996 | Hagino et al. |

(Continued)

FOREIGN PATENT DOCUMENTS

JP 5-37953 A 2/1993

(Continued)

*Primary Examiner*—M. Lee
(74) *Attorney, Agent, or Firm*—Birch, Stewart, Kolasch & Birch, LLP

(57) ABSTRACT

A video signal processing circuit that uses a prescribed clock signal to process a digitized composite video signal. A clock generating means (2) generates the prescribed clock signal; a burst phase detecting means (3) detects color subcarrier phase information (p) in each line of the composite video signal; a phase difference calculation means (4) finds the phase difference between phase information (p) from the burst phase detecting means and a prescribed reference phase; a sampling phase conversion means (8) corrects the sampling phase of the composite video signal according to phase corrections (Δb, Δt) obtained from the phase difference calculation means (4); a Y/C separation means (9) separates the luminance and chrominance signals from the composite video signal output from the sampling phase conversion means (8). Excellent two- or three-dimensional Y/C separation can be obtained regardless of the television broadcast system, even from a non-standard signal.

24 Claims, 38 Drawing Sheets

U.S. PATENT DOCUMENTS

2003/0007101 A1    1/2003    Kumazawa

FOREIGN PATENT DOCUMENTS

| | | |
|---|---|---|
| JP | 6-335020 A | 12/1994 |
| JP | 7-131819 A | 5/1995 |
| JP | 8-149495 A | 6/1996 |
| JP | 11-298914 A | 10/1999 |
| JP | 11-355799 A | 12/1999 |
| JP | 2000-312365 A | 11/2000 |
| JP | 2001-112016 A | 4/2001 |
| JP | 2002-64840 A | 2/2002 |
| JP | 2002-218492 A | 8/2002 |
| JP | 2002-315018 A | 10/2002 |
| JP | 2003-18614 A | 1/2003 |
| JP | 2003-92766 A | 3/2003 |
| JP | 2004-7247 A | 1/2004 |
| JP | 2004-7278 A | 1/2004 |
| JP | 2004-140581 A | 5/2004 |
| JP | 2005-252688 A | 9/2005 |

* cited by examiner

VIDEO SIGNAL PROCESSING CIRCUIT, VIDEO SIGNAL DISPLAY APPARATUS, AND VIDEO SIGNAL RECORDING APPARATUS

FIELD OF THE INVENTION

The present invention relates to the processing of a received composite video signal to separate the luminance and chrominance signals (Y/C separation), more particularly to video signal processing that converts the sampling phase of the composite video signal.

BACKGROUND ART

There are various standard analog color television (TV) broadcast systems, including the National Television System Committee (NTSC) system used in the United States and Japan, the Phase Alternation by Line (PAL) system used mainly in western Europe, and the Sequential Coleur avec Memoire (SECAM) system used in France and elsewhere. Due to the spread of video tape recorders (VTRs) and video games, non-standard video signals other than the signals (standard signals) used in the above standard television broadcast systems can also be found. In recent years, video signal processing devices that perform digital signal processing of standard and non-standard video signals used in several different types of television broadcast systems have been developed.

In such digital video signal processing, the analog video signal is converted to a digital signal (A/D conversion) by use of a prescribed sampling clock, and then converted from a composite signal to a luminance signal (Y signal) and a chrominance signal (C signal) by a process referred to as Y/C separation.

Conventional video signal processing circuits perform Y/C separation by generating a burst locked clock based on the color subcarrier frequency (fsc) of a burst signal imposed on the blanking interval of the composite signal (as a reference signal for the chrominance signal phase and amplitude; see, for example, Patent Document No. 1).

To support multiple television broadcast systems, another type of video signal processing circuit performs Y/C separation by converting a composite video signal that has been sampled on a single common free run clock to sampling data with a frequency four times that of the burst locked color subcarrier frequency (hereinafter, 4fsc; see, for example, Patent Documents No. 2 and No. 3).

A general method of Y/C separation uses a horizontal frequency separation filter based on the frequency band of the chrominance signal (hereinafter, one-dimensional Y/C separation). In the NTSC system, two-dimensional Y/C separation and three-dimensional Y/C separation can provide higher picture quality: two-dimensional separation uses a line comb filter, exploiting the fact that the phase of the color subcarrier is inverted on alternate horizontal scanning lines (see, for example, Patent Document No. 4); three-dimensional Y/C separation uses a frame comb filter, exploiting the fact that the color subcarrier phase of the same horizontal scanning line is inverted in alternate frames (see, for example, Patent Document No. 5).

Two-dimensional or three-dimensional Y/C separation is based on the correlation between lines or frames (line-to-line or frame-to-frame color subcarrier phase relationship). The Y/C separation process uses, for example, the property of the standard NTSC signal that the color subcarrier phase inverts (the phase changes by 180°) at the horizontal period (the line-to-line period) or the frame period.

In a number of television broadcast systems the burst locked line-to-line or frame-to-frame phase relationship differs from the relationship in the NTSC system: in the NTSC-4.43 system and PAL system, for example, the phase of the video signal does not invert; in the non-standard signals used in VTRs and video games, the line-to-line phase relationship decays and the phase does not always invert by 180°. If the line-to-line difference in the color subcarrier phase is not exactly 180°, two-dimensional or three-dimensional Y/C separation cannot separate the luminance and chrominance signals accurately. The reduced accuracy results in dot crawl and other picture quality problems.

Since two-dimensional Y/C separation or three-dimensional Y/C separation cannot always be applied to the composite signals of those television broadcast systems that lack the above color subcarrier phase relationship, or to non-standard signals in which the color subcarrier phase becomes displaced, one-dimensional Y/C separation or two-dimensional Y/C separation is performed selectively, according to the standard or non-standard signal of each television broadcast system (see, for example, Patent Documents No. 3. No. 6, and No. 7).

Patent Document No. 1: Japanese Patent Application Publication No. H10-164618 (FIG. 1)

Patent Document No. 2: Japanese Patent Application Publication No. 2001-112016 (FIG. 1)

Patent Document No. 3: Japanese Patent Application Publication No. 2002-315018 (FIGS. 1 and 6)

Patent Document No. 4: Japanese Patent No. 2566342 (FIG. 1)

Patent Document No. 5: Japanese Patent Application Publication No. H1-174088 (FIG. 1)

Patent Document No. 6: Japanese Patent Application Publication No. H7-131819 (FIG. 1)

Patent Document No. 7: Japanese Patent Application Publication No. 2003-92766 (FIG. 1)

DISCLOSURE OF THE INVENTION

Problems to be Solved by the Invention

The conventional video signal processing circuits described above cannot perform two-dimensional Y/C separation or three-dimensional Y/C separation based on the line-to-line or frame-to-frame color subcarrier phase relationship of non-standard signals in which the color subcarrier phase becomes displaced, or even standard signals if the standard systems belong to television broadcast systems lacking the color subcarrier phase inversion of the NTSC system, so good Y/C separation is not obtainable, picture quality problems such as luminance-chrominance crosstalk and dot crawl occur, and the video signal cannot be displayed or recorded without some loss of picture quality.

The present invention addresses the problems described above, with an object of providing video signal processing circuits, video signal display devices, and video signal recording devices that can perform excellent two-dimensional or three-dimensional Y/C separation regardless of the line-to-line or frame-to-frame phase relationship of the composite video signal and regardless of the use of non-standard signals, and can prevent picture quality degradation after Y/C separation.

Means of Solution of the Problems

The present invention provides a video signal processing circuit that samples an analog composite video signal, converts it to a digital signal, and processes it by using a prescribed clock signal, comprising:

a clock generating means generating the prescribed clock signal;

a phase detecting means detecting color subcarrier phase information in each line of the composite video signal;

a phase difference calculation means calculating a phase difference between phase information from the phase detecting means and a prescribed reference phase, calculating a phase correction from the phase difference, and outputting the phase correction;

a sampling phase conversion means correcting the phase at which the composite video signal is sampled according to the phase correction output from the phase difference calculation means; and a luminance-chrominance (Y/C) separation means separating a luminance signal and a chrominance signal from the composite video signal output from the sampling phase conversion means.

Effect of the Invention

According to the present invention, line-to-line or frame-to-frame differences in the color subcarrier phase are corrected to align the color subcarrier phase with sampling points having the phase relationship used in two-dimensional or three-dimensional Y/C separation, whereby excellent two- or three-dimensional Y/C separation can be obtained from signals in a plurality of television broadcast systems, regardless of the line-to-line or frame-to-frame phase relationship, or regardless of the use of non-standard signals, producing the effect that degradation of picture quality after Y/C separation can be prevented.

EXPLANATION OF REFERENCE CHARACTERS

1 A/D conversion means (ADC), 2 clock generating means, 3 burst phase detecting means, 4 phase difference calculation means, 5 sync separation means, 6, 6a, 6b, 6c timing signal generating means, 7 broadcast system setting means, 8 sampling phase conversion means, 9 Y/C separation means, 10 burst signal phase detecting means, 11 burst signal extraction means, 12 phase comparison means, 13 loop filter, 14 numerically controlled oscillator (NCO), 15 sinewave read-only memory (ROM), 21 to 24 delaying means, 25 selection means, 26 phase error calculation means, 27 phase correction conversion means, 30 to 33 one-line delaying means, 34 delay compensation means, 35 selection means, 36 phase conversion filter, 37 delay compensation means, 38 phase conversion filter, 40 coefficient generating means, 4a to 41h one-clock delaying means, 42 amplifying circuit, 43 adder, 44 one-clock delaying means, 45 selection means, 46-1 to 46-N correction delaying means, 47 selection means, 48 coefficient generating means, 49 interpolation filter, 50 vertical chrominance signal extraction filter, 51 horizontal chrominance signal extraction filter, 52 horizontal-vertical chrominance signal extraction filter, 53 correlation determination means, 54 selection means, 55 subtractor, 60 phase difference calculation means, 61 sampling phase conversion means, 62 phase error calculation means, 63 phase correction conversion means, 64 to 66 phase conversion filters, 70 clock phase correction means, 71 phase difference calculation means, 72 line delay selection means, 73 phase error calculation means, 74 phase correction conversion means, 75a to 75d one-line delaying means, 76 delay compensation means, 77 selection means, 81 phase difference calculation means, 82 frame sampling phase conversion means, 83 Y/C separation means, 84 one-frame delaying means, 85 phase error calculation means, 86 phase correction conversion means, 87 one-frame delaying means, 88 delay compensation means, 89 phase conversion means, 90 subtractor, 91 bandpass filter (BPF), 92 subtractor, 93 phase error calculation means, 94 phase correction conversion means, 96, 96 phase conversion means, 100 input terminal, 101, 102, 103, 104, 105 output terminals, 110 color demodulating means, 200, 202 display processing means, 201 display means, 300, 302 recording signal processing means, 301 recording means.

BEST MODE OF PRACTICING THE INVENTION

A characterizing feature of a video signal processing circuit embodying the present invention is that it detects color subcarrier phase information from the burst phase in each line of the composite video signal, takes the phase difference between the phase information and a prescribed reference phase, corrects the sampling phase of the composite video signal according to the phase difference, and then separates the luminance and chrominance signals.

First Embodiment

Figure 1:
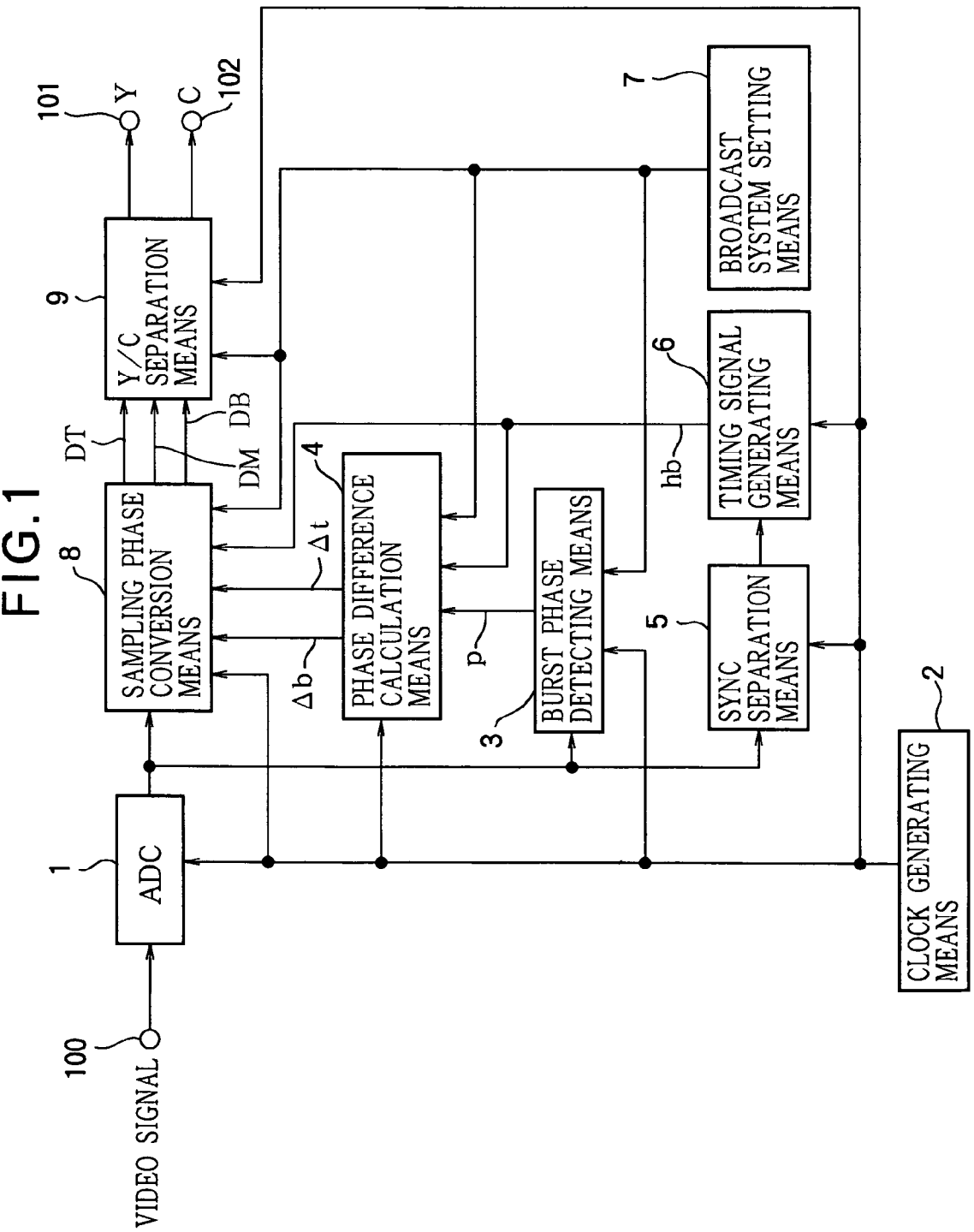
FIG. 1 is a block diagram showing an example of the structure of a video signal processing circuit according to a first embodiment of the present invention.

FIG. 1 is a block diagram showing an example of the structure of a video signal processing circuit according to a first embodiment of the invention. The video signal processing circuit in FIG. 1 comprises an A/D conversion means (analog-to-digital converter or ADC) 1, a clock generating means 2, a burst phase detecting means 3, a phase difference calculation means 4, a sync separation means 5, a timing signal generating means 6, a broadcast system setting means 7, a sampling phase conversion means 8, a Y/C separation means 9, an input terminal 100, and a pair of output terminals 101, 102.

Clock Generating Means 2

The clock generating means 2 generates a clock with a prescribed frequency X and supplies it to the A/D conversion means 1, burst phase detecting means 3, phase difference calculation means 4, sync separation means 5, timing signal generating means 6, sampling phase conversion means 8, and Y/C separation means 9.

The clock with frequency X generated by the clock generating means 2 is a free run clock having a single common frequency X for a plurality of television broadcast systems. The frequency X is an integer multiple of 13.5 MHz, which is a reference frequency calculated as a common multiple of the horizontal frequency in different television broadcast systems and which can thus be shared: for example, X=27 MHz.

The A/D conversion means 1, burst phase detecting means 3, phase difference calculation means 4, sync separation means 5, timing signal generating means 6, sampling phase conversion means 8, and Y/C separation means 9 all operate on this single clock with a frequency X of 27 MHz.

A/D Conversion Means 1

The A/D conversion means 1 samples an analog composite video signal input from the input terminal 100 on a sampling clock generated by the clock generating means 2, converts the sampled signal to a digital signal, and outputs it to the burst phase detecting means 3, sync separation means 5, and sampling phase conversion means 8.

The input terminal 100 receives composite video signals conforming to different television broadcast systems such as NTSC, PAL, and SECAM.

Sync Separation Means 5

The sync separation means 5 separates a vertical synchronizing (sync) signal and a horizontal sync signal from the digital composite signal output from the A/D conversion means 1 and outputs the sync signals to the timing signal generating means 6.

Timing Signal Generating Means 6

The timing signal generating means 6 generates a timing signal based on the sync signals output from the sync separation means 5, and outputs the timing signal to the phase difference calculation means 4 and sampling phase conversion means 8. In this embodiment, it generates a timing signal hb, based on the horizontal sync signal, that indicates sampling points in certain positions relative to the horizontal sync signal: for example, sampling positions in the burst signal interval in the horizontal blanking interval.

Broadcast System Setting Means 7

The broadcast system setting means 7 specifies a television broadcast system selected by the user, for example, and outputs information concerning the specified television broadcast system to the burst phase detecting means 3, phase difference calculation means 4, sampling phase conversion means 8, and Y/C separation means 9, in the form of an identification signal indicating the selected television broadcast system, such as NTSC, PAL, or SECAM, or a signal indicating the corresponding color subcarrier frequency, as a television broadcast system specification signal.

The A/D conversion means 1, clock generating means 2, sync separation means 5, and timing signal generating means 6, which do not receive the television broadcast system specification signal from the broadcast system setting means 7, operate in the same manner regardless of whether NTSC, PAL, SECAM, or any other television broadcast system is selected.

The television broadcast system need not be specified by user selection; it may be determined automatically from, for example, the color subcarrier frequency (fsc) of the burst signal of the input composite signal or the period of the vertical or horizontal sync signal. The broadcast system setting means 7 may be configured to make the automatic determination.

Burst Phase Detecting Means 3

The burst phase detecting means 3 detects the burst phase in each line of the composite signal output from the A/D conversion means 1 and outputs color subcarrier phase information p for the line to the phase difference calculation means 4.

Figure 2:
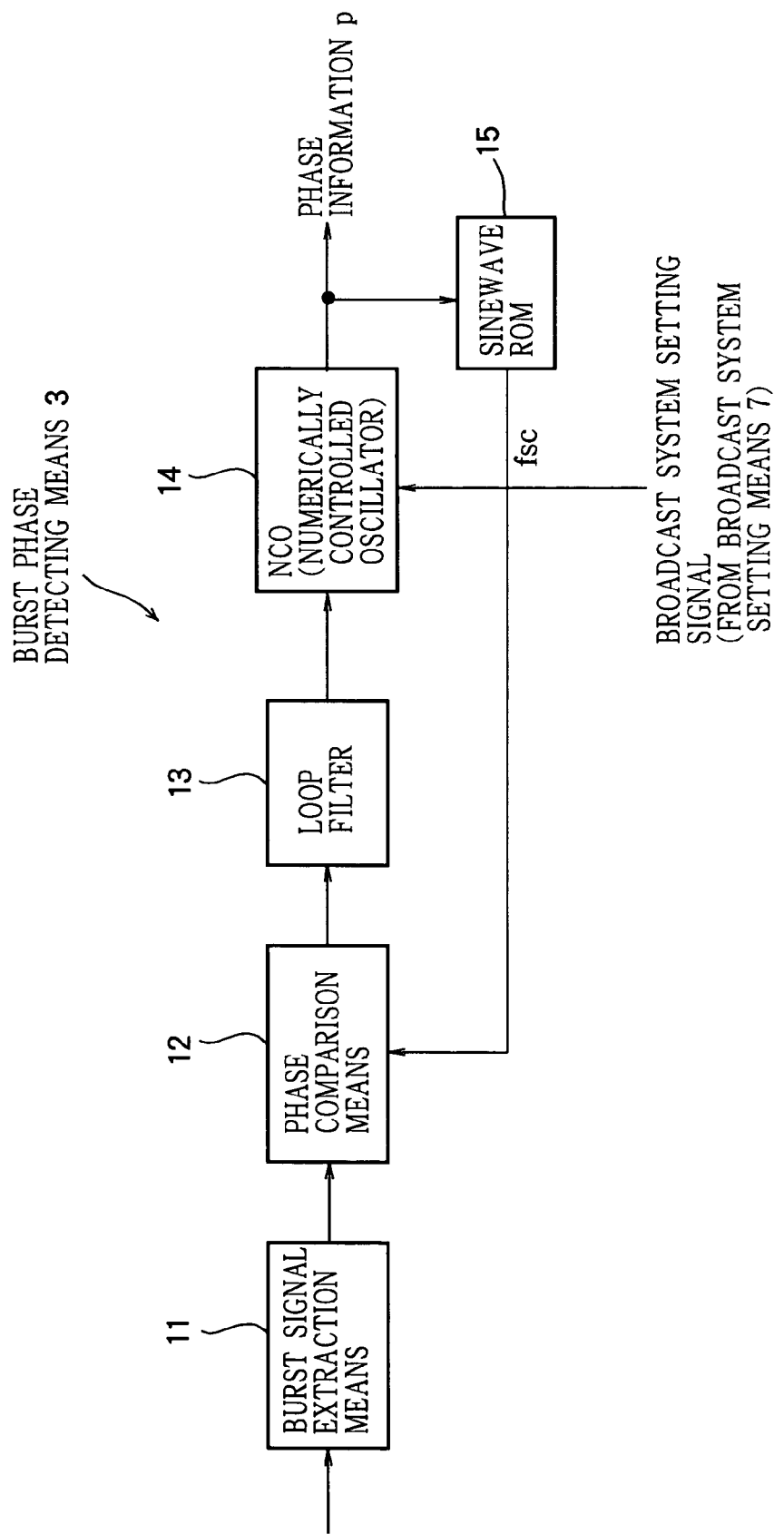
FIG. 2 is a block diagram showing an example of the structure of the burst phase detecting means in the video signal processing circuit according to the first embodiment of the invention.

FIG. 2 is a block diagram showing an example of the structure of the burst phase detecting means 3. As shown in the drawing, the burst phase detecting means 3 comprises a burst signal extraction means 11, a phase comparison means 12, a loop filter 13, a numerically controlled oscillator (NCO) 14, and a sinewave read-only memory (ROM) 15. The NCO 14 is a digital oscillator, analogous to a voltage controlled oscillator (VCO) of the type used in analog signal processing.

The burst signal extraction means 11 extracts a burst signal imposed on the blanking interval of the composite signal input from the A/D conversion means 1 and outputs the burst signal to the phase comparison means 12. The phase comparison means 12 compares the phases of the burst signal output from the burst signal extraction means 11 and a reference signal with the color subcarrier frequency fsc output from the sinewave ROM 15, and outputs a signal corresponding to the phase difference to the loop filter 13. The loop filter 13 smoothes the signal output from the phase comparison means 12 and outputs a smoothed phase comparison result to the NCO 14.

The NCO 14 integrates the smoothed phase comparison result output from the loop filter 13 over time, generates phase information p for the burst signal, and outputs it to the phase difference calculation means 4. The sinewave ROM 15 generates the reference signal with the color subcarrier frequency fsc in accordance with the phase information p and outputs this signal to the phase comparison means 12.

The NCO 14 acquires phase lock and continuously outputs phase information for generating the reference signal with the color subcarrier frequency fsc, that is, color subcarrier phase information of the current burst signal in the input composite signal, as color subcarrier phase information p for the current line.

Phase Difference Calculation Means 5

The phase difference calculation means 4 calculates line-to-line phase errors between the target line and lines thereabove and therebelow in accordance with the color subcarrier phase information p, obtains phase corrections Δb and Δt from the phase errors, and outputs the phase corrections to the sampling phase conversion means 8.

Figure 3:
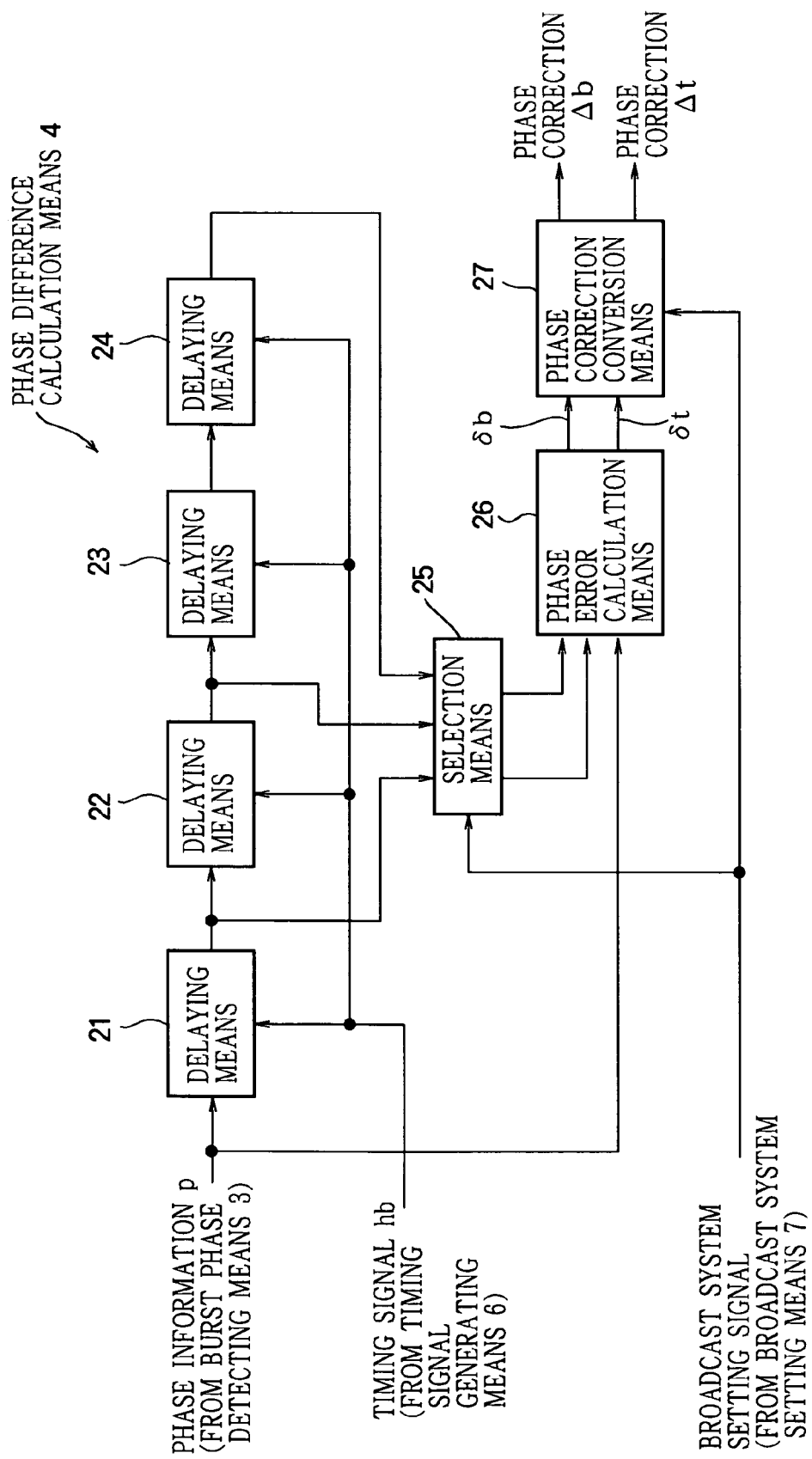
FIG. 3 is a block diagram showing an example of the structure of the phase difference calculation means in the video signal processing circuit according to the first embodiment of the invention.

FIG. 3 is a block diagram showing an example of the structure of the phase difference calculation means 4. As shown in the drawing, the phase difference calculation means 4 comprises delaying means 21, 22, 23, 24, a selection means 25, a phase error calculation means 26, and a phase correction conversion means 27.

In the phase difference calculation means 4 shown in FIG. 3, the phase information p output from the burst phase detecting means 3 is input to delaying means 21 and the phase error calculation means 26. The timing signal hb output from the timing signal generating means 6 is input to delaying means 21 to 24. The television broadcast system specification signal output from the broadcast system setting means 7 is input to the selection means 25 and phase correction conversion means 27.

Delaying means 21 delays the phase information p by one line in accordance with timing signal hb, and outputs the delayed information to the delaying means 22 and selection means 25. Delaying means 22 delays the phase information p input from delaying means 21 by one more line in accordance with timing signal hb, and outputs the delayed information to delaying means 23 and the selection means 25. Delaying means 23 delays the phase information p input from the delaying means 22 by yet one more line in accordance with timing signal hb, and outputs the delayed information to delaying means 24. Delaying means 24 delays the phase information p input from delaying means 23 by one further line in accordance with timing signal hb, and outputs the delayed information to the selection means 25.

Timing signal hb is a timing signal (a burst gate signal, for example) indicating the position of the burst signal interval, based on the horizontal sync signal, and is used to delay the burst signal phase information p by one line.

The delaying means 22 to 24 each delay the phase information p input from the burst phase detecting means 3 successively by one line in accordance with timing signal hb.

From the one-line-delayed, two-line-delayed, and four-line-delayed phase information p supplied by delaying means 21, 22, and 24, the selection means 25 selects two items of phase information p in accordance with the television broadcast system specification signal output from the broadcast system setting means 7, and outputs phase information p for two lines to the phase error calculation means 26.

The selection means 25 selects phase information so that the output of the selection means 25 and the output of the burst phase detecting means 3 (input of the delaying means 21) constitute phase information p for three lines: the target line and lines thereabove and therebelow. The selected phase information is input to the phase error calculation means 26. This enables the Y/C separation means 9 to carry out two-dimensional Y/C separation by using signals from lines with opposite phases.

The phase error calculation means 26 calculates the line-to-line phase errors δb, δt to be corrected from the three-line phase information p obtained from the burst phase detecting means 3 and selection means 25, and outputs them to the phase correction conversion means 27.

The phase correction conversion means 27 converts the phase errors δb and δt obtained from the phase error calculation means 26 to phase corrections Δb and Δt, and outputs them to the sampling phase conversion means 8.

Since the phase information p indicates an angle, where one period of the color subcarrier corresponds to 2π, the conversion process performed by the phase correction conversion means 27 converts the phase errors δb and δt output from the phase error calculation means 26 to values representing time with reference to one period of the clock with a frequency X of 27 MHz, (time represented as a multiple of the period of clock with frequency X). If the change ω expressed in color subcarrier phase angle per clock period is 2π×fsc/X, where fsc is the color subcarrier frequency, the phase corrections Δb and Δt obtained by conversion of the phase errors δb and δt are expressed as follows:

$$\Delta b = \delta b / \omega$$

$$\Delta t = \delta t / \omega$$

If the phase errors δb and δt range from −π to +π, the phase corrections Δb and Δt range from −X/(2×fsc) to X/(2×fsc)

Sampling Phase Conversion Means 8

The sampling phase conversion means 8 obtains, for example, digital composite signals for three lines (the target line and lines thereabove and therebelow) from the A/D conversion means 1 as the signals to be used for Y/C separation, corrects the phases of the composite signals of the lines thereabove and therebelow by phase corrections Δt and Δb obtained from the phase difference calculation means 4, and outputs the composite signal DM of the target line and phase-corrected composite signals DT and DB of the lines thereabove and therebelow to the Y/C separation means 9.

Through this processing, the sampling phase conversion means 8 corrects the sampling phase of the digital video signal, after A/D conversion on a single free run clock, in accordance with phase errors with respect to a reference value obtained from the phase information of the burst signal, so that a predetermined phase relationship is established.

Figure 4:
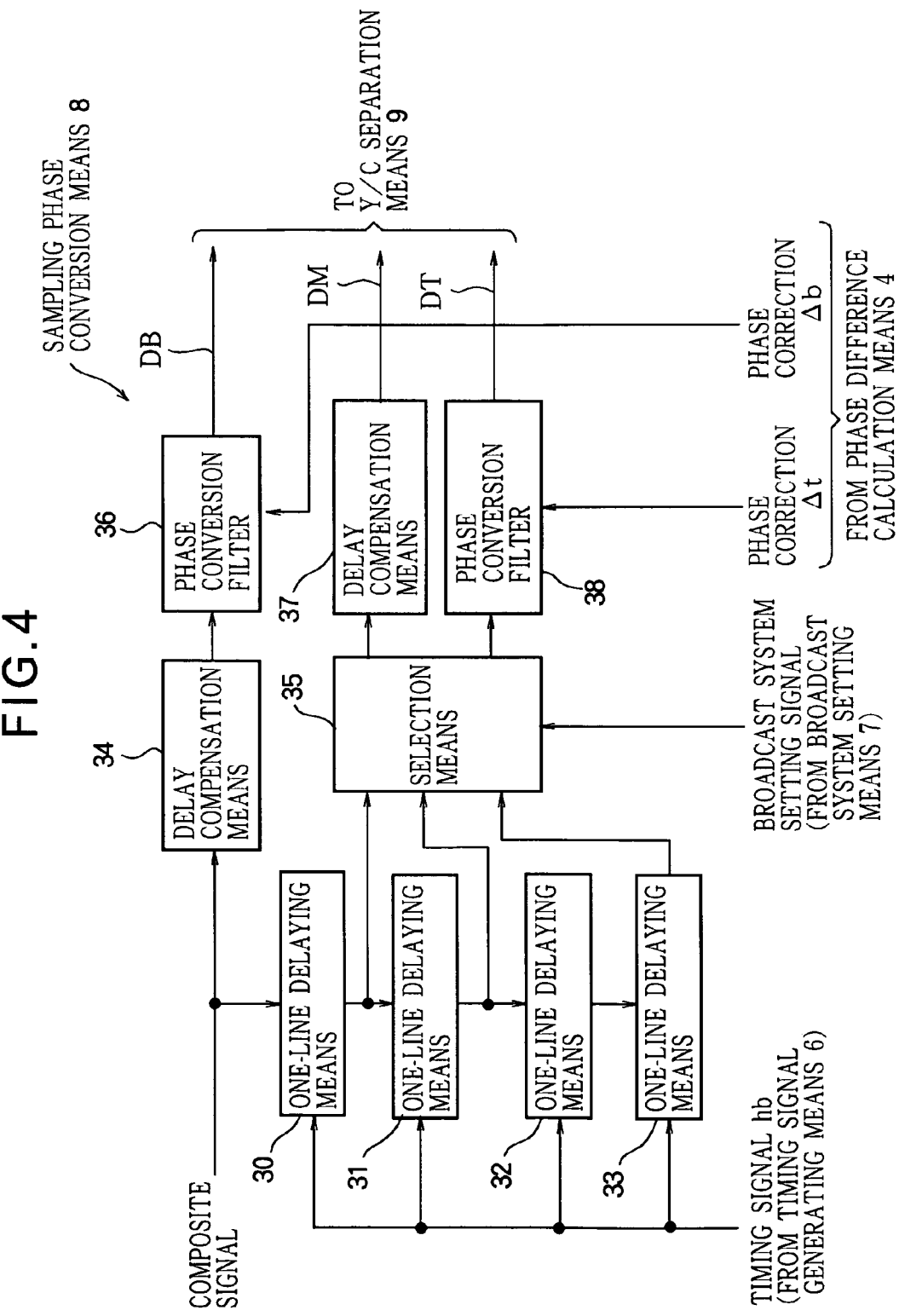
FIG. 4 is a block diagram showing an example of the structure of the sampling phase conversion means in the video signal processing circuit according to the first embodiment of the invention.

FIG. 4 is a block diagram showing an example of the structure of the sampling phase conversion means 8. As shown in the drawing, the sampling phase conversion means 8 comprises one-line delaying means 30, 31, 32, 33, a delay compensation means 34, a selection means 35, a phase conversion filter 36, a delay compensation means 37, and another phase conversion filter 38.

In the sampling phase conversion means 8 shown in FIG. 4, the composite signal output from the A/D conversion means 1 is input to one-line delaying means 30 and delay compensation means 34. The timing signal hb output from the timing signal generating means 6 is input to one-line delaying means 30 to 33. The television broadcast system specification signal output from the broadcast system setting means 7 is input to the selection means 35. The phase correction Δb output from the phase difference calculation means 4 is input to the first phase conversion filter 36, and the phase correction Δt output from the phase difference calculation means 4 is input to the second phase conversion filter 38.

The delay compensation means 34 outputs the composite signal obtained from the A/D conversion means 1 to phase conversion filter 36, with compensation for the delay of the signal output from the selection means 35.

The one-line delaying means 30 delays the input composite signal by one line in accordance with the timing signal hb based on the horizontal sync signal, and outputs the delayed signal to the one-line delaying means 31 and selection means 35. The one-line delaying means 31 delays the composite signal output from the one-line delaying means 30 by one more line in accordance with timing signal hb, and outputs the delayed signal to the one-line delaying means 32 and selection means 35. The one-line delaying means 32 delays the composite signal output from the one-line delaying means 31 by yet one more line in accordance with timing signal hb, and outputs the delayed signal to the one-line delaying means 33. The one-line delaying means 33 delays the composite signal output from the one-line delaying means 32 by still another line in accordance with timing signal hb, and outputs the delayed signal to the selection means 35.

The one-line delaying means 30 to 33 successively delay the composite signal input from the A/D conversion means 1 by one line each in accordance with timing signal hb.

The selection means 35 selects two signals from the output signals of the one-line delaying means 30, 31, 33, in accordance with the television broadcast system specified by the broadcast system setting means 7, and outputs one of the two signals to delay compensation means 37 and the other to the second phase conversion filter 38.

The delay compensation means 37 outputs the composite signal obtained from the selection means 35 as composite signal DM to the Y/C separation means 9, with compensation for the signal delays of the other composite signals output from the phase conversion filters 36 and 38.

Phase conversion filter 36 corrects the phase of the composite signal output from delay compensation means 34 in accordance with the phase correction Δb given by the phase difference calculation means 4, and outputs the corrected signal as composite signal DB to the Y/C separation means 9. Phase conversion filter 38 corrects the phase of the composite signal output from the selection means 35 in accordance with the phase correction Δt given by the phase difference calculation means 4, and outputs the corrected signal as composite signal DT to the Y/C separation means 9.

Phase corrections Δt and Δb are phase corrections with respect to the color subcarrier phase on line k, given for the lines thereabove and therebelow. The phase corrections have been converted to values based on the period of the clock with a frequency X of 27 MHz. The signals of the lines thereabove and therebelow input to the phase conversion filters 36 and 38 are delayed by Δb and Δt respectively, thereby converting and correcting the sampling phase.

Figure 5:
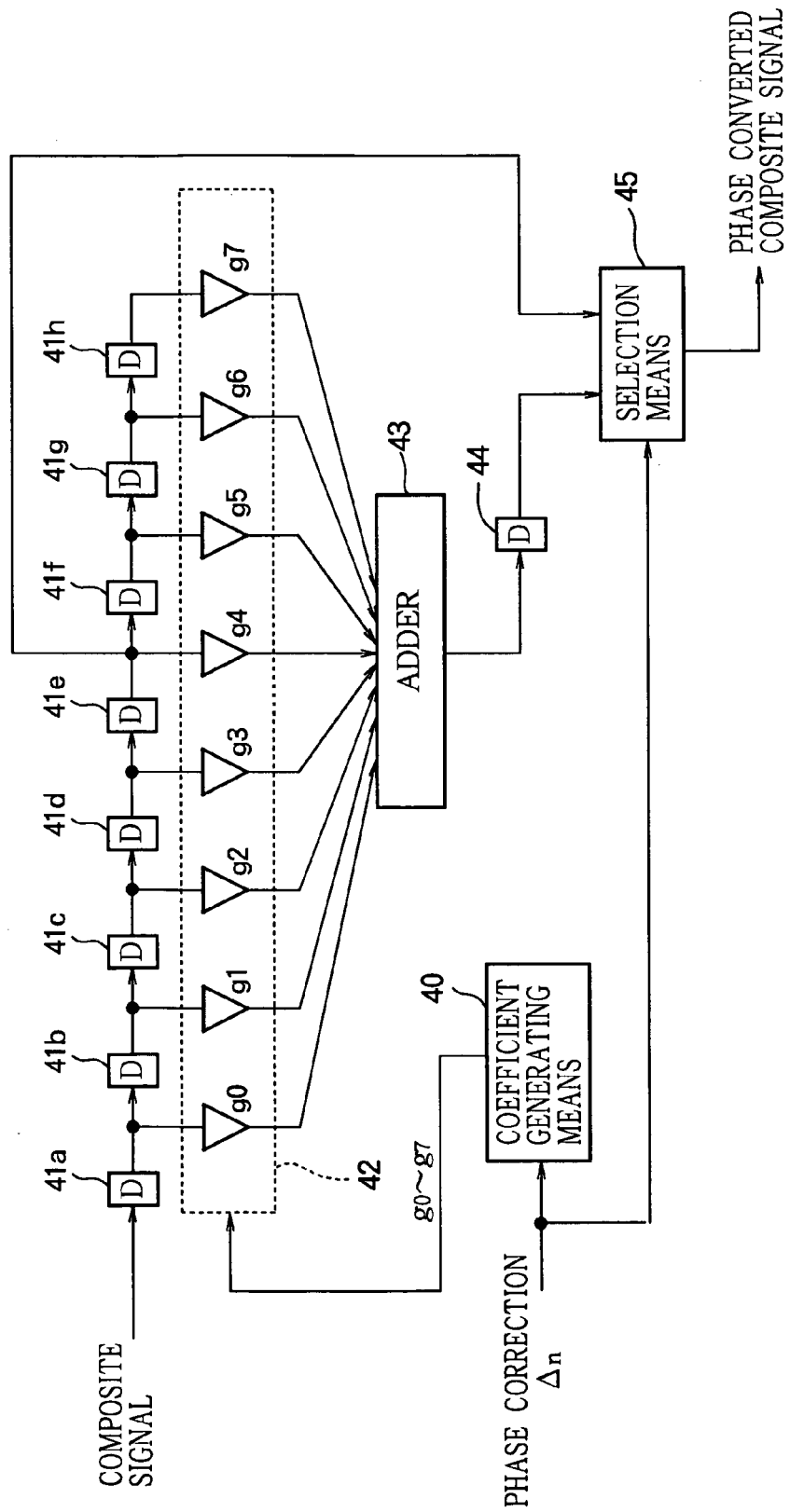
FIG. 5 is a block diagram showing an example of the structure of the phase conversion filters in the video signal processing circuit according to the first embodiment of the invention.

FIG. 5 is a block diagram showing an example of the structure of the phase conversion filters 36 and 38. The phase conversion filter 36 or 38 shown in the drawing comprises a coefficient generating means 40, one-clock delaying means 41*a* to 41*h*, an amplifying circuit 42, an adder 43, a one-clock delaying means 44, and a selection means 45.

The phase conversion filter 36 or 38 shown in FIG. 5 is provided as a type of linear phase filter referred to as a finite impulse response (FIR) filter, and is given a group delay corresponding to the phase correction Δn (Δb or Δt). The filter corrects the phase of the composite signal by giving a delay Δn corresponding to a phase correction smaller than one clock period. The phase conversion filter 36 or 38 shown in the drawing has eight taps.

In the phase conversion filter 36 or 38 shown in FIG. 5, the coefficient generating means 40 generates filter coefficients g0 to g7 of the FIR filter with a group delay corresponding to the phase correction Δn, in accordance with the phase correction Δn (Δb or Δt) input from the phase difference calculation means 4, and outputs them to the amplifying circuit 42. It may be configured as a ROM, for example, and the filter coefficients may be generated by using the value of the phase correction Δn as an address.

The one-clock delaying means 41*a* to 41*h* delay the composite signal input from delay compensation means 34 or selection means 35 by one clock period each. The outputs of one-clock delaying means 41*a* to 41*h* are supplied to the amplifying circuit 42. The output of one-clock delaying means 41*e* is also supplied to the selection means 45.

The amplifying circuit 42 comprises eight amplifiers, which receive the signals output from the one-clock delaying means 41*a* to 41*h* and use the filter coefficients g0 to g7 given by the coefficient generating means 40 as their respective gains. The amplifiers multiply the composite signals input from the one-clock delaying means 41*a* to 41*h* by the corresponding filter coefficients g0 to g7, and output the results to the adder 43.

The adder 43 sums the values output from the amplifying circuit 42, and outputs the result to the one-clock delaying means 44. The one-clock delaying means 44 supplies the output of the adder 43 to the selection means 45 with a one-clock delay.

If the phase correction Δn (Δb or Δt) output from the phase difference calculation means 4 is zero (if phase correction is not required), the selection means 45 selects the delay-adjusted output of one-clock delaying means 41*e*. If the phase correction Δn is not zero (if phase correction is required), the selection means 45 selects the output of one-clock delaying means 44. The selected output is supplied to the Y/C separation means 9 as a phase-converted (phase-corrected) composite signal DB or DT.

Y/C Separation Means 9

The Y/C separation means 9 is a two-dimensional Y/C separation means utilizing a line comb filter. Through two-dimensional Y/C separation, it extracts the C signal from the composite signals DB, DM, and DT input from the sampling phase conversion means 8 in accordance with the color subcarrier frequency fsc of the television broadcast system specified by the broadcast system setting means 7, separates the Y signal and C signal, outputs the C signal to output terminal 101, and outputs the Y signal to output terminal 102.

The phases of the composite signals DB, DM, and DT input from the sampling phase conversion means 8 have been corrected so that composite signals DB and DM have opposite color subcarrier phases and composite signal DM and DT have opposite color subcarrier phases. Accordingly, the sampling data on the three lines of composite signals DB, DM, and DT are aligned with sampling points where the color subcarrier phase relationship used by the Y/C separation means 9 is established.

Figure 6:
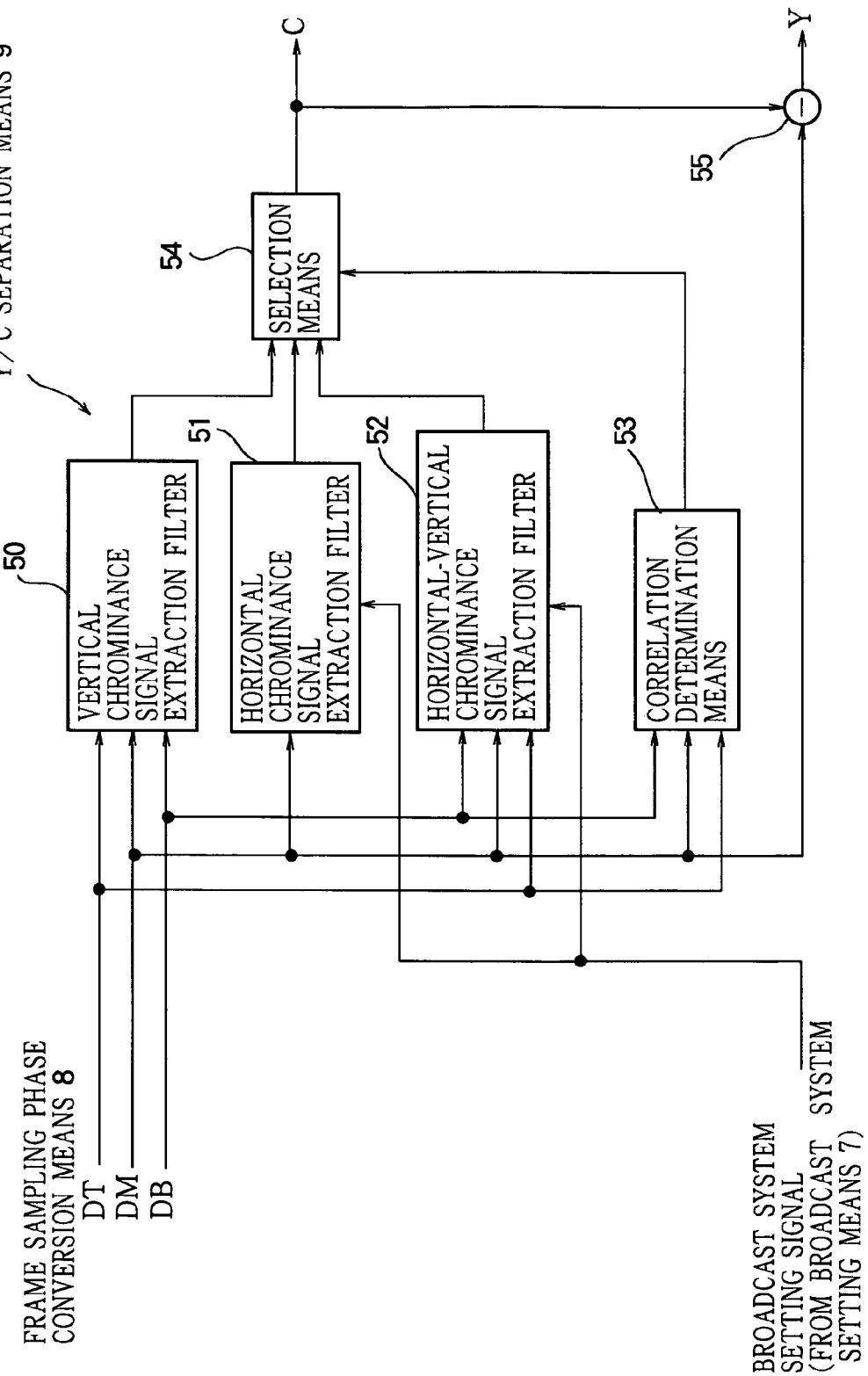
FIG. 6 is a block diagram showing an example of the structure of the Y/C separation means in the video signal processing circuit according to the first embodiment of the invention.

FIG. 6 is a block diagram showing an example of the structure of the Y/C separation means 9. As shown in the drawing, the Y/C separation means 9 comprises a vertical chrominance signal extraction filter 50, a horizontal chrominance signal extraction filter 51, a horizontal-vertical chrominance signal extraction filter 52, a correlation determination means 53, a selection means 54, and a subtractor 55.

In the Y/C separation means 9 shown in FIG. 6, the composite signals DT, DM, and DB for three lines obtained from the sampling phase conversion means 8 are supplied to the vertical chrominance signal extraction filter 50, horizontal-vertical chrominance signal extraction filter 52, and correlation determination means 53. Composite signal DM is also supplied to the horizontal chrominance signal extraction filter 51 and subtractor 55. The television broadcast system specification signal input from the broadcast system setting means 7 is supplied to the horizontal chrominance signal extraction filter 51 and horizontal-vertical chrominance signal extraction filter 52.

The vertical chrominance signal extraction filter 50 extracts a chrominance signal from the input composite signals DT, DM, and DB, assuming that the three input lines exhibit vertical picture correlation, and outputs the extracted signal to the selection means 54. The horizontal chrominance signal extraction filter 51 extracts a chrominance signal from input composite signal DM, assuming a horizontal picture correlation, and outputs the extracted signal to the selection means 54. The horizontal-vertical chrominance signal extraction filter 52 extracts a chrominance signal from input composite signals DT, DM, and DB, assuming that the three input lines have horizontal and vertical picture correlations, and outputs the extracted signal to the selection means 54.

In accordance with the television broadcast system specification signal input from the broadcast system setting means. 7, the horizontal chrominance signal extraction filter 51 and horizontal-vertical chrominance signal extraction filter 52 use a filter corresponding to the color subcarrier frequency fsc of the specified television broadcast system.

From the input composite signals DT, DM, DB, the correlation determination means 53 detects vertical and horizontal picture correlations of the three input lines at the sampling points of composite signal DM, and outputs the result to the selection means 54.

Based on the correlations detected by the correlation determination means 53, the selection means 54 selects one of the signals output from the vertical chrominance signal extraction filter 50, horizontal chrominance signal extraction filter 51, and horizontal-vertical chrominance signal extraction filter 52 according to its picture correlation strengths, and outputs the signal to output terminal 102 (FIG. 1) and subtractor 55 as the C signal (chrominance signal) separated from the composite signal. If the horizontal correlation is weak, the output signal of the vertical chrominance signal extraction filter 50 is selected. If the vertical correlation is weak, the output signal of the horizontal chrominance signal extraction filter 51 is selected. Otherwise, the output signal of the 52 is selected.

The subtractor 55 subtracts the C signal output by the selection means 54 from input composite signal DM to obtain the Y signal (luminance signal), and outputs the separated Y signal to output terminal 101 (FIG. 1).

Operation when an NTSC Composite Signal is Input

When an NTSC composite video signal is input to the input terminal 100, the following operations are performed. Since the NTSC system has been specified by the broadcast system setting means 7, the NCO 14 in the burst phase detecting means 3 outputs phase information p for an NTSC signal with color subcarrier frequency fsc(NTSC), and the sinewave ROM 15 outputs an NTSC reference signal with color subcarrier frequency fsc(NTSC) to the phase comparison means 12.

The color subcarrier phase of the NTSC composite signal inverts by 180° (=π) on alternate lines. The color subcarrier phase of line k is inverted in lines k−1 and k+1. The Y/C separation means 9 separates the Y and C signals by two-dimensional Y/C separation, exploiting the fact that the color subcarrier phase is inverted on alternate lines.

In the phase difference calculation means 4, the selection means 25 selects the color subcarrier phase information p(k−1) for line k−1, one line above line k on the screen, and the color subcarrier phase information p(k+1) for line k+1, one line below line k on the screen. The phase error calculation means 26 receives the phase information p(k−1) and p(k+1) together with the color subcarrier phase information p(k) for line k.

The phase error calculation means 26 is thus supplied with the phase information p(k+1) output from the burst phase detecting means 3 as phase information for line k+1, the one-line-delayed phase information p(k) output from delaying means 21 as phase information for line k, and the two-line-delayed phase information p(k−1) output from delaying means 22 as phase information for line k−1.

In consideration of the line-to-line phase inversion of π, the phase error calculation means 26 in the phase difference calculation means 4 calculates the phase error δb with respect to the phase information p(k) for line k which is to be corrected in the signal of line k+1 one line below as follows, $$\delta b = p(k+1) - p(k) - \pi$$

and calculates the phase error δt with respect to the phase information p(k) for line k which is to be corrected in the signal of line k−1 one line above as follows $$\delta t = p(k-1) - p(k) + \pi$$

where −π and +π are both fixed phase values and −p(k)−π and −p(k)+π are equivalent to reference phases with respect to line k on lines k+1 and k−1, respectively. Phase errors δb and δt are obtained as phase differences between the phase information p(k+1) and p(k−1) of lines k+1 and k−1 and the reference phase with respect to line k.

For a standard NTSC input signal with a line-to-line phase inversion of 180°, phase errors δb and δt are both zero. For a non-standard signal, values equivalent to the phase difference are obtained as phase errors δb and δt.

The phase correction conversion means 27 in the phase difference calculation means 4 obtains the amount of change ω(NTSC) in NTSC color subcarrier phase per clock in accordance with the NTSC color subcarrier frequency fsc(NTSC) as follows, $$\omega(NTSC) = 2\pi fsc(NTSC)/X$$

and converts phase errors δb and δt to phase corrections δb and Δt as follows:

$$\Delta b = \delta b / \omega(NTSC)$$

$$\Delta t = \delta t / \omega(NTSC)$$

In the sampling phase conversion means 8, when the composite signal of line k+1 (the line immediately below line k on the screen) is supplied through delay compensation means 34 to phase conversion filter 36, the selection means 35 selects the composite signal of line k supplied through one-line delaying means 30 and the composite signal of line k−1 (the line immediately above line k on the screen) supplied through one-line delaying means 31. The composite signal of line k is output to delay compensation means 37, and the composite signal of line k−1 is output to phase conversion filter 38.

The phase conversion filters 36 and 38 configured as shown in FIG. 5 correct the phases of the composite signals of lines k+1 and k−1 in accordance with phase corrections Δb and Δt, respectively. The composite signal DT of line k−1 with its phase corrected by phase conversion filter 38, the composite signal DM of line k with a compensating delay applied by delay compensation means 37, and the composite signal DB of line k+1 with its phase corrected by phase conversion filter 36 are output to the Y/C separation means 9.

Figure 7:
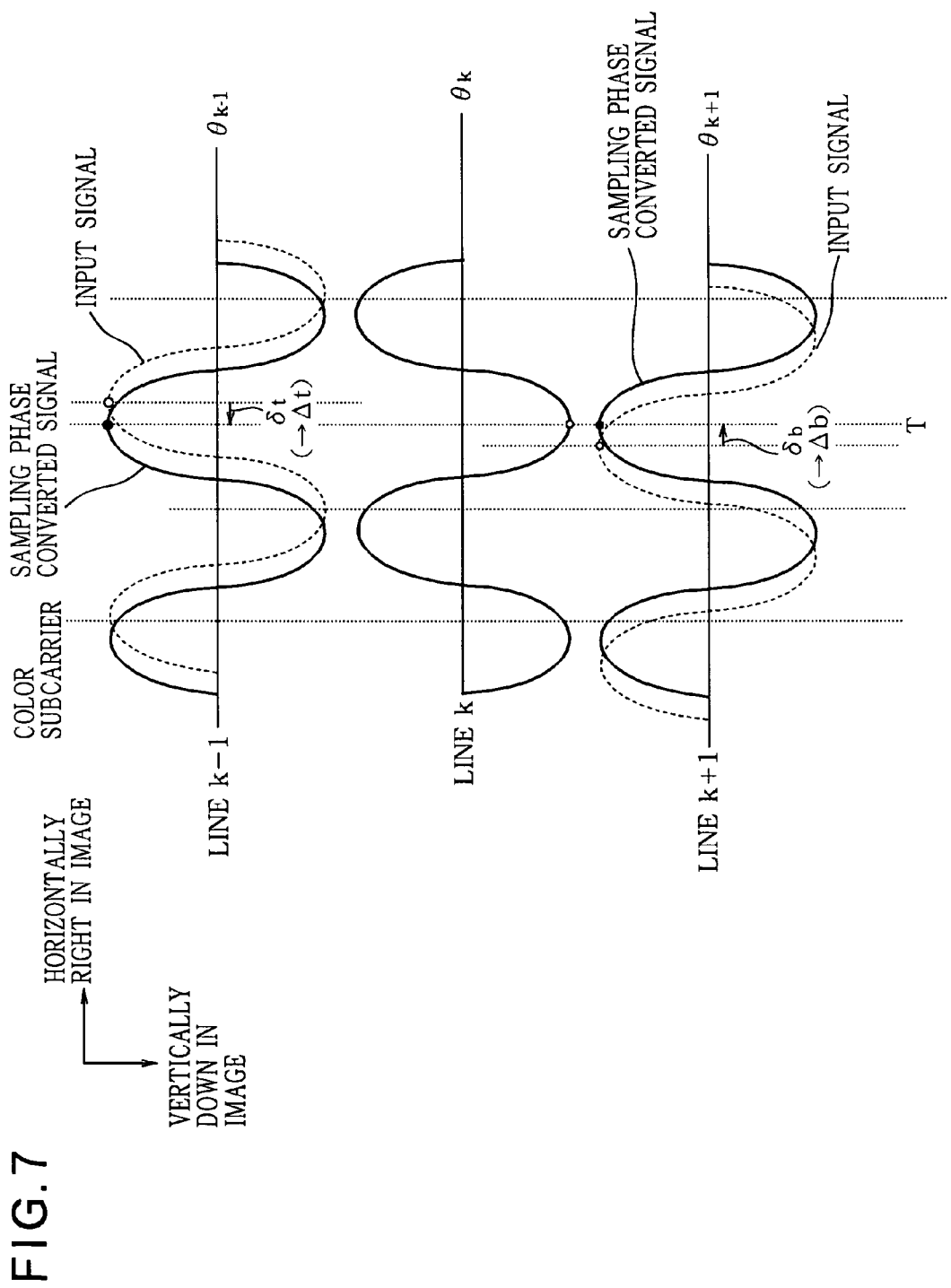
FIG. 7 is a diagram illustrating the line-to-line color subcarrier phase after the sampling phase conversion in the video signal processing circuit according to the first embodiment of the invention.

FIG. 7 shows an example of the sampling phase correction applied by the phase conversion filters 36 and 38 in the NTSC system. The composite signals of lines k+1 and k−1 supplied to the filters, represented by dotted lines in FIG. 7, are corrected by the phase corrections Δb and Δt obtained from conversion of the phase errors δb and δt, so after sampling phase conversion, the composite signals of lines k+1 and k−1 are corrected to signals with phases represented by the solid lines.

As shown in FIG. 7, the sampling data of the composite signal DT of line k−1 and the composite signal DB of line k+1 are corrected so that they are 180° (=π) out of phase with the sampling data of the composite signal DM of line k.

Non-standard NTSC signal are processed in the same way. The phases of the composite signals DB and DT of lines k+1 and k−1 are corrected by phase corrections Δb and Δt, respectively. The sampling data of the composite signals DT, DM, and DB of lines k−1, k, and k+1 are output from the sampling phase conversion means 8 with their phases corrected to invert between lines.

FIGS. 8(a)-(c) are diagrams illustrating sampling phase conversion in further detail. The clock signal with a frequency X of 27 MHz generated by the clock generating means 2 is shown in FIG. 8(a); the input signal of line k−1 (dotted line in FIG. 7) is shown in FIG. 8(b); and the signal of line k−1 after sampling phase conversion (solid line in FIG. 7) is shown in FIG. 8(c).

The role of the sampling phase conversion means 8 is to output a digital signal identical in principle to a signal that would be obtained from A/D conversion following a phase correction (phase shift) of the analog signal input to the A/D conversion means 1. If the phase of the analog signal were to be shifted, phase error extraction, control of an analog phase-shifting circuit, element-to-element variations, and other problems would have to be addressed. In this embodiment, the phase of the analog signal is not shifted before A/D conversion, but the sampling phase of the digital video signal obtained through A/D conversion on a single free run clock is corrected according to phase error with respect to a reference value based on the phase information in the burst signal so as to establish the prescribed phase relationship.

Figure 8:
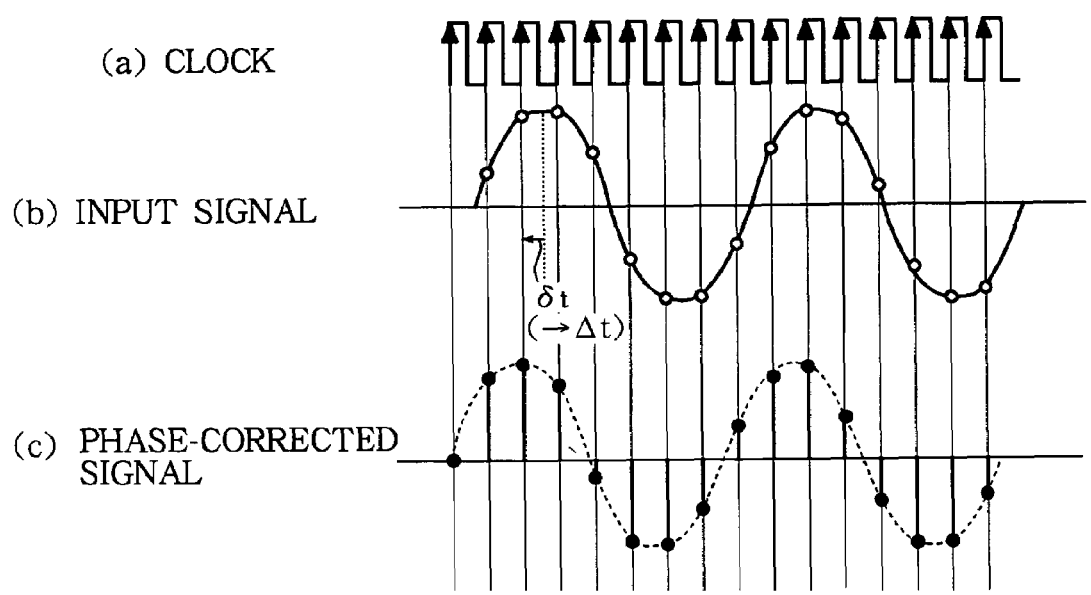
FIGS. 8(a)-(c) are diagrams illustrating sampling phase conversion according to the first embodiment of the invention in more detail.

In the actual sampling performed in the A/D conversion means 1, the input signal shown in FIG. 8(*b*) (the dotted line in FIG. 7) is sampled on the rise of the clock pulses shown in FIG. 8(*b*) to obtain the sampled values represented by the white circles shown in FIG. 8(*b*).

The values of the phase-corrected signal (solid line in FIG. 7), represented by the black dots shown in FIG. 8(*c*), cannot be obtained simply by a temporal shift of the sampled values on the input signal (dotted line); it is necessary to change the magnitudes of the values. This is performed by the phase conversion filter 5 shown in FIG. 5. The sampled values on the broken line shown in FIG. 7 (white circles shown in FIG. 8(*b*)) are combined to obtain values on the solid line shown in FIG. 7 (black dots shown in FIG. 8(*c*)).

In the Y/C separation means 9, a C signal is extracted from the composite signals DB, DM, and DT of lines k+1, k, and k−1 in accordance with the NTSC color subcarrier frequency fsc(NTSC), and the Y and C signals are separated.

Operation when a PAL Composite Signal is Input

When a PAL composite video signal is input to the input terminal 100, the following operations are performed. Since the PAL system has been specified by the broadcast system setting means 7, the sinewave ROM 15 in the burst phase detecting means 3 outputs a reference signal with the PAL color subcarrier frequency fsc(PAL) to the phase comparison means 12, and phase information p for a signal with the PAL color subcarrier frequency fsc(PAL) is output from the NCO 14.

In a PAL composite signal, the color subcarrier phase changes by 270° (that is, −90°) at each line. The phase inverts by 180° (=π) at intervals of two lines. If the target line is line k, the color subcarrier phase of line k is inverse to the color subcarrier phase on lines k−2 and k+2. In the PAL system, the color subcarrier phase of the R-Y signal is inverted by 180° at each line.

If the one-line delay performed for an NTSC signal is replaced by a two-line delay, the color subcarrier phase of the signals output from the delaying means inverts by 180° on alternate lines, and the color subcarrier phase of the R-Y signal has the same sign.

In the phase difference calculation means 4, the selection means 25 selects the color subcarrier phase information p(k−2) for line k−2, two lines above line k on the screen, and the color subcarrier phase information p(k+2) for line k+2, two lines below line k on the screen. The phase error calculation means 26 receives the phase information p(k−2) and p(k+2) together with the color subcarrier phase information p(k) for line k.

The phase error calculation means 26 is thus supplied with the phase information p(k+2) output from the burst phase detecting means 3 as phase information for line k+2, the two-line-delayed phase information p(k) output from delaying means 22 as phase information for line k, and the four-line-delayed phase information p(k−2) output from delaying means 24 as phase information for line k−2.

In consideration of the phase inversion of π at intervals of two lines, the phase error calculation means 26 in the phase difference calculation means 4 calculates the phase error δb with respect to the phase information p(k) for line k which is to be corrected in the signal of line k+2 two lines below as follows, $\delta b = p(k+2) - p(k) - \pi$ and calculates the phase error δt with respect to the phase information p(k) for line k which is to be corrected in the signal of line k−2 two lines above as follows $\delta t = p(k-2) - p(k) + \pi$ where −π and +π are both fixed phase values and −p(k)−π and −p(k)+π are equivalent to reference phases with respect to line k on lines k+2 and k−2, respectively. Phase errors δb and δt are obtained as phase differences between the phase information p(k+2) and p(k−2) of lines k+2 and k−2 and the reference phase with respect to line k.

For a standard PAL input signal with phase inverted by 180° at intervals of two lines, phase errors δb and δt are both zero. For a non-standard signal, values equivalent to the phase difference are obtained as phase errors δb and δt.

The phase correction conversion means 27 in the phase difference calculation means 4 obtains the change ω(PAL) in PAL color subcarrier phase per clock in accordance with the PAL color subcarrier frequency fsc(PAL) as follows:

$\omega(PAL) = 2\pi \times fsc(PAL)/X$ and converts phase errors δb and δt to phase corrections Δb and Δt as follows:

$\Delta b = \delta b / \omega(PAL)$ $\Delta t = \delta t / \omega(PAL)$

In the sampling phase conversion means 8, when the composite signal of line k+2 (the second line below line k on the screen) is supplied through delay compensation means 34 to phase conversion filter 36, the composite signal of line k input from the one-line delaying means 31 and the composite signal of line k−2 (the second line above line k on the screen) input from the one-line delaying means. 33 are selected by the selection means 35. The composite signal of line k is supplied to delay compensation means 37, and the composite signal of line k+2 is supplied to phase conversion filter 38.

The phase conversion filters 36 and 38 configured as shown in FIG. 5 correct the phases of the composite signals of lines k+2 and k−2 in accordance with phase corrections Δb and Δt, respectively. The composite signal DT of line k−2 with its phase corrected by phase conversion filter 38, the composite signal DM of line k with a compensating delay applied by delay compensation means 37, and the composite signal DB of line k+2 with its phase corrected by phase conversion filter 36 are output to the Y/C separation means 9.

The sampling data of the composite signal DT of line k−2 and the composite signal DB of line k+2 are corrected to be 180° (=π) out of phase with the sampling data of the composite signal DM of line k.

Non-standard PAL signal are processed in the same way. The phases of the composite signals DB and DT of lines k+2 and k−2 are corrected by phase corrections Δb and Δt, respectively. The sampling data of the composite signals DT, DM, and DB of lines k−2, k, and k+2 are output from the sampling phase conversion means 8 with their phases corrected to invert between lines.

In the Y/C separation means 9, a C signal is extracted from the composite signals DB, DM, and DT of lines k+2, k, and k−2 in accordance with the PAL color subcarrier frequency fsc (PAL), and the Y and C signals are separated.

In the NTSC system, the phase difference calculation means 4 calculates phase errors among the target line and the lines immediately above and below the target line in accordance with color subcarrier phase information p, and outputs phase corrections Δb and Δt. In the PAL system, the phase difference calculation means 4 calculates phase errors among the target line and the lines two lines above and below the target line in accordance with color subcarrier phase information p, and outputs phase corrections Δb and Δt.

In the NTSC system, the sampling phase conversion means 8 corrects the phases of the composite signals of lines k−1 and k+1, one line above and one line below line k, by phase corrections Δb and Δt, and outputs composite signals DT, DM, and DB for the three lines k−1, k, and k+1. In the PAL system, the sampling phase conversion means 8 corrects the phases of the composite signals of lines k−2 and k+2, two lines above and two lines below line k, and outputs composite signals DT, DM, and DB for the three lines k−2, k, and k+2.

In the above calculation of phase errors δb and δt, π is added or subtracted to take the inversion of phase between lines into consideration, but the value taken into consideration is not limited to π. The line-to-line phase relationship in each television broadcast system should be considered, and the phase error should take the offset into consideration so that the difference in color subcarrier phase between lines becomes 180°.

If the phase error calculation means 26 in the phase difference calculation means 4 obtains a phase error to be corrected from the line-to-line phase information so that Y/C separation can be performed on the assumption of a 180° inversion of the color subcarrier phase between lines, then the sampling phase conversion means 8 can correct the phase for other television broadcast systems such as PAL-N, PAL-M, and NTSC-4.43, and these television broadcast systems can also be easily supported. If the color subcarrier phase of the R-Y signal inverts on alternate lines, as in the PAL system, the one-line delay processing performed for the NTSC system should be replaced by two-line delay processing.

For television broadcast systems and non-standard signals in which the color subcarrier phase relationship is not an inverse relationship, the phase error calculation means 26 in the phase difference calculation means 4, through the same calculation process as performed for the NTSC and PAL systems, can obtain phase error values that allow for offset so that the difference in color subcarrier phase between lines becomes 180°.

For example, if the color subcarrier phase changes by ph per line and the color subcarrier phase of the R-Y signal does not invert, as in the NTSC system, a phase error is obtained from the phase information p(k) of line k and the phase information p(k+1) of line k+1, which can be easily correlated. If the phase p(k+1) of the signal of line k+1 is p(k)+ph, the phase error δb to be corrected in the signal of line k+1 is calculated as $$\delta b = p(k+1) - p(k) - \pi$$

so that the difference in color subcarrier phase between lines becomes 180° regardless of the value of ph. The phase error δb is calculated in the same way as in the NTSC system. If the color subcarrier phase of the R-Y signal inverts on alternate lines, as in the PAL system, the phase error on line k+2 with respect to line k is calculated in the same way.

The phase error δb for a standard signal is ph−π, and the phase error δb for non-standard signals is obtained as the value of the phase offset. For non-standard composite signals obtained from reproduction by a VTR or the like, the phase offset caused by phase decay is obtained as the correction through the phase error calculation. Accordingly, non-standard signals of any television broadcast system can be supported.

If a SECAM signal is input, the necessary processing differs from the processing for the NTSC or PAL system, and in general two-dimensional Y/C separation is not performed. If the line-to-line color subcarrier phase relationship is taken into consideration, however, Y/C separation can be carried out by performing the sampling phase conversion described above.

According to the first embodiment, the phase difference calculation means 4 calculates a phase error between lines from the color subcarrier phase information of the composite signal, regardless of the television broadcast system, and even from a non-standard signal; a phase correction is obtained such that the difference in color subcarrier phase between lines becomes 180°; the sampling phase of the composite signal is corrected through sampling phase conversion; and then Y/C separation is performed. Accordingly, excellent two-dimensional Y/C separation can be performed, regardless of the line-to-line phase relationship, even with a non-standard signal, and degradation of picture quality after Y/C separation can be prevented. While the phases of the signals in lines above and below the current line are corrected, the signal of the current line is not converted, so the effect of phase correction on picture quality is small.

Figure 9:
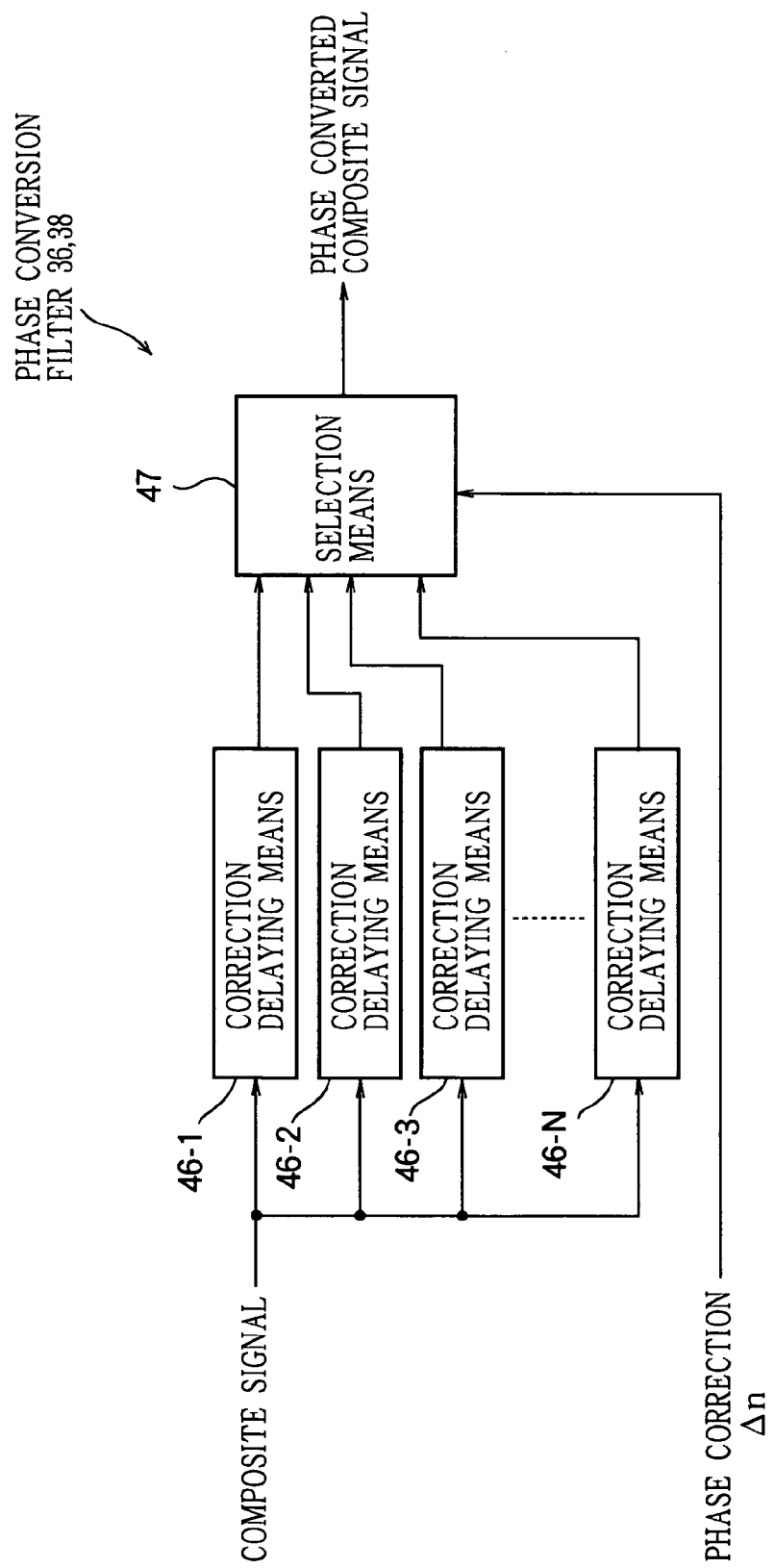
FIG. 9 is a block diagram showing another example of the structure of the phase conversion filters in the video signal processing circuit according to the first embodiment of the invention.
Figure 10:
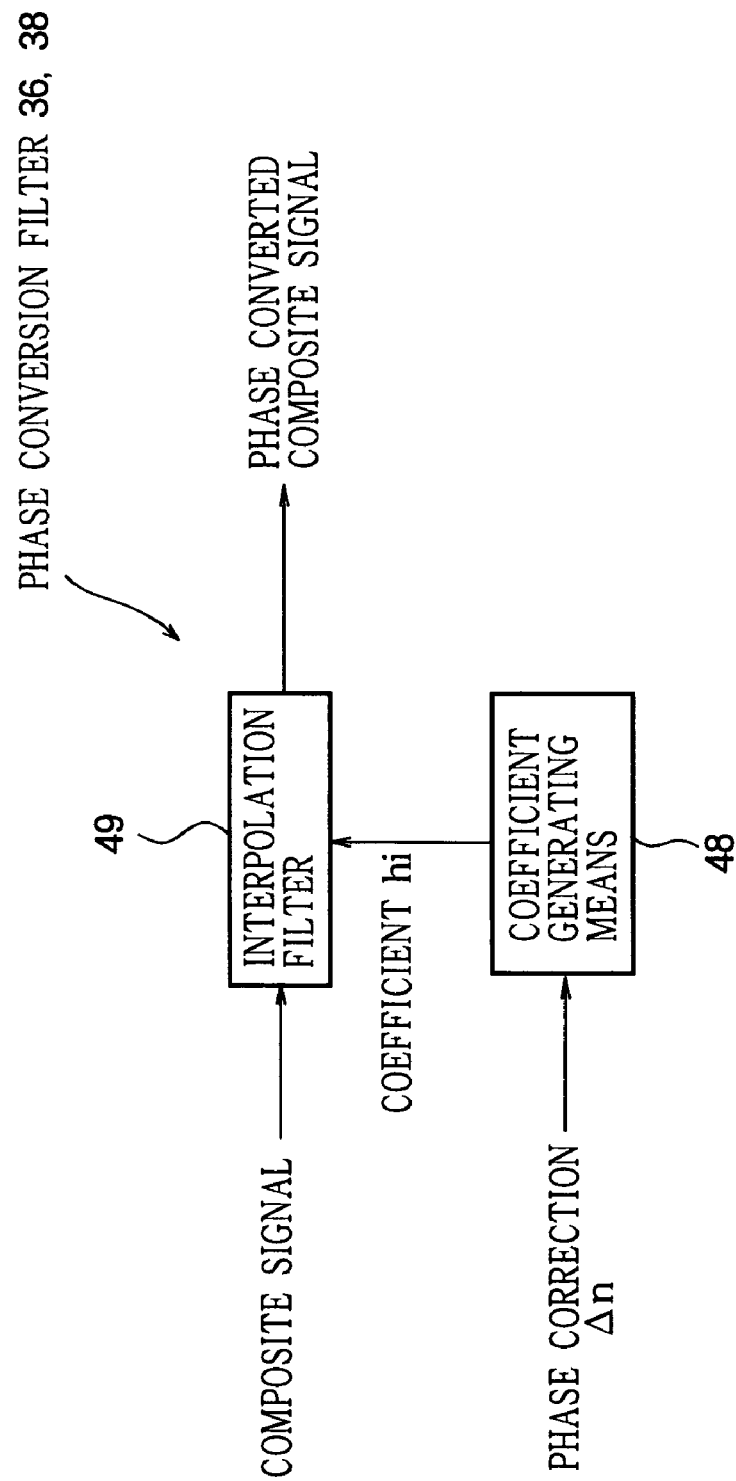
FIG. 10 is a block diagram showing yet another example of the structure of the phase conversion filters in the video signal processing circuit according to the first embodiment of the invention.

The phase conversion filters 36 and 38 in the first embodiment need not be configured as linear phase filters having a group delay corresponding to the phase correction Δn received from the phase difference calculation means 4 as shown in FIG. 5; they may be configured as shown in FIG. 9 or 10. The phase correction can also be carried out by a phase conversion filter configured as shown in FIG. 9 or 10, and good two-dimensional Y/C separation can still be performed regardless of the line-to-line phase relationship, even with a non-standard signal, preventing degradation of picture quality after Y/C separation as in the first embodiment described above.

The phase conversion filters 36 and 38 shown in FIG. 9 comprise a plurality of delaying means producing a predetermined delay and select the output of the delaying means producing a delay corresponding to the phase correction Δn. The phase conversion filters 36 and 38 comprise correction delaying means 46-1 to 46-N and a selection means 47. Each of the correction delaying means 46-1 to 46-N has a different delay within the range of the phase correction Δn and outputs the input composite signal to the selection means 47 with the corresponding delay. The selection means 47 selects a signal having a delay corresponding to the phase correction Δn from the outputs of the correction delaying means 46-1 to 46-N.

The phase conversion filters 36 and 38 shown in FIG. 10 are filters that obtain sampled data values corresponding to the shifted positions caused by the phase correction Δn through interpolation, and comprise a coefficient generating means 48 and an interpolation filter 49. The coefficient generating means 48 generates an interpolation filter coefficient hi for obtaining sampling data at positions corresponding to the phase correction Δn. The interpolation filter 49 performs interpolation in accordance with the filter coefficient hi given by the coefficient generating means 48, and obtains and outputs sampling data values corresponding to the shifted positions caused by the phase correction Δn. Therefore, the interpolation filter 49 outputs a composite signal with the phase corrected by the phase correction Δn.

The clock generating means 2 of the first embodiment generates a clock with a frequency X of 27 MHz, but a clock with any type of frequency has the same effect. Even if the clock generating means 2 of the first embodiment generates, for example, a burst locked clock based on the burst signal in the composite signal, or a line locked clock based on the horizontal sync signal in the composite signal, Y/C separation can be carried out after phase correction through sampling phase conversion and the same effects as described above can be obtained.

The Y/C separation means 9 in the first embodiment was described above as a two-dimensional Y/C separation means using a line comb filter to process signals from three lines, but the same effect as in the first embodiment above is produced when the comb filter processes signals from two lines, the signal of the current line and a one-line-delayed signal, provided sampling phase conversion of the composite signal is performed in accordance with the line-to-line color subcarrier phase relationship and a phase correction is carried out to establish the prescribed line-to-line color subcarrier phase relationship.

The burst phase detecting means 3 of the first embodiment detects the burst phase from the composite signal output from the A/D conversion means 1, but this is not a restriction. The burst signal may also be extracted in a feedback loop; provided the color subcarrier phase of the composite signal can be detected on each line, this produces the same effect as in the first embodiment above.

The timing signal generating means 6 of the first embodiment generates a timing signal hb that indicates a position in the burst signal interval in the horizontal blanking interval, but the timing signal may be generated at any position. The same effect is obtained, provided the color subcarrier phase can be detected in each position indicated by the timing signal.

The first embodiment described above is configured as hardware, but this configuration may be implemented as program-controlled software processing.

Second Embodiment

In the first embodiment described above, the line-to-line phase error was obtained from consideration of the line-to-line phase inversion of π. In a second embodiment, described below, a correction is obtained by comparing phase information for a certain line with a fixed phase value.

Figure 11:
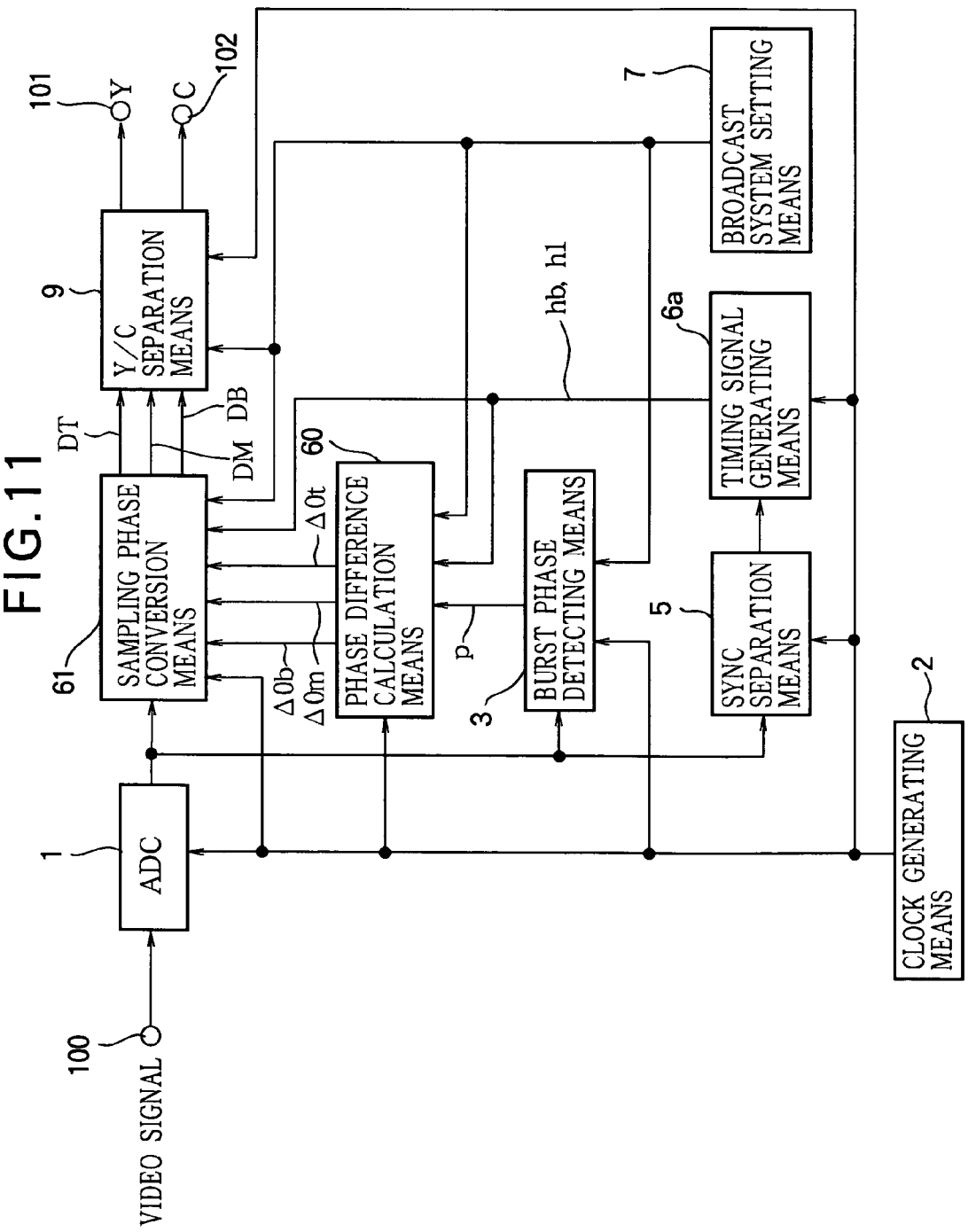
FIG. 11 is a block diagram showing an example of the structure of a video signal processing circuit according to a second embodiment of the invention.

FIG. 11 is a block diagram showing an example of the structure of a video signal processing circuit according to the second embodiment of the invention. Elements identical to elements shown FIG. 1 are denoted by the same reference numerals. As shown in FIG. 11, the video signal processing circuit of the second embodiment comprises an A/D conversion means 1, a clock generating means 2, a burst phase detecting means 3, a sync separation means 5, a timing signal generating means 6a, a broadcast system setting means 7, a Y/C separation means 9, a phase difference calculation means 60, a sampling phase conversion means 61, an input terminal 100, and output terminals 101, 102.

The video signal processing circuit of the second embodiment differs from the video signal processing circuit of the first embodiment (see FIG. 1) in that the phase difference calculation means 4 is replaced by the phase difference calculation means 60, the timing signal generating means 6 is replaced by the timing signal generating means 6a, and the sampling phase conversion means 8 is replaced by the sampling phase conversion means 61. The configuration and operation of the parts other than the timing signal generating means 6a, phase difference calculation means 60, and sampling phase conversion means 61 are the same as in the first embodiment.

Timing Signal Generating Means 6a

The timing signal generating means 6a generates a timing signals based on the sync signal supplied from the sync separation means 5, and outputs the timing signals to the phase difference calculation means 60 and sampling phase conversion means 61. The timing signals generated here are a timing signal hb which indicates a sampling position in the burst signal interval of the horizontal blanking interval in accordance with the horizontal sync signal and a timing signal h1 which indicates a line number (line position) in the input composite signal, such as a per-frame line number (0 to 524 in the NTSC system or 0 to 624 in the PAL system).

Phase Difference Calculation Means 60

The phase difference calculation means 60 calculates a phase error from a reference phase (a fixed phase value predetermined by the line position) in accordance with color subcarrier phase information p input from the NCO 14 (see FIG. 2) in the burst phase detecting means 3, with respect to the target line and lines thereabove and therebelow, and outputs phase corrections Δθm, Δθb, and Δθt to the sampling phase conversion means 61.

Figure 12:
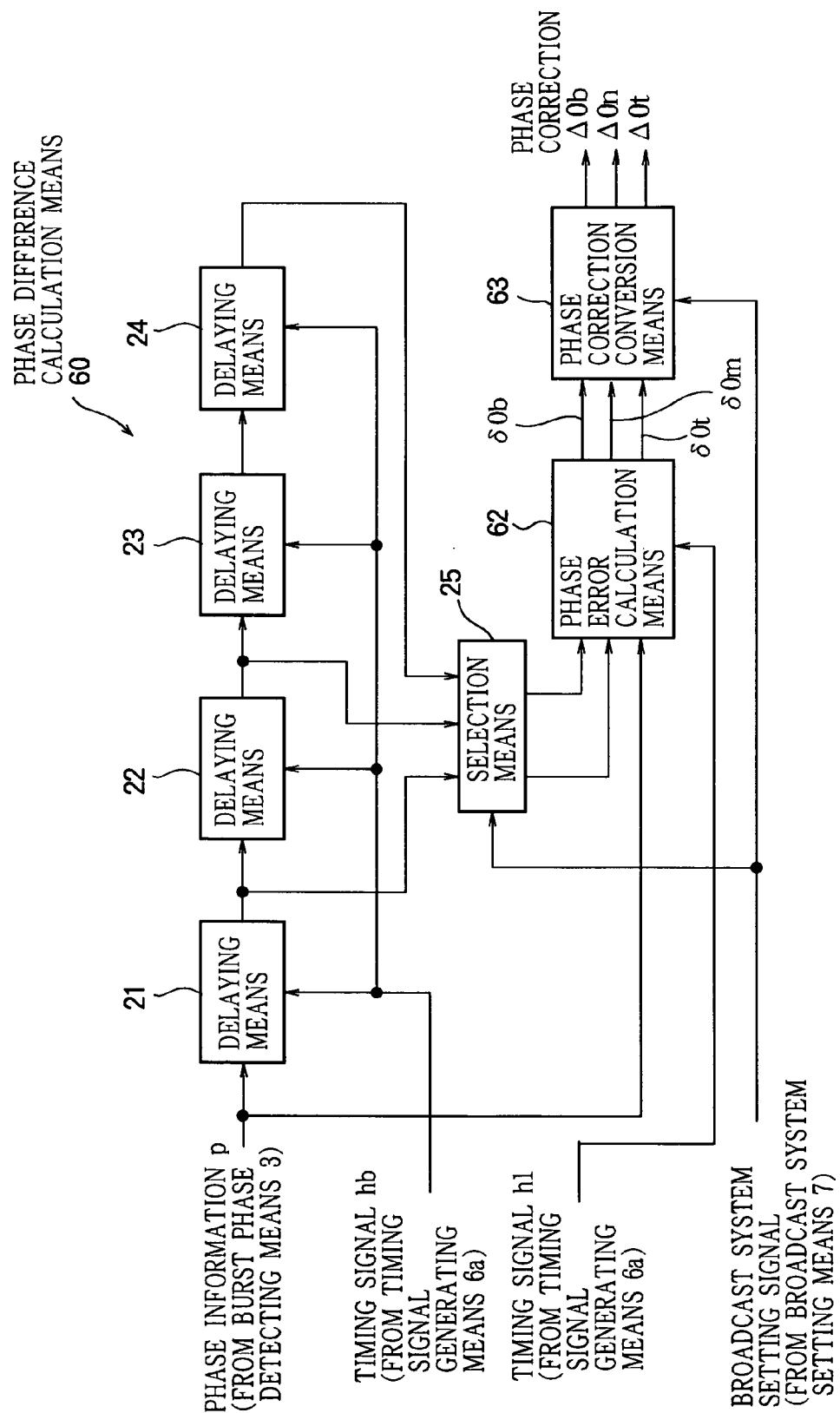
FIG. 12 is a block diagram showing an example of the structure of the phase difference calculation means in the video signal processing circuit according to the second embodiment of the invention.

FIG. 12 is a block diagram showing an example of the structure of the phase difference calculation means 60. Elements identical to elements in the phase difference calculation means 4 shown in FIG. 3 are denoted by the same reference numerals. As shown in FIG. 12, the phase difference calculation means 60 comprises delaying means 21, 22, 23, 24, a selection means 25, a phase error calculation means 62, and a phase correction conversion means 63.

The phase difference calculation means 60 of the second embodiment differs from the phase difference calculation means 4 of the first embodiment in that the phase error calculation means 26 is replaced by the phase error calculation means 62, and the phase correction conversion means 27 is replaced by the phase correction conversion means 63. The configuration and operation of the parts other than the phase error calculation means 62 and the phase correction conversion means 63 are the same as in the phase difference calculation means 4 of the first embodiment.

In the phase difference calculation means 60 shown in FIG. 12, the phase error calculation means 62 is supplied with phase information p from the burst phase detecting means 3 and two items of phase information p from the selection means 25, as well as timing signal h1 from the timing signal generating means 6a and the television broadcast system specification signal from the broadcast system setting means 7.

The phase error calculation means 62 obtains phase differences from fixed reference phases based on timing signal h1 indicating the phase of the input line signal, the selected television broadcast system, and the line number of the input signal, from phase information p for the three lines supplied from the burst phase detecting means 3 and selection means 25, as phase errors δθm, δθb, and δθt to be corrected, and outputs them to the phase correction conversion means 63.

The phase correction conversion means 63 converts phase errors δθm, δθb, and δθt from the phase error calculation means 62 to phase corrections Δθm, Δθb, and Δθt to be used for phase correction, and outputs them to the sampling phase conversion means 61.

Since the phase information p indicates an angle, where one period of the color subcarrier corresponds to $2\pi$, the conversion process performed by the phase correction conversion means 63 converts the phase errors $\delta 0m$, $\delta 0b$, and $\delta 0t$ output from the phase error calculation means 62 to values representing time with reference to one period of the clock with a frequency X of 27 MHz, (time represented as a multiple of the period of clock with frequency X). If the change $\omega$ expressed in color subcarrier phase angle per clock period is $2\pi \times \mathrm{fsc}/X$, where fsc is the color subcarrier frequency, the phase corrections $\Delta 0m$, $\Delta 0b$, and $\Delta 0t$ obtained by conversion of the phase errors $\delta 0m$, $\delta 0b$, and $\delta 0t$ are expressed as follows:

$\Delta 0m = \delta m/\omega$ $\Delta 0b = \delta b/\omega$ $\Delta 0t = \delta t/\omega$ If the phase errors $\delta 0m$, $\delta 0b$, and $\delta 0t$ range from $-\pi$ to $+\pi$, the phase corrections $\Delta 0m$, $\Delta 0b$, and $\Delta 0t$ take on values from $-X/(2\times \mathrm{fsc})$ to $X/(2\times \mathrm{fsc})$ Sampling Phase Conversion Means 61

The sampling phase conversion means 61 obtains, for example, digital composite signals for three lines (the target line and lines thereabove and therebelow) from the A/D conversion means 1 as the signals to be used for Y/C separation, corrects the phases of the composite signals of the three lines by phase corrections $\Delta 0m$, $\Delta 0b$, and $\Delta 0t$ obtained from the phase difference calculation means 60, and outputs the phase-corrected composite signals DT, DM, and DB for the three lines to the Y/C separation means 9.

Figure 13:
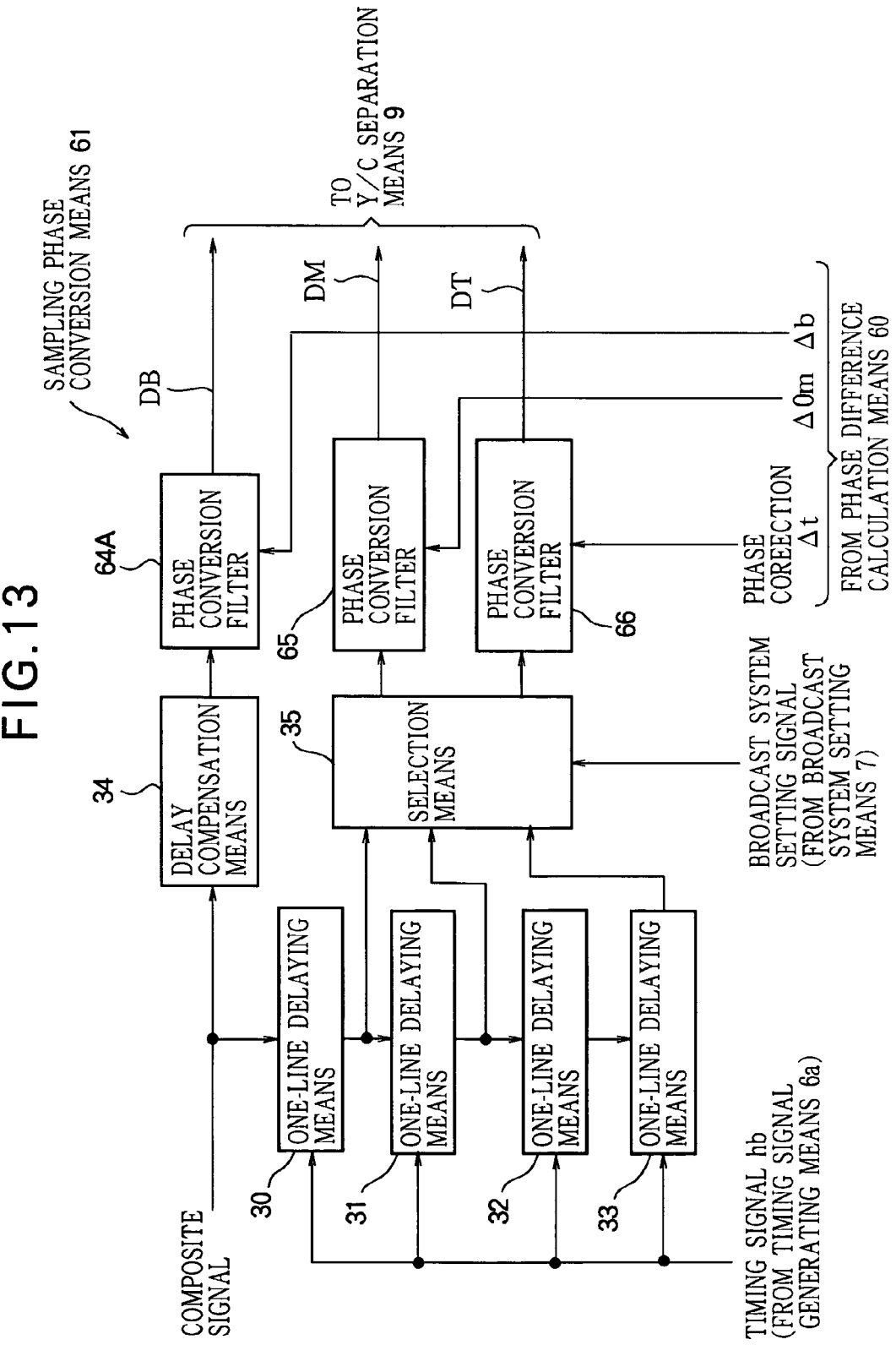
FIG. 13 is a block diagram showing an example of the structure of the sampling phase conversion means in the video signal processing circuit according to the second embodiment of the invention.

FIG. 13 is a block diagram showing an example of the structure of the sampling phase conversion means 61, denoting elements identical to elements of the sampling phase conversion means 8 in FIG. 4 by the same reference numerals. As shown in FIG. 13, the sampling phase conversion means 61 comprises one-line delaying means 30, 31, 32, 33, a delay compensation means 34, a selection means 35, and phase conversion filters 64, 65, 66.

The sampling phase conversion means 61 of the second embodiment differs from the sampling phase conversion means 8 (see FIG. 4) of the first embodiment in that phase conversion filter 36 is replaced by phase conversion filter 64, delay compensation means 37 is replaced by phase conversion filter 65, and phase conversion filter 38 is replaced by phase conversion filter 66. The configuration and operation of the parts other than the phase conversion filters 64, 65, and 66 are the same as in the sampling phase conversion means 8 in the first embodiment. The phase conversion filters 64, 65, and 66 are configured and operate in the same way as the phase conversion filters 36 and 38 (see FIGS. 5, 9, and 10) of the first embodiment, for example.

In the sampling phase conversion means 61 shown in FIG. 13, phase conversion filter 64 receives phase correction $\Delta 0b$ from the phase difference calculation means 60, phase conversion filter 65 receives phase correction $\Delta 0m$ from the phase difference calculation means 60, and phase conversion filter 66 receives phase correction $\Delta 0t$ from the phase difference calculation means 60.

Phase conversion filter 64 corrects the phase of the composite signal from delay compensation means 34 in accordance with phase correction $\Delta 0b$ from the phase difference calculation means 60, and outputs the signal to the Y/C separation means 9 as composite signal DB. Phase conversion filter 65 corrects the phase of the composite signal from the selection means 35 in accordance with phase correction $\Delta 0m$ from the phase difference calculation means 60, and outputs the signal to the Y/C separation means 9 as composite signal DM. Phase conversion filter 66 corrects the phase of the composite signal from the selection means 35 in accordance with phase correction $\Delta 0t$ from the phase difference calculation means 60, and outputs the signal to the Y/C separation means 9 as composite signal DT.

Phase corrections $\Delta 0m$, $\Delta 0b$, and $\Delta 0t$ are phase corrections with respect to reference color subcarrier phases on the three lines. The phase corrections have been converted to values based on the period of the clock with a frequency X of 27 MHz. The signals of the three lines input to the phase conversion filters 64, 65, and 66 are delayed by $\Delta 0m$, $\Delta 0b$, and $\Delta 0t$, respectively, thereby converting the sampling phases and correcting the phases.

Operation when an NTSC Composite Signal is Input

When an NTSC composite video signal is input to the input terminal 100, the following operations are performed. In an NTSC composite signal, the color subcarrier phase inverts by $180°$ ($=\pi$) on alternate lines. If the target line is line k, the color subcarrier phase of line k is inverse to the color subcarrier phase on line k−1 one line above and line k+1 one line below.

In the phase difference calculation means 60, the selection means 25 selects the color subcarrier phase information p(k−1) for line k−1, one line above line k on the screen, and the color subcarrier phase information p(k+1) for line k+1, one line below line k on the screen. The phase error calculation means 62 receives the phase information p(k−1) and p(k+1) together with the color subcarrier phase information p(k) for line k.

In the NTSC system, the color subcarrier phase inverts by $180°$ on alternate lines. If even-numbered lines (lines 0, 2, and so on) have a phase of $0°$, odd-numbered lines (lines 1, 3, and so on) have a phase of $180°$. Taking this into consideration, the phase error calculation means 62 in the phase difference calculation means 60 sets the comparison reference phase value to $0°$ for even-numbered lines and to $180°$ for odd-numbered lines, switches the values at intervals of two lines in accordance with the selected television broadcast system and the timing signal h1 indicating the line number of the input signal, and calculates phase differences between the color subcarrier phase information p(k−1), p(k), and p(k+1) of lines k−1, k, and k+1 and the reference phases as phase errors $\delta 0t$, $\delta 0m$, and $\delta 0b$ to be corrected on lines k−1, k, and k+1, respectively.

If line k is an odd-numbered line, the phase error $\delta 0m$ to be corrected for the signal of line k is obtained as follows:

$\delta 0m = p(k) - \pi$

The phase error $\delta 0b$ to be corrected for the signal of line k+1 one line below is obtained as follows:

$\delta 0b = p(k+1) - 0$

The phase error $\delta 0t$ to be corrected for the signal of line k−1 one line above is obtained as follows:

$\delta 0t = p(k-1) - 0$

The last terms $-\pi$, $-0$, and $-0$ correspond to fixed reference phases depending on the line position. Phase differences between the phase information p(k−1), p(k), and p(k+1) of lines k−1, k, and k+1 and the fixed reference phases are obtained as phase errors $\delta 0t$, $\delta 0m$, and $\delta 0b$, respectively.

If line k is an even-numbered line, the phase error $\delta 0m$ to be corrected for the signal of line k is obtained as follows:

$$\delta 0m = p(k) - 0$$

The phase error $\delta 0b$ to be corrected for the signal of line k+1 one line below is obtained as follows:

$$\delta 0b = p(k+1) - \pi$$

The phase error $\delta 0t$ to be corrected for the signal of line k−1 one line above is obtained as follows:

$$\delta 0t = p(k-1) - \pi$$

The last terms −0, −π, and −π correspond to fixed reference phases depending on the line position. Phase differences between the phase information p(k−1), p(k), and p(k+1) of lines k−1, k, and k+1 and the fixed reference phases are obtained as phase errors $\delta 0t$, $\delta 0m$, and $\delta 0b$, respectively.

For a standard NTSC input signal with a line-to-line phase inversion of 180°, phase errors $\delta 0t$, $\delta 0m$, and $\delta 0b$ are all zero. For a non-standard signal, values equivalent to phase offsets from the reference phases on the individual lines are obtained as phase errors $\delta 0t$, $\delta 0m$, and $\delta 0b$.

The phase correction conversion means 63 in the phase difference calculation means 60 obtains the amount of change ω(NTSC) in NTSC color subcarrier phase per clock in accordance with the NTSC color subcarrier frequency fsc(NTSC) as follows, $$\omega(NTSC) = 2\pi \times fsc(NTSC)/X$$

and converts phase errors $\delta 0m$, $\delta 0b$, and $\delta 0t$ to phase corrections $\Delta 0m$, $\Delta 0b$, and $\Delta 0t$ as follows:

$$\Delta 0m = \delta 0m / \omega(NTSC)$$

$$\Delta 0b = \delta 0b / \omega(NTSC)$$

$$\Delta 0t = \delta 0t / \omega(NTSC)$$

In the sampling phase conversion means 61, when the composite signal of line k+1 (the line immediately below line k on the screen) is supplied through delay compensation means 34 to phase conversion filter 64, the selection means 35 selects the composite signal of line k supplied through one-line delaying means 30 and the composite signal of line k−1 (the line immediately above line k on the screen) supplied through one-line delaying means 31. The composite signal of line k is output to phase conversion filter 65, and the composite signal of line k−1 is output to phase conversion filter 66.

The phase conversion filters 64, 65, and 66 correct the phases of the composite signals of lines k+1, k, and k−1 in accordance with respective phase corrections $\Delta 0b$, $\Delta 0m$, and $\Delta 0t$. The composite signal DT of line k−1 with its phase corrected by phase conversion filter 66, the composite signal DM of line k with its phase corrected by phase conversion filter 65, and the composite signal DB of line k +1 with its phase corrected by phase conversion filter 64 are output to the Y/C separation means 9.

The sampling data of the composite signal DT of line k−1 and the composite signal DB of line k+1 are corrected so that they are 180° (=π) out of phase with the sampling data of the composite signal DM of line k.

Non-standard NTSC signals are processed in the same way. The phases of the composite signals of lines k+1, k, and k−1 are corrected by phase corrections $\Delta 0b$, $\Delta 0m$, and $\Delta 0t$, respectively. The sampling data of the composite signals DT, DM, and DB of lines k−1, k, and k+1 are output from the sampling phase conversion means 61 with their phases corrected to invert between lines.

In the Y/C separation means 9, a C signal is extracted from the composite signals DB, DM, and DT of lines k+1, k, and k−1 in accordance with the NTSC color subcarrier frequency fsc(NTSC), and the Y and C signals are separated.

Operation when a PAL Composite Signal is Input

When a PAL composite video signal is input to the input terminal 100, the following operations are performed. In a PAL composite signal, the color subcarrier phase changes by 270° (that is, −90°) at each line. The phase inverts by 180° (=π) at intervals of two lines. If the target line is line k, the color subcarrier phase of line k is inverse to the color subcarrier phase on line k−2 two lines above and line k+2 two lines below. In the PAL system, the color subcarrier phase of the R-Y signal is inverted by 180° at each line.

In the phase difference calculation means 60, the selection means 25 selects the color subcarrier phase information p(k−2) for line k−2, two lines above line k on the screen, and the color subcarrier phase information p(k+2) for line k+2, two lines below line k on the screen. The phase error calculation means 62 receives the phase information p(k−2) and p(k+2) together with the color subcarrier phase information p(k) for line k.

In the PAL system, the phase changes successively in a cycle of four lines (changes in a four-line sequence). When the phases of the first lines (lines 0, 4, and so on) are 0°, the phases of the second lines (lines 1, 5, and so on) are 270° (=3π/2), the phases of the third lines (lines 2, 6, and so on) are 180°, and the phases of the fourth lines (lines 3, 7, and so on) are 90° (=π/2). The color subcarrier phase of the R-Y signal inverts by 180° at each line. Taking this into consideration, the phase error calculation means 62 in the phase difference calculation means 60 changes the value of the comparison reference phase at intervals of four lines, in accordance with the selected television broadcast system and the timing signal h1 indicating the line number of the input signal, and calculates phase differences between color subcarrier phase information p(k−2), p(k), and p(k+2) of lines k−2, k, and line k+2 with the reference phases as phase errors $\delta 0t$, $\delta 0m$, and $\delta 0b$ to be corrected on lines k−2, k, and k+2, respectively.

If line k is the first line of the four-line sequence, the phase error $\delta 0m$ to be corrected for the signal of line k is obtained as follows:

$$\delta 0m = p(k) - 0$$

The phase error $\delta 0b$ to be corrected for the signal of line k+2 two lines below is obtained as follows:

$$\delta 0b = p(k+2) - \pi$$

The phase error $\delta 0t$ to be corrected for the signal of line k−2 two lines above is obtained as follows:

$$\delta 0t = p(k-2) - \pi$$

The last terms −0, −π, and −π correspond to the fixed reference phases depending on the line position. Phase differences between the phase information p(k−2), p(k), and p(k+2) of lines k−2, k, and k+2 and the fixed reference phases are obtained as phase errors $\delta 0t$, $\delta 0m$, and $\delta 0b$, respectively.

If line k is the second line of the four-line sequence, the phase error $\delta 0m$ to be corrected for the signal of line k is obtained as follows:

$$\delta 0m = p(k) - 3\pi/2$$

The phase error $\delta 0b$ to be corrected for the signal of line k+2 two lines below is obtained as follows:

$$\delta 0b = p(k+2) - \pi/2$$

The phase error $\delta 0t$ to be corrected for the signal of line k−2 two lines above is obtained as follows:

$$\delta 0t = p(k-2) - \pi/2$$

The last terms −3π/2, −π/2, and −π/2 correspond to the fixed reference phases depending on the line position. Phase differences between the phase information p(k−2), p(k), and p(k+2) of lines k−2, k, and k+2 and the fixed reference phases are obtained as phase errors $\delta 0t$, $\delta 0m$, and $\delta 0b$, respectively.

If line k is the third line of the four-line sequence, the phase error $\delta 0m$ to be corrected for the signal of line k is obtained as follows:

$$\delta 0m = p(k) - \pi$$

The phase error $\delta 0b$ to be corrected for the signal of line k+2 two lines below is obtained as follows:

$$\delta 0b = p(k+2) - 0$$

The phase error $\delta 0t$ to be corrected for the signal of line k−2 two lines above is obtained as follows:

$$\delta 0t = p(k-2) - 0$$

The last terms −π, −0, and −0 correspond to the fixed reference phases depending on the line position. Phase differences between the phase information p(k−2), p(k), and p(k+2) of lines k−2, k, and k+2 and the fixed reference phases are obtained as phase errors $\delta 0t$, $\delta 0m$, and $\delta 0b$, respectively.

If line k is the fourth line of the four-line sequence, the phase error $\delta 0m$ to be corrected for the signal of line k is obtained as follows:

$$\delta 0m = p(k) - \pi/2$$

The phase error $\delta 0b$ to be corrected for the signal of line k+2 two lines below is obtained as follows:

$$\delta 0b = p(k+2) - 3\pi/2$$

The phase error $\delta 0t$ to be corrected for the signal of line k−2 two lines above is obtained as follows:

$$\delta 0t = p(k-2) - 3\pi/2$$

The last terms −π/2, −3π/2, and −3π/2 correspond to the fixed reference phases depending on the line position. Phase differences between the phase information p(k−2), p(k), and p(k+2) of lines k−2, k, and k+2 and the fixed reference phases are obtained as phase errors $\delta 0t$, $\delta 0m$, and $\delta 0b$, respectively.

For a standard PAL input signal with phase inverted by 180° at intervals of two lines, phase errors $\delta 0m$, $\delta 0b$, and $\delta 0t$ are all zero. For a non-standard signal, values equivalent to offsets from the reference phases of the individual lines are obtained as phase errors $\delta 0m$, $\delta 0b$, and $\delta 0t$.

The phase correction conversion means 63 in the phase difference calculation means 60 obtains the change ω(PAL) in PAL color subcarrier phase per clock in accordance with the PAL color subcarrier frequency fsc (PAL) as follows:

$$\omega(PAL) = 2\pi \times fsc(PAL)/X$$

and converts phase errors $\delta 0m$, $\delta 0b$, and $\delta 0t$ to phase corrections $\Delta 0m$, $\Delta 0b$, and $\Delta 0t$ as follows:

$$\Delta 0m = \delta 0m/\omega(PAL)$$

$$\Delta 0b = \delta 0b/\omega(PAL)$$

$$\Delta 0t = \delta 0t/\omega(PAL)$$

In the sampling phase conversion means 61, when the composite signal of line k+2 (the second line below line k on the screen) is supplied through delay compensation means 34 to phase conversion filter 36, the composite signal of line k input from the one-line delaying means 31 and the composite signal of line k−2 (the second line above line k on the screen) input from the one-line delaying means 33 are selected by the selection means 35. The composite signal of line k is supplied to phase conversion filter 65, and the composite signal of line k−2 is supplied to phase conversion filter 66.

The phase conversion filters 64, 65, and 66 in the sampling phase conversion means 61 correct the phases of the composite signals of lines k+2, k, and k−2 in accordance with phase corrections $\Delta 0b$, $\Delta 0m$ and $\Delta 0t$, respectively. The composite signal DT of line k−2 with its phase corrected by phase conversion filter 66, the composite signal DM of line k with its phase corrected by phase conversion filter 65, and the composite signal DB of line k+2 with its phase corrected by phase conversion filter 64 are output to the Y/C separation means 9.

The sampling data of the composite signal DT of line k−2 and the composite signal DB of line k+2 are corrected to be 180° (=π) out of phase with the sampling data of the composite signal DM of line k.

Non-standard PAL signals are processed in the same way. The phases of the composite signals DB, DM, and DT of lines k+2, k, and k−2 are corrected by phase corrections $\Delta 0b$, $\Delta 0m$, and $\Delta 0t$, respectively. The sampling data of the composite signals DT, DM, and DB of lines k−2, k, and k+2 are output from the sampling phase conversion means 61 with their phases corrected to invert between lines.

In the Y/C separation means 9, a C signal is extracted from the composite signals DB, DM, and DT of lines k+2, k, and k−2 in accordance with the PAL color subcarrier frequency fsc (PAL), and the Y and C signals are separated.

In the NTSC system, the phase difference calculation means 60 calculates phase errors from the reference phases on the target line and the lines immediately above and below the target line in accordance with color subcarrier phase information p, and outputs phase corrections $\Delta 0b$, $\Delta 0m$, and $\Delta 0t$. In the PAL system, the phase difference calculation means 60 detects phase errors from the reference phases on the target line and the lines two lines above and below the target line in accordance with color subcarrier phase information p, and outputs phase corrections $\Delta 0b$, $\Delta 0m$, and $\Delta 0t$.

In the NTSC system, the sampling phase conversion means 61 corrects the phases of the composite signals of lines k−1, k, and k+1 by phase corrections $\Delta 0b$, $\Delta 0m$, and $\Delta t$, and outputs composite signals DT, DM, and DB for the three lines k−1, k, and k+1. In the PAL system, the sampling phase conversion means 61 corrects the phases of the composite signals of lines k−2, k, and k+2, and outputs composite signals DT, DM, and DB for the three lines k−2, k, and k+2.

In the above calculation of phase errors $\delta 0m$, $\delta 0b$, and $\delta 0t$, the reference phase values are set to 0° or 180°, but the reference phase values can be set to other values that represent the color subcarrier phase and the line-to-line phase relationship with respect to the sampling positions extracted for the corresponding lines, and that allow for offset so that the difference in color subcarrier phase between lines becomes 180°.

If the phase error calculation means 62 in the phase difference calculation means 60 obtains the phase error to be corrected from the line-to-line phase information and the reference phase so that Y/C separation can be performed on the assumption of a 180° inversion of the color subcarrier phase between lines, the sampling phase conversion means 61 can correct the phase for other television broadcast systems such as PAL-N, PAL-M, and NTSC-4.43, and these television broadcast systems can also be easily supported.

For television broadcast systems and non-standard signals in which the color subcarrier phase relationship is not an inverse relationship, the phase error calculation means 62 in the phase difference calculation means 60, through the same calculation process as performed for the NTSC and PAL systems, can obtain phase error values that allow for offset so that the difference in color subcarrier phase between lines becomes 180°.

If a SECAM signal is input, the necessary processing differs from the processing for the NTSC or PAL system, and in general two-dimensional Y/C separation is not performed. If the line-to-line color subcarrier phase relationship is taken into consideration, however, Y/C separation can be carried out by performing the sampling phase conversion described above.

According to the second embodiment, the phase difference calculation means 60 calculates phase errors from the reference phase values for the individual lines from the color subcarrier phase information of the composite signals, regardless of the television broadcast system, and even from a non-standard signal; a phase correction is obtained such that the difference in color subcarrier phase between lines becomes 180°; the sampling phase of the composite signal is corrected through sampling phase conversion; and then Y/C separation is performed. Accordingly, excellent two-dimensional Y/C separation can be performed, regardless of the line-to-line phase relationship, even with a non-standard signal, and degradation of picture quality after Y/C separation can be prevented. Since the phase in a line is compared with a fixed reference phase, the phase error calculation can be structured as the subtraction of a fixed value, so the circuit can be configured easily.

The timing signal generating means 6a of the second embodiment generates a timing signal hb which indicates a position in the burst signal interval of the horizontal blanking interval and a timing signal h1 which indicates a line number in a frame, but the timing signal hb for detecting the color subcarrier phase may be generated at any position. The same effect is obtained as in the second embodiment above, provided the color subcarrier phase is detected in each position indicated by the timing signal. Timing signal h1, which indicates a line number in a frame, can be any timing signal that repeats according to the change in the color subcarrier phase from line to line; the same effect is produced, provided the signal enables odd-numbered lines and even-number lines to be discriminated in the NTSC system, and indicates the four-line sequence in the PAL system.

The second embodiment described above is configured as hardware, but this configuration may be implemented as program-controlled software processing.

Third Embodiment

In the first and second embodiments described above, the phase of the video signal was corrected by the phase correction output from the phase difference calculation means. In a third embodiment, described below, the phase of the sampling clock is corrected by the phase correction output from the phase difference calculation means, thereby providing the video signal with the phase relationship used in Y/C separation.

Figure 14:
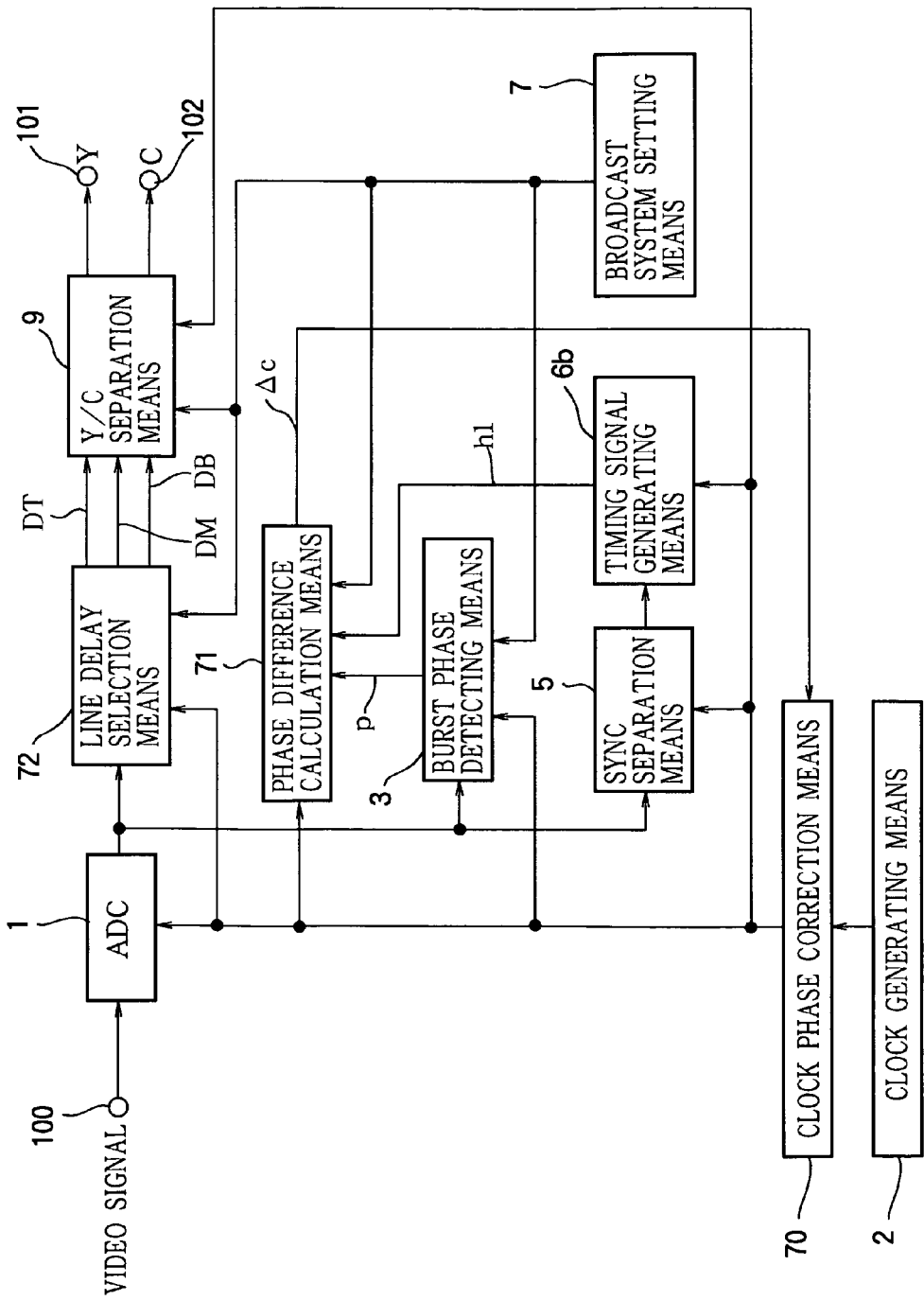
FIG. 14 is a block diagram showing an example of the structure of a video signal processing circuit according to a third embodiment of the invention.

FIG. 14 is a block diagram showing an example of the structure of a video signal processing circuit according to the third embodiment of the invention, denoting elements identical to elements shown in FIG. 1 or 11 by the same reference numerals. As shown in FIG. 14, the video signal processing circuit of the third embodiment comprises an A/D conversion means 1, a clock generating means 2, a burst phase detecting means 3, a sync separation means 5, a timing signal generating means 6b, a broadcast system setting means 7, a Y/C separation means 9, a clock phase correction means 70, a phase difference calculation means 71, a line delay selection means 72, an input terminal 100, and output terminals 101, 102.

The video signal processing circuit of the third embodiment differs from the video signal processing circuit of the first or second embodiment (see FIG. 1 or 11) in that the phase difference calculation means 4 or 60 is replaced by the phase difference calculation means 71, the timing signal generating means 6 or 6a is replaced by the timing signal generating means 6b, and the clock phase correction means 70 and line delay selection means 72 are provided as a means equivalent to the sampling phase conversion means 8. The configuration and operation of the parts other than the timing signal generating means 6b, clock phase correction means 70, phase difference calculation means 71, and line delay selection means 72 are the same as in the first or second embodiment described above.

Clock Phase Correction Means 70

The clock phase correction means 70 corrects the phase of a clock generated by the clock generating means 2 by imparting a delay corresponding to a phase correction Δc supplied from the phase difference calculation means 71 to a clock with a prescribed frequency X from the clock generating means 2, and supplies the phase-corrected clock to the A/D conversion means 1, burst phase detecting means 3, sync separation means 5, timing signal generating means 6b, Y/C separation means 9, phase difference calculation means 71, and line delay selection means 72.

Accordingly, the A/D conversion means 1, burst phase detecting means 3, sync separation means 5, timing signal generating means 6b, Y/C separation means 9, phase difference calculation means 71, and line delay selection means 72, operate on a clock with a phase corrected by the clock phase correction means 70.

Timing Signal Generating Means 6b

The timing signal generating means 6b generates a timing signal h1 based on the sync signal supplied from the sync separation means 5, and outputs the timing signal to the phase difference calculation means 71. The timing signal hi indicates a line number (line position) in the input composite signal, such as a per-frame line number (0 to 524 in the NTSC system or 0 to 624 in the PAL system), in accordance with the horizontal sync signal.

Phase Difference Calculation Means 71

From the color subcarrier phase information p input from the NCO 14 (see FIG. 2) in the burst phase detecting means 3, the phase difference calculation means 71 calculates the phase error from a reference phase (a predetermined fixed phase value depending on the line position) for the target line, and outputs the phase correction Δc to the clock phase correction means 70.

Figure 15:
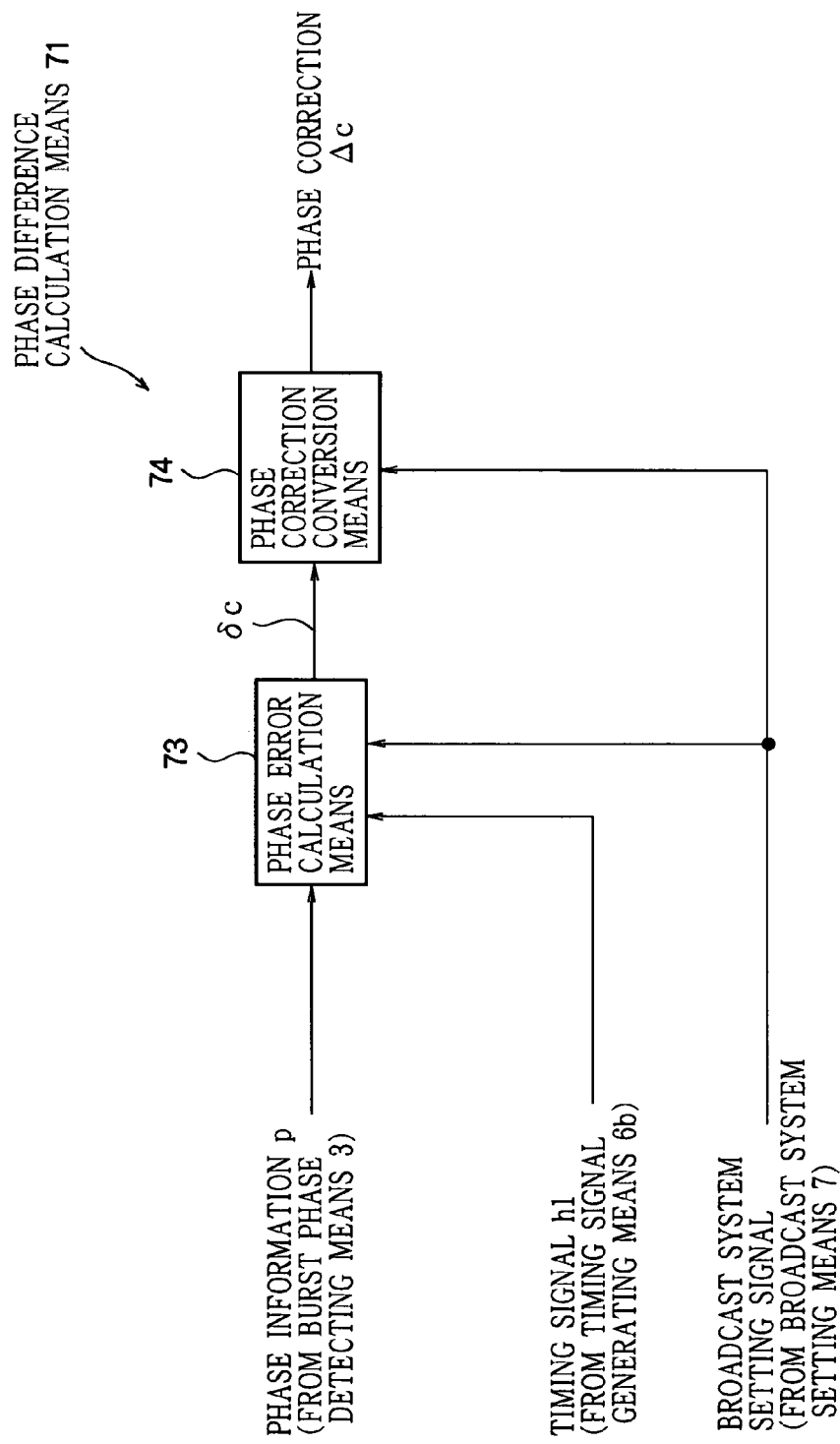
FIG. 15 is a block diagram showing an example of the structure of the phase difference calculation means in the video signal processing circuit according to the third embodiment of the invention.

FIG. 15 is a block diagram showing an example of the structure of the phase difference calculation means 71. As shown in the drawing, the phase difference calculation means 71 comprises a phase error calculation means 73 and a phase correction conversion means 74.

In the phase difference calculation means 71 shown in FIG. 15, the phase error calculation means 73 is supplied with phase information p from the burst phase detecting means 3, the timing signal h1 from the timing signal generating means 6b, and the television broadcast system specification signal from the broadcast system setting means 7.

The phase error calculation means 73 obtains the phase difference between the phase of the input line signal, which is obtained from the phase information p of the target line supplied by the burst phase detecting means 3, and the fixed reference phase based on the selected television broadcast system and the timing signal h1 indicating the line number of the input signal, and outputs the phase error δc to be corrected to the phase correction conversion means 74.

The phase correction conversion means 74 converts the phase error δc supplied from the phase error calculation means 73 to a phase correction Δc applicable for the purpose of phase correction, and outputs it to the clock phase correction means 70. The procedure for converting the phase error δc to the phase correction Δc is the same as the procedure for converting the phase error δ0m to the phase correction Δ0m in the phase correction conversion means 63 (see FIG. 12) in the second embodiment, and will not be described here in detail.

The A/D conversion means 1 samples the input composite signal on a clock with its phase corrected by the clock phase correction means 70 in accordance with the phase correction Δc, so that sampling data for a line in which the phase correction is Δc is sampled by the A/D conversion means 1 as data corrected by phase correction Δc, and consequently, a composite signal with its phase corrected by the phase correction Δc is supplied from the A/D conversion means 1 to the line delay selection means 72.

Figure 16:
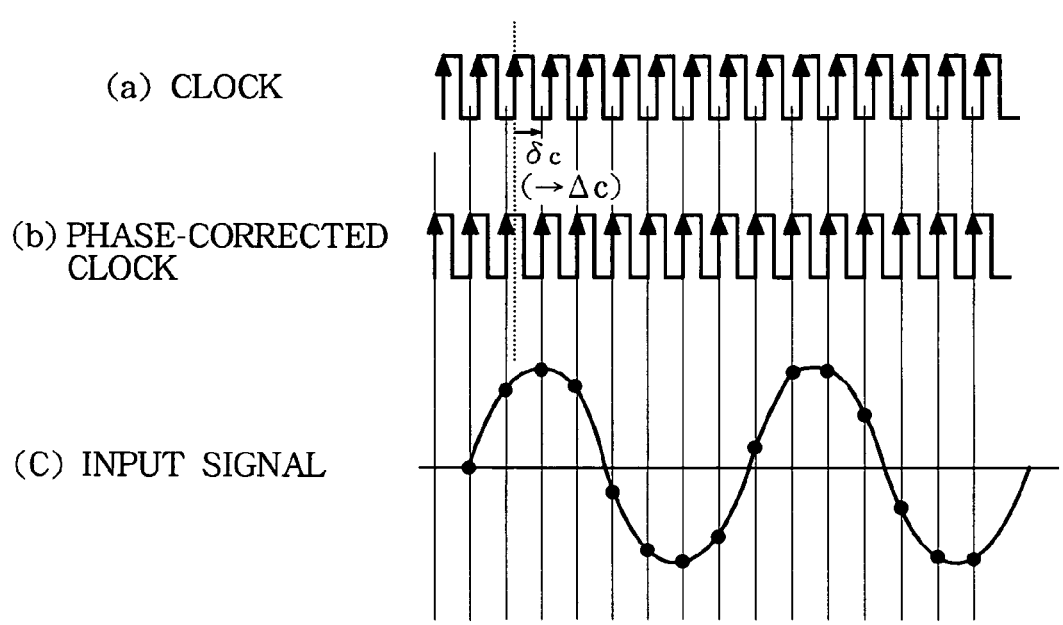
FIGS. 16(a)-(c) are diagrams illustrating a clock phase correction according to the third embodiment of the invention.

As has been described above, the phase difference calculation means 71 compares the burst signal phase information p of each line with the fixed reference phase specified for the line, and obtains the phase error δc (phase correction Δc). The clock phase correction means 70 compares the sampling phase of the signal in each line with the reference phase of the line, obtains the phase error δc for the line, and corrects the sampling clock phase of the line by the phase error δc. That is, the phase of the clock (FIG. 16(a)) output from the clock generating means 2 in FIG. 14 is corrected, and the corrected clock (FIG. 16(b)) is generated. A/D conversion of the input signal (FIG. 16(c)) is performed on the corrected clock (FIG. 16(b)). For NTSC signals, the reference phase value changes at intervals of two lines, being 0° for even-numbered lines and 180° for odd-numbered lines.

Line Delay Selection Means 72

From among the digital composite signals sampled on the phase-corrected clock, the line delay selection means 72 obtains digital composite signals for three lines, for example, from the A/D conversion means 1 as the signals to be used for Y/C separation, and outputs phase-corrected composite signals DT, DM, and DB for the three lines to the Y/C separation means 9. In the third embodiment, the line delay selection means 72 and clock phase correction means 70 form a sampling phase conversion means. Accordingly, the phase of the sampling clock is corrected in accordance with the phase error of the burst signal with reference to the reference value obtained from the phase information, and the sampling phase is corrected so that the video signal obtained by A/D conversion using the phase-corrected clock and the corresponding line-delayed video signals have the prescribed phase relationship.

Figure 17:
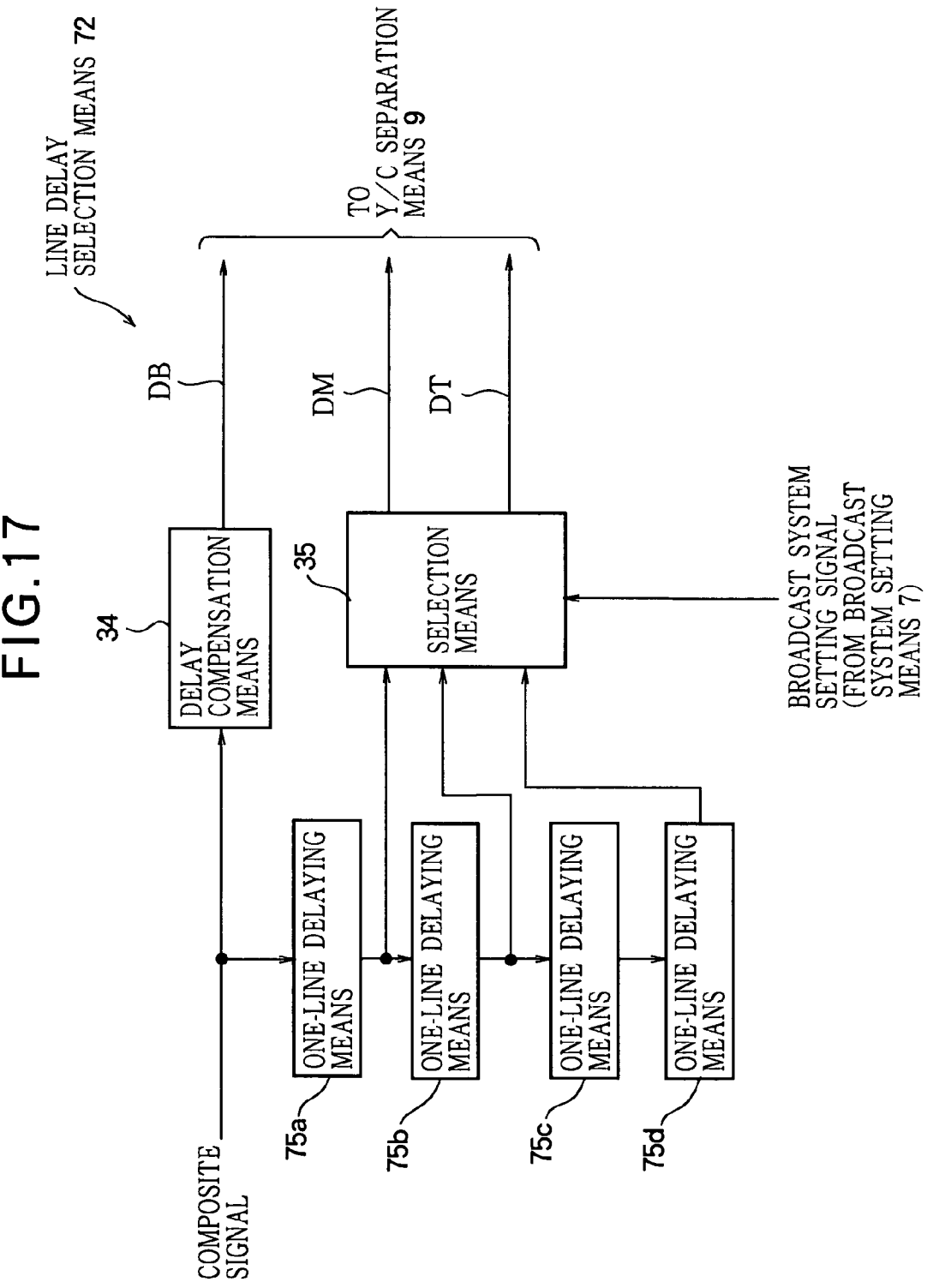
FIG. 17 is a block diagram showing an example of the structure of the line delay selection means in the video signal processing circuit according to the third embodiment of the invention.

FIG. 17 is a block diagram showing an example of the structure of the line delay selection means 72. As shown in the drawing, the line delay selection means 72 comprises one-line delaying means 75a, 75b, 75c, and 75d, a delay compensation means 76, and a selection means 77.

In the line delay selection means 72 shown in FIG. 17, the composite signal, sampled on the phase-corrected clock, is supplied from the A/D conversion means 1 to one-line delaying means 75a and the delay compensation means 76. The television broadcast system specification signal is supplied from the broadcast system setting means 7 to the selection means 77.

One-line delaying means 75a delays the input composite signal by one line and outputs the delayed signal to one-line delaying means 75b and the selection means 77. One-line delaying means 75b delays the composite signal output from one-line delaying means 75a by one more line, and outputs the delayed signal to one-line delaying means 75c and the selection means 77. One-line delaying means 75c delays the composite signal output from one-line delaying means 75b by yet one more line, and outputs the delayed signal to one-line delaying means 75d. One-line delaying means 75d delays the composite signal output from one-line delaying means 75c by still another line, and outputs the delayed signal to the selection means 77.

The delay compensation means 76 outputs the input composite signal obtained from the A/D conversion means 1 to the Y/C separation means 9 as composite signal DB, with compensation for the delay of the signal output from the selection means 77. The selection means 77 selects two signals from the signals input from the one-line delaying means 75a, 75b, and 75d in accordance with the television broadcast system, on the basis of the television broadcast system specified by the broadcast system setting means 7, and outputs these signals as composite signal DM and composite signal DT to the Y/C separation means 9.

Operation when an NTSC Composite Signal is Input

When an NTSC composite video signal is input to the input terminal 100, the following operations are performed. The color subcarrier phase of the NTSC composite signal inverts by 180° (=π) on alternate lines. If the target line is line k, the color subcarrier phase of line k is inverted in line k−1 one line above and in line k+1 one line below.

In the NTSC system, the color subcarrier phase inverts by 180° on alternate lines. If even-numbered lines (lines 0, 2, and so on) have a phase of 0°, odd-numbered lines (lines 1, 3, and so on) have a phase of 180°. Taking this into consideration, the phase error calculation means 73 in the phase difference calculation means 71 sets the comparison reference phase value to 0° for even-numbered lines and to 180° for odd-numbered lines, switches the values at intervals of two lines in accordance with the selected television broadcast system and the timing signal h1 indicating the line number of the input signal, and calculates the phase difference between the color subcarrier phase information p(k) of line k and the reference phase as phase error δc.

When a signal of an odd-numbered line is input, the phase error δc to be corrected is obtained as follows:

$$\delta c = p - \pi$$

When a signal of an even-numbered line is input, the phase error δc to be corrected is obtained as follows:

$$\delta c = p - 0$$

For a standard NTSC input signal with a line-to-line phase inversion of 180°, the phase error δc is zero. For a non-standard signal, a value equivalent to a phase offset from the reference phase is obtained as the phase error δc.

The phase correction conversion means 74 in the phase difference calculation means 71 obtains the amount of change ω(NTSC) in NTSC color subcarrier phase per clock in accordance with the NTSC color subcarrier frequency fsc(NTSC) as follows, $$\omega(NTSC) = 2\pi \times fsc(NTSC)/X$$

and converts the phase error δc to the phase correction Δc as follows:

$$\Delta c = \delta c / \omega(NTSC)$$

In the NTSC system, the color subcarrier phase of line k is inverted on line k−1 one line above and on line k+1 one line below. In the line delay selection means 72, when the composite signal of line k+1 (one line below line k, which is the target line on the screen) is input to the delay compensation means 76, the selection means 77 selects the composite signal of line k input from one-line delaying means 75a and the composite signal of line k−1 (one line above line k on the screen) input from one-line delaying means 75b.

The composite signal DT of line k−1 output from one-line delaying means 75b, composite signal DM of line k output from one-line delaying means 75a, and composite signal DB of line k+1 output from the delay compensation means 76 are output to the Y/C separation means 9 as composite signals for three lines.

The composite signal of line k+1 has been sampled by the A/D conversion means 1 on a sampling clock with its phase corrected by the phase correction Δc(k+1) calculated from the color subcarrier phase information p(k+1) of line k+1; the composite signal of line k has been sampled by the A/D conversion means 1 on a sampling clock with its phase corrected by the phase correction Δc(k) calculated from the color subcarrier phase information p(k) of line k; the composite signal of line k−1 has been sampled by the A/D conversion means 1 on a sampling clock with its phase corrected by the phase correction Δc(k−1) calculated from the color subcarrier phase information p(k−1) of line k−1.

Because the composite signal input to the line delay selection means 72 has been sampled on a clock corrected by the phase correction Δc of the relevant line, the sampling data of the composite signal DT of line k−1 and the composite signal DB of line k+1 are corrected to be 180° (=π) out of phase with the sampling data of the composite signal DM of line k.

For non-standard NTSC signals as well, the sampling clock phases for lines k+1, k, and k−1 are corrected by phase corrections Δc(k+1), Δc(k), and Δc(k−1), respectively. The sampling data of the composite signals DT, DM, and DB of lines k−1, k, and k+1 are output from the line delay selection means 72 with their phases corrected to invert between lines.

In the Y/C separation means 9, a C signal is extracted from the composite signals DB, DM, and DT of lines k+1, k, and k−1 in accordance with the NTSC color subcarrier frequency fsc(NTSC), and the Y and C signals are separated.

Operation when a PAL Composite Signal is Input

When a PAL composite video signal is input to the input terminal 100, the following operations are performed. In a PAL composite signal, the color subcarrier phase changes by 270° (that is, −90°) at each line. The phase inverts by 180° (=π) at intervals of two lines. If the target line is line k, the color subcarrier phase of line k is inverse to the color subcarrier phase on line k−2 two lines above and line k+2 two lines below. In the PAL system, the color subcarrier phase of the R-Y signal is inverted by 180° at each line.

In the PAL system, the phase changes successively in a cycle of four lines (changes in a four-line sequence). When the phases of the first lines (lines 0, 4, and so on) are 0°, the phases of the second lines (lines 1, 5, and so on) are 270° (=3π/2), the phases of the third lines (lines 2, 6, and so on) are 180°, and the phases of the fourth lines (lines 3, 7, and so on) are 90° (=π/2). The color subcarrier phase of the R-Y signal inverts by 180° at each line. Taking this into consideration, the phase error calculation means 73 in the phase difference calculation means 71 changes the value of the comparison reference phase at intervals of four lines, in accordance with the selected television broadcast system and the timing signal h1 indicating the line number of the input signal, and calculates the phase difference between the color subcarrier phase information p(k) of line k and the reference phase as the phase error δc to be corrected.

If the input signal is on the first line of the four-line sequence, the phase error δc to be corrected is obtained as follows:

$$\delta c = p - 0$$

If the input signal is on the second line of the four-line sequence, the phase error δc to be corrected is obtained as follows:

$$\delta c = p - 3\pi/2$$

If the input signal is on the third line of the four-line sequence, the phase error δc to be corrected is obtained as follows:

$$\delta c = p - \pi$$

If the input signal is on the fourth line of the four-line sequence, the phase error δc to be corrected is obtained as follows:

$$\delta c = p - \pi/2$$

For a standard PAL input signal with phase inverted by 180° at intervals of two lines, the phase error δc is zero. For a non-standard signal, a value equivalent to the offset from the reference phase is obtained as the phase error δc.

The phase correction conversion means 74 in the phase difference calculation means 71 obtains the change ω(PAL) in PAL color subcarrier phase per clock in accordance with the PAL color subcarrier frequency fsc (PAL) as follows:

$$\omega(PAL) = 2\pi \times fsc(PAL)/X$$

and converts the phase error δc to a phase correction Δc as follows:

$$\Delta c = \delta c/\omega(PAL)$$

In the PAL system, the color subcarrier phase of line k is inverse to the color subcarrier phase on line k−2 two lines above and line k+2 two lines below. In the line delay selection means 72, when the composite signal of line k+2 (the second line below the target line, or line k, on the screen) is supplied to the delay compensation means 76, the composite signal of line k input from one-line delaying means 75b and the composite signal of line k−2 (the second line above line k on the screen) input from one-line delaying means 75d are selected by the selection means 77.

The composite signal DT of line k−2 output from one-line delaying means 75d, composite signal DM of line k output from one-line delaying means 75b, and composite signal DB of line k+2 output from the delay compensation means 76 are output to the Y/C separation means 9 as composite signals for three lines.

The composite signal of line k+2 has been sampled in the A/D conversion means 1 on a sampling clock with its phase corrected by the phase correction Δc(k+2) calculated from the color subcarrier phase information p(k+2) of line k+2; the composite signal of line k has been sampled in the A/D conversion means 1 on a sampling clock with its phase corrected by the phase correction Δc(k) calculated from the color subcarrier phase information p,(k) of line k; and the composite signal of line k−2 has been sampled in the A/D conversion means 1 on a sampling clock with its phase corrected by the phase correction Δc(k−2) calculated from the color subcarrier phase information p(k−2) of line k−2.

Because the composite signal input to the line delay selection means 72 has been sampled on a clock corrected by the phase correction Δc of the relevant line, the sampling data of the composite signal DT of line k−2 and the composite signal DB of line k+2 are corrected to be 180° (=π) out of phase with the sampling data of the composite signal DM of line k.

For non-standard PAL signals as well, the phases of the sampling clocks for lines k+2, k, and k−2 are corrected by phase corrections Δc(k+2), Δc(k) and Δc(k−2), respectively. The sampling data of the composite signals DT, DM, and DB of lines k−2, k, and k+2 are output from the line delay selection means 72 with their phases corrected to invert between lines.

In the Y/C separation means 9, a C signal is extracted from the composite signals DB, DM, and DT of lines k+2, k, and k−2 in accordance with the PAL color subcarrier frequency fsc(PAL), and the Y and C signals are separated.

In the above calculation of phase error δc, the reference phase values are set to 0° or 180°, but the reference phase values can be set to other values that represent the color subcarrier phase and the line-to-line phase relationship with respect to the sampling positions extracted for the corresponding lines, and that allow for offset so that the difference in color subcarrier phase between lines becomes 180°.

If the phase error calculation means 73 in the phase difference calculation means 71 obtains the phase error to be corrected from the phase information and the reference phase so that Y/C separation can be performed on the assumption of a 180° inversion of the color subcarrier phase between lines, the clock phase correction means 70 can correct the phase for other television broadcast systems such as PAL-N, PAL-M, and NTSC-4.43, and these television broadcast systems can also be easily supported.

If a SECAM signal is input, the necessary processing differs from the processing for the NTSC or PAL system, and in general two-dimensional Y/C separation is not performed. If the line-to-line color subcarrier phase relationship is taken into consideration, however, Y/C separation can be carried out by correcting the clock phase as described above.

According to the third embodiment, the phase difference calculation means 71 calculates a phase error from the reference phase value, based on the color subcarrier phase information of the burst signal, regardless of the television broadcast system, even with a non-standard signal; a phase correction is obtained such that the difference in color subcarrier phase between lines becomes 180°; the clock phase is corrected; and the data of the composite signal are sampled on the corrected clock. Accordingly, Y/C separation can be based on a line-to-line color subcarrier phase difference of 180°, excellent two-dimensional Y/C separation can be performed, regardless of the line-to-line phase relationship, even with a non-standard signal, and degradation of picture quality after Y/C separation can be prevented.

The timing signal generating means 6b of the third embodiment generates a timing signal h1 which indicates a line number in a frame, but the timing signal h1 can be any timing signal that repeats according to the change in the color subcarrier phase from line to line; the same effect is produced, provided the signal enables odd-numbered lines and even-number lines to be discriminated in the NTSC system, and indicates the four-line sequence in the PAL system.

The phase difference calculation means 71 of the third embodiment obtains a phase correction by calculating the phase difference between the phase of the input line signal and a reference phase, but the phase error to be corrected can be obtained by calculating a phase difference with respect to the phase information at a position on a certain line, using delaying means as in the phase difference calculation means 4 in the first embodiment. The same effect is produced by obtaining a phase correction such that the difference in color subcarrier phase between lines becomes 180°, and by correcting the clock phase accordingly.

The third embodiment described above is configured as hardware, but this configuration may be implemented as program-controlled software processing.

Fourth Embodiment

In the first to third embodiments described above, a separate burst phase detecting means 3 is provided to detect color subcarrier phase information. In the fourth embodiment, phase information is generated in the phase detection process that generates a color subcarrier reference signal for use in color demodulation to obtain R-Y and B-Y color difference signals from the C signal.

Figure 18:
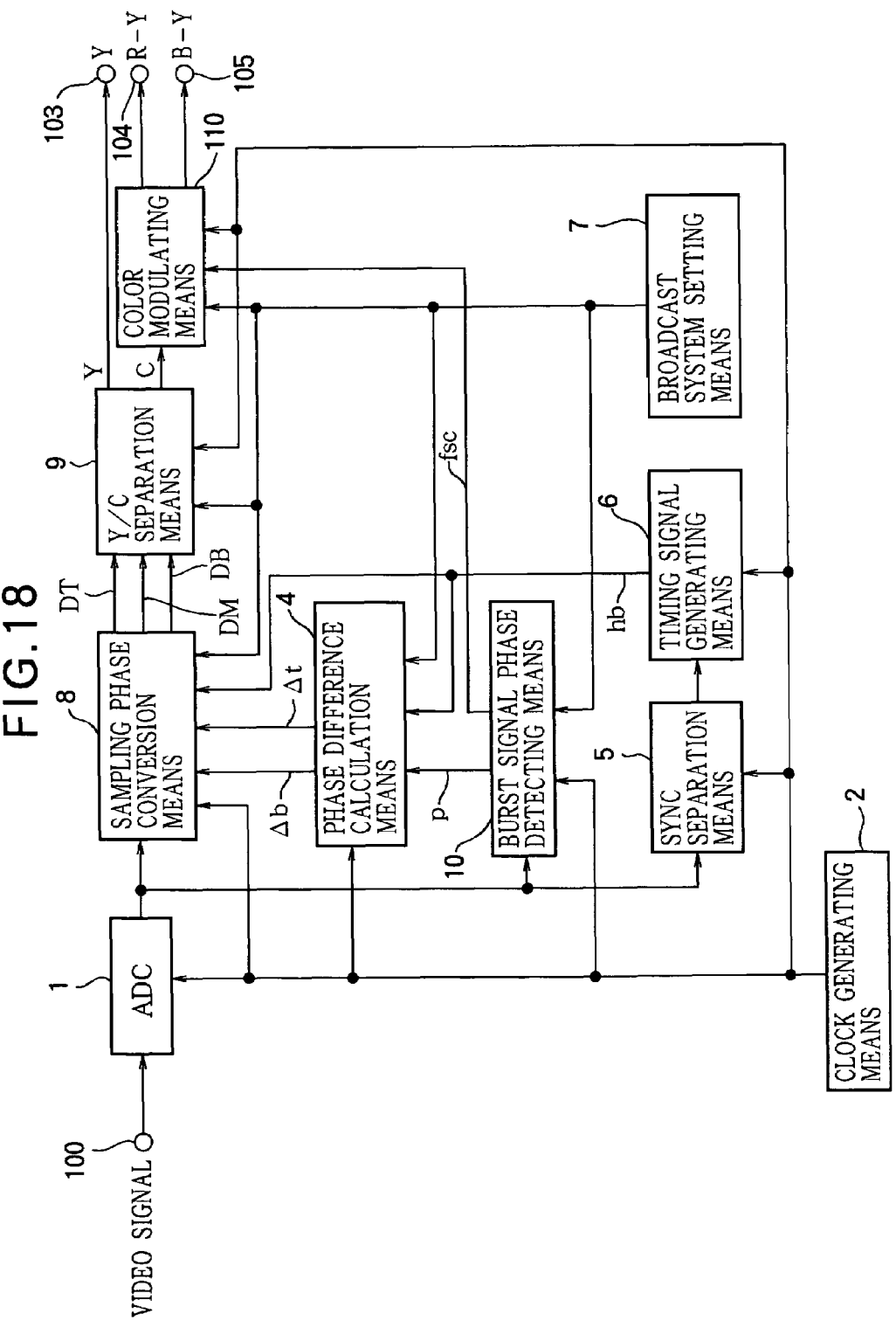
FIG. 18 is a block diagram showing an example of the structure of a video signal processing circuit according to a fourth embodiment of the invention.

FIG. 18 is a block diagram showing an example of the structure of a video signal processing circuit according to the fourth embodiment of the invention, denoting elements identical to elements shown in FIG. 1 by the same reference numerals. As shown in FIG. 18, the video signal processing circuit according to the fourth embodiment comprises an A/D conversion means 1, a clock generating means 2, a phase difference calculation means 4, a sync separation means 5, a timing signal generating means 6, a broadcast system setting means 7, a sampling phase conversion means 8, a Y/C separation means 9, a burst signal phase detecting means 10, an input terminal 100, output terminals 103, 104, 105, and a color demodulating means 110.

As shown in the drawing, the video signal processing circuit in the fourth embodiment differs from the video signal processing circuit in the first embodiment (see FIG. 1) in using a burst signal phase detecting means 10 different from the burst phase detecting means 3 in FIG. 1, and having an additional color demodulating means 110. The configuration and operation of the parts other than the color demodulating means 110 and burst signal phase detecting means 10 are the as described above in the first embodiment.

Burst Signal Phase Detecting Means 10

Like the burst phase detecting means 3 shown in FIG. 1, the burst signal phase detecting means 10 detects a burst signal in a composite signal received from the A/D conversion means 1 (detects the burst phase of the composite signal) by using a color subcarrier reference signal, and outputs color subcarrier phase information p to the phase difference calculation means 4. In addition, the burst signal phase detecting means 10 generates a color subcarrier reference signal for color demodulation with frequency fsc for obtaining the R-Y and B-Y color difference signals from the C signal in accordance with the color subcarrier phase information p, and outputs this fsc signal to the color demodulating means 110.

Figure 19:
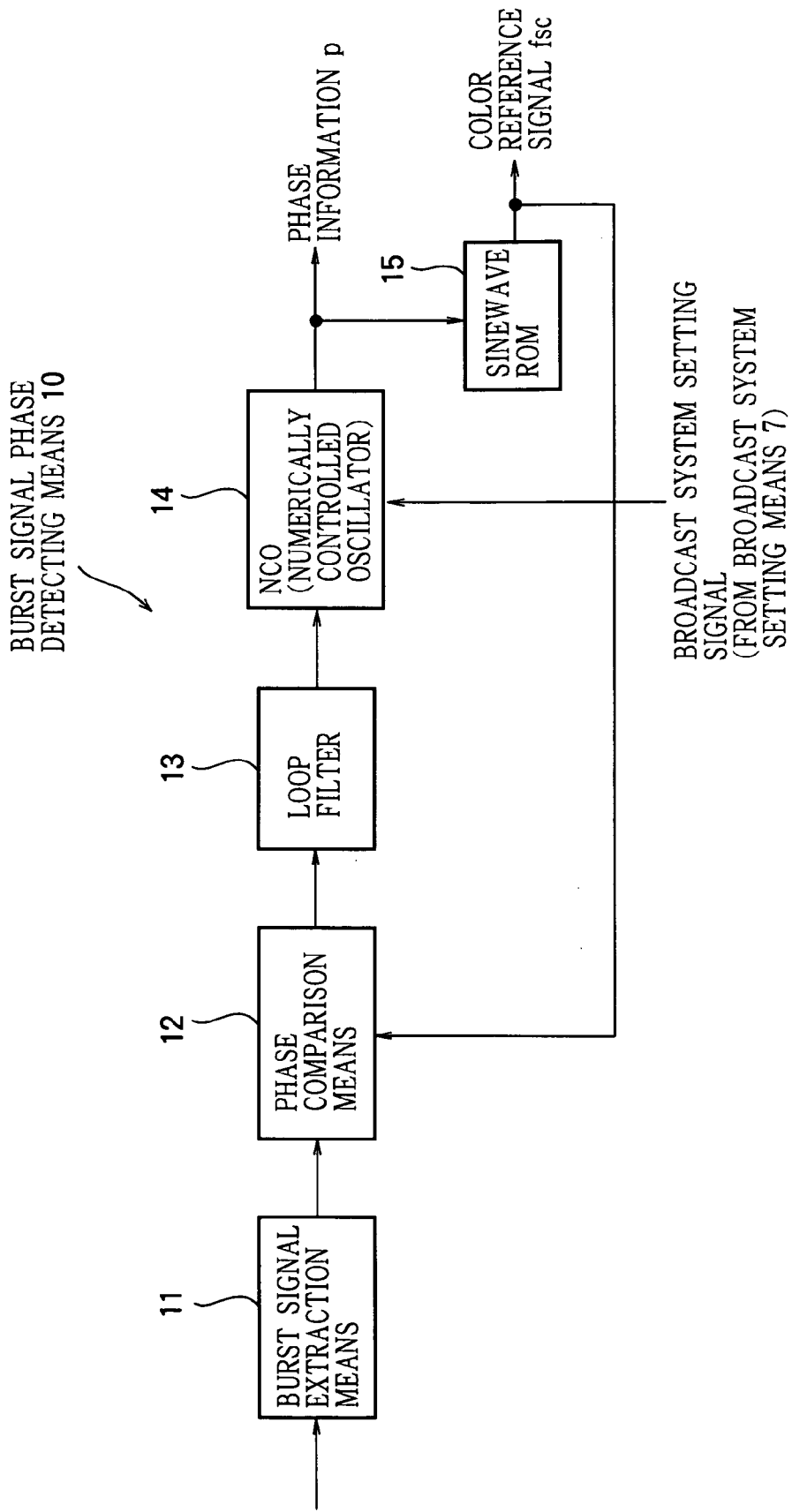
FIG. 19 is a block diagram showing an example of the structure of the burst signal phase detecting means in the video signal processing circuit according to the fourth embodiment of the invention.

FIG. 19 is a block diagram showing an example of the structure of the burst signal phase detecting means 10, denoting elements identical to elements of the burst phase detecting means 3 in FIG. 2 by the same reference numerals. As shown in FIG. 19, the burst signal phase detecting means 10 comprises a burst signal extraction means 11, a phase comparison means 12, a loop filter 13, an NCO 14, and a sinewave ROM 15.

The burst signal phase detecting means 10 in the fourth embodiment differs from the burst phase detecting means 3 in the first embodiment (see FIG. 2) in that the reference signal with color subcarrier frequency fsc generated by the sinewave ROM 15 is output to the color demodulating means 110 as a color subcarrier reference signal for color demodulation.

Color Demodulating Means 110

The color demodulating means 110 color-demodulates the R-Y and B-Y color difference signals by multiplying the C signal extracted by the Y/C separation means 9 by the color subcarrier reference signal with frequency fsc received from the burst signal phase detecting means 10 in accordance with the television broadcast system specified by the broadcast system setting means 7, and outputs the R-Y signal to output terminal 104 and the B-Y signal to output terminal 105.

In the digital television studio encoding parameters defined by CCIR, the sampling frequency of the Y signal is 13.5 MHz, and the sampling frequency of the R-Y and B-Y signals is 6.75 MHz. The sampling frequency of the Y signal output from the Y/C separation means 9 and the R-Y and B-Y signals output from the color demodulating means 110 equals the frequency of the clock with frequency X of 27 MHz generated by the clock generating means 2. The sampling frequency of the Y signal output from the Y/C separation means 9 is twice as high as the CCIR-defined sampling frequency, and the sampling frequency of the R-Y and B-Y signals output from the color demodulating means 110 is four times as high as the CCIR-defined sampling frequency. Accordingly, the outputs of the Y/C separation means 9 and color demodulating means 110 can be easily converted to a signal conforming to digital television studio encoding parameters.

According to the fourth embodiment, the phase difference calculation means calculates a phase error from the color subcarrier phase information in a composite signal for any of a plurality of television broadcast systems or for a non-standard signal; a phase correction is obtained to provide a line-to-line color subcarrier phase difference of 180°; and Y/C separation is carried out after the sampling phase of the composite signal is corrected by sampling phase conversion. Accordingly, excellent two-dimensional Y/C separation is carried out, regardless of the line-to-line phase relationship, even with a non-standard signal, and degradation of picture quality after Y/C separation can be prevented. The color subcarrier phase information is obtained from the burst signal phase detection means generating a color reference signal for color demodulation, so that excellent Y/C separation is carried out, and degradation of picture quality after Y/C separation is prevented, with no great increase in the size of the circuit.

In the fourth embodiment described above, the burst phase detecting means 3 of the first embodiment is replaced by the burst signal phase detecting means 10, and the color demodulating means 110 is added, but the same effect is obtainable by replacing the burst phase detecting means 3 of the second or third embodiment by the burst signal phase detecting means 10 and adding the color demodulating means 110.

Fifth Embodiment

The Y/C separation means in the first to fourth embodiments performs two-dimensional Y/C separation by utilizing a line comb filter. In a fifth embodiment, a frame comb filter utilizing the frame-periodic color subcarrier phase relationship is used to carry out three-dimensional Y/C separation. For three-dimensional Y/C separation, the extension into three dimensions is made by replacing the delaying means that apply delays of one line in the first to fourth embodiments with frame delaying means that apply delays of one frame, in units of fields, for example. Excellent three-dimensional Y/C separation can then be performed regardless of the frame-to-frame phase relationship, even with a non-standard signal, as in the first to fourth embodiments.

Figure 20:
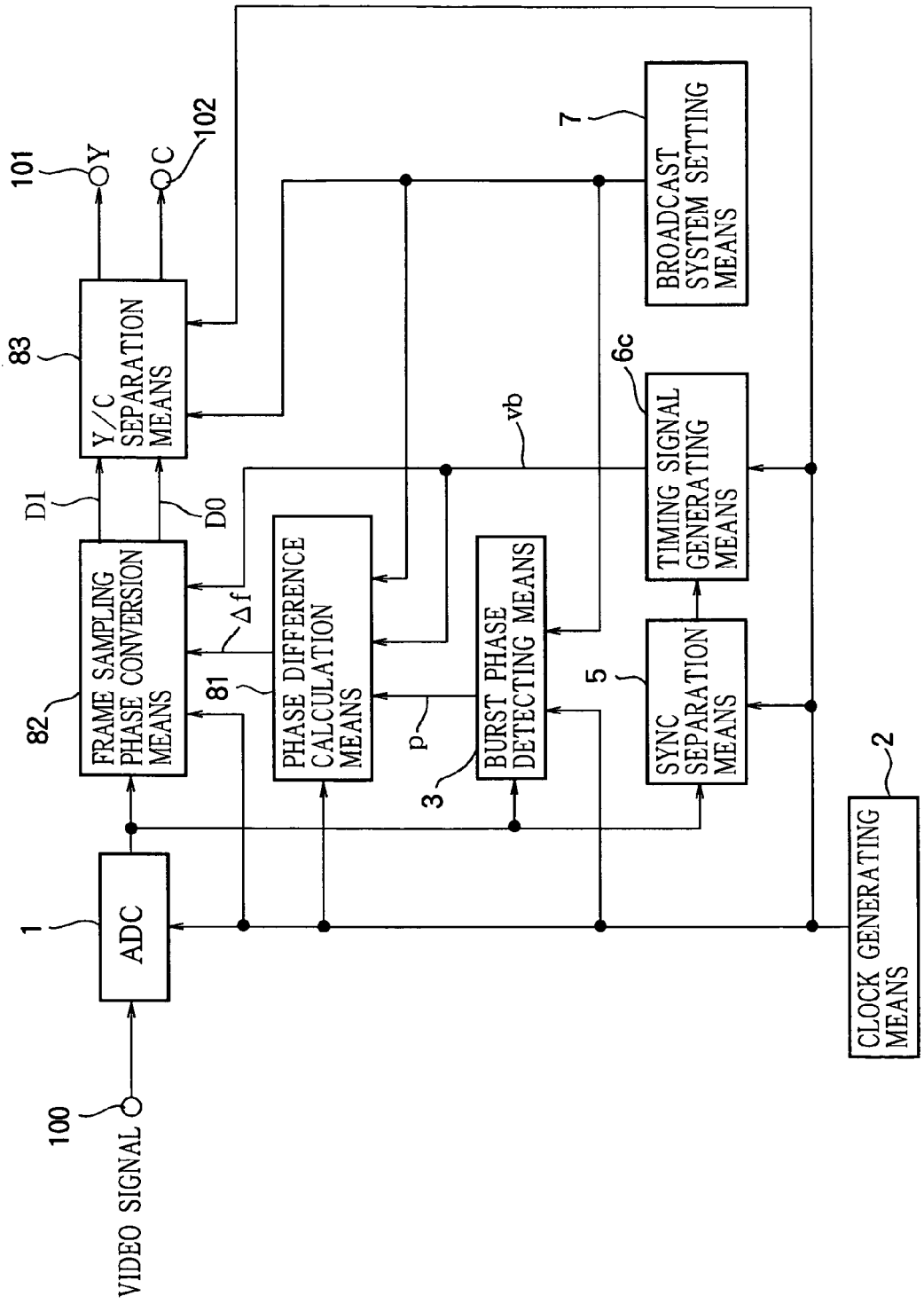
FIG. 20 is a block diagram showing an example of the structure of a video signal processing circuit according to a fifth embodiment of the invention.

FIG. 20 is a block diagram showing an example of the structure of a video signal processing circuit according to the fifth embodiment of the invention, denoting elements identical to elements shown in FIG. 1 by the same reference numerals. As shown in FIG. 20, the video signal processing circuit according to the fifth embodiment comprises an A/D conversion means 1, a clock generating means 2, a burst phase detecting means 3, a sync separation means 5, a timing signal generating means 6c, a broadcast system setting means 7, a phase difference calculation means 81, a frame sampling phase conversion means 82, a Y/C separation means 83, an input terminal 100, and output terminals 101, 102.

The video signal processing circuit according to the fifth embodiment differs from the video signal processing circuit according to the first embodiment (see FIG. 1) in that the phase difference calculation means 4 is replaced by the phase difference calculation means 81, the timing signal generating means 6 is replaced by the timing signal generating means 6c, the sampling phase conversion means 8 is replaced by the frame sampling phase conversion means 82, and the Y/C separation means 9 is replaced by the Y/C separation means 83. The configuration and operation of the parts other than the timing signal generating means 6c, phase difference calculation means 81, frame sampling phase conversion means 82, and Y/C separation means 83 are the same as in the first embodiment.

Timing Signal Generating Means 6c

The timing signal generating means 6c generates a timing signal based on the sync signals output from the sync separation means 5, and outputs the signal to the phase difference calculation means 81 and frame sampling phase conversion means 82. In this embodiment, it generates a timing signal vb, based on the horizontal and vertical sync signals, for creating a one-frame (two-field) signal delay.

Phase Difference Calculation Means 81

The phase difference calculation means 81 detects the frame-to-frame phase difference from the color subcarrier phase information p, and outputs a phase correction Δf to the frame sampling phase conversion means 82.

Figure 21:
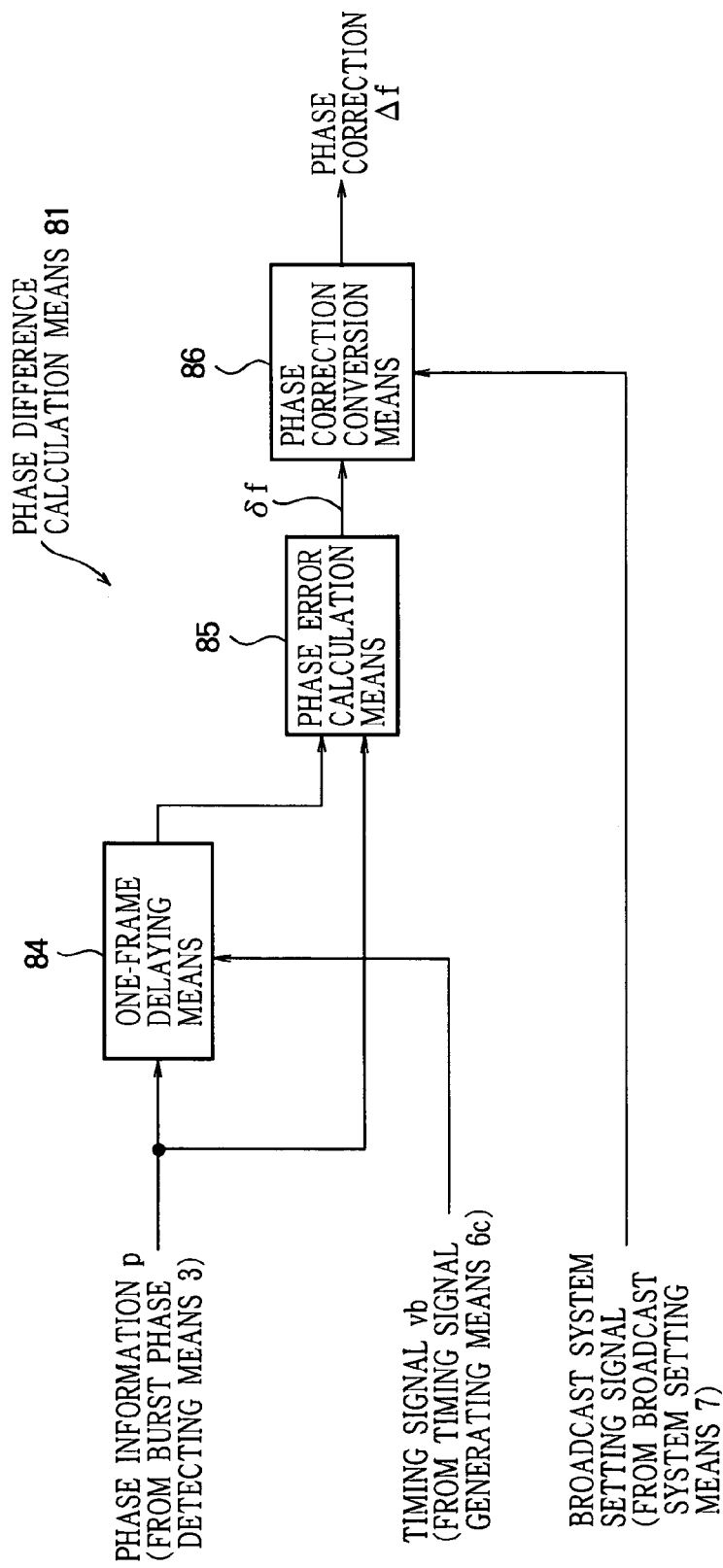
FIG. 21 is a block diagram showing an example of the structure of the phase difference calculation means in the video signal processing circuit according to the fifth embodiment of the invention.

FIG. 21 is a block diagram showing an example of the structure of the phase difference calculation means 81. As shown in the drawing, the phase difference calculation means 81 comprises a one-frame delaying means 84, a phase error calculation means 85, and a phase correction conversion means 86.

In the phase difference calculation means 81 shown in FIG. 21, the phase information p from the burst phase detecting means 3 is supplied to the one-frame delaying means 84 and phase error calculation means 85. The timing signal from the timing signal generating means 6c is supplied to the one-frame delaying means 84. The television broadcast system specification signal from the broadcast system setting means 7 is supplied to the phase correction conversion means 86.

The one-frame delaying means 84 outputs the phase information p to the phase error calculation means 85 with a delay of one frame (two fields) in accordance with the timing signal vb.

From the phase information p output from the burst phase detecting means 3 and the one-frame-delayed phase information p output from the one-frame delaying means 84, the phase error calculation means 85 obtains a phase error δf to be corrected between frames, and outputs it to the phase correction conversion means 86.

The phase correction conversion means 86 converts the phase error δf supplied from the phase error calculation means 85 to a phase correction Δf for correcting the phase, and outputs it to the frame sampling phase conversion means 82.

Since the phase information p indicates an angle, where one period of the color subcarrier corresponds to 2π, the conversion process performed by the phase correction conversion means 86 converts the phase error δf output from the phase error calculation means 85 to a value representing time with reference to one period of the clock with a frequency X of 27 MHz, (time represented as a multiple of the period of the clock with frequency X). If the change ω expressed in terms of color subcarrier phase angle per clock period is 2π×fsc/X, where fsc is the color subcarrier frequency, the phase correction Δf obtained by conversion of the phase error δf is expressed as follows:

$$\Delta f = \delta f / \omega$$

If the phase error δf ranges from −π to +π, the phase correction Δf takes on values from −X/(2×fsc) to X/(2×fsc)

Frame Sampling Phase Conversion Means 82

A one-frame-delayed version of the digital composite signal output from the A/D conversion means 1 is obtained in the frame sampling phase conversion means 82, in order to obtain the composite signal of the current field and the composite signal of the same field with a delay of one frame (the composite signal of the target line in the current field and the composite signal of the same line in the immediately preceding frame) so that these can be used for Y/C separation. The frame sampling phase conversion means 82 corrects the phase of the one-frame-delayed composite signal by the phase correction Δf received from the phase difference calculation means 81, and outputs both signals to the Y/C separation means 83.

Figure 22:
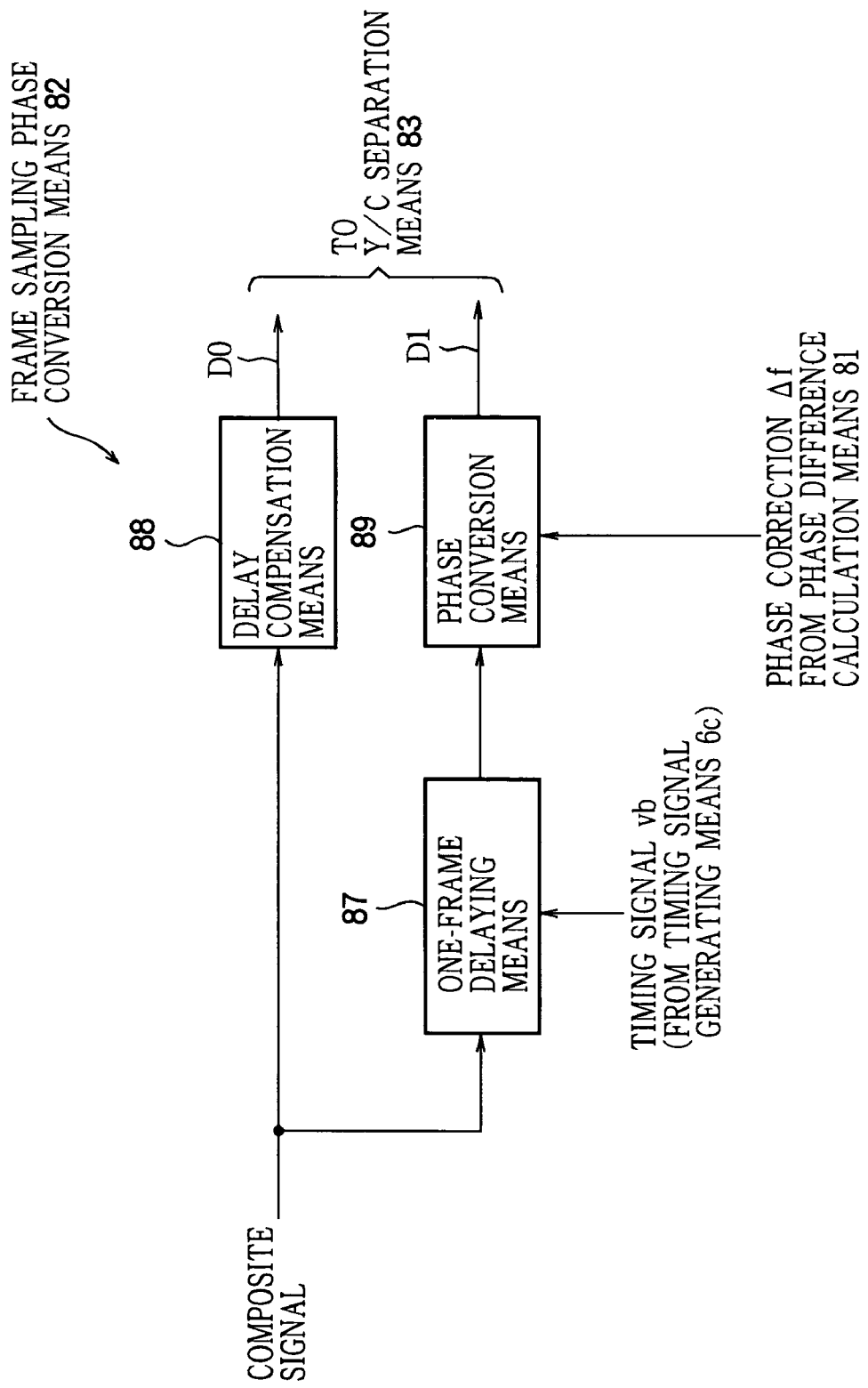
FIG. 22 is a block diagram showing an example of the structure of the frame sampling phase conversion means in the video signal processing circuit according to the fifth embodiment of the invention.

FIG. 22 is a block diagram showing an example of the structure of the frame sampling phase conversion means 82. As shown in the drawing, the frame sampling phase conversion means 82 comprises a one-frame delaying means 87, a delay compensation means 88, and a phase conversion means 89. The phase conversion means 89 has the same configuration and operates in the same way as the phase conversion filter of the first embodiment (see FIG. 5, 9, or 10), for example.

In the frame sampling phase conversion means 82 shown in FIG. 22, the composite signal output from the A/D conversion means 1 is input to the one-frame delaying means 87 and delay compensation means 88. The timing signal vb output from the timing signal generating means 6c is input to the one-frame delaying means 87. The phase correction Δf output from the phase difference calculation means 81 is input to the phase conversion means 89.

The one-frame delaying means 87 delays the input composite signal by one frame in accordance with the timing signal vb, and outputs the delayed signal to the phase conversion means 89.

The delay compensation means 88 outputs the composite signal from the A/D conversion means 1 as composite signal D0 to the Y/C separation means 83, with compensation for the signal delay of the other composite signal output from the phase conversion means 89.

The phase conversion means 89 corrects the phase of the composite signal output from the one-frame delaying means 87 in accordance with the phase correction Δf given by the phase difference calculation means 81, and outputs the corrected signal as composite signal D1 to the Y/C separation means 83.

The phase correction Δf is a phase correction of the signal of the immediately preceding frame with respect to the color subcarrier phase in the current field. The phase correction has been converted to a value based on the period of the clock with a frequency X of 27 MHz. The signal corresponding to the signal of the immediately preceding frame input to the phase conversion means 89 is delayed by Δf, thereby converting the sampling phase and correcting the phase.

Y/C Separation Means 83

The Y/C separation means 83 is a three-dimensional Y/C separation means utilizing a frame comb filter. Through three-dimensional Y/C separation, it extracts a C signal from the composite signal D0 of the current field and the composite signal D1 of the same field of the immediately preceding frame input from the frame sampling phase conversion means 82 in accordance with the color subcarrier frequency fsc of the television broadcast system specified by the broadcast system setting means 7, separates the Y and C signals, and outputs the C signal to output terminal 101 and the Y signal to output terminal 102.

Figure 23:
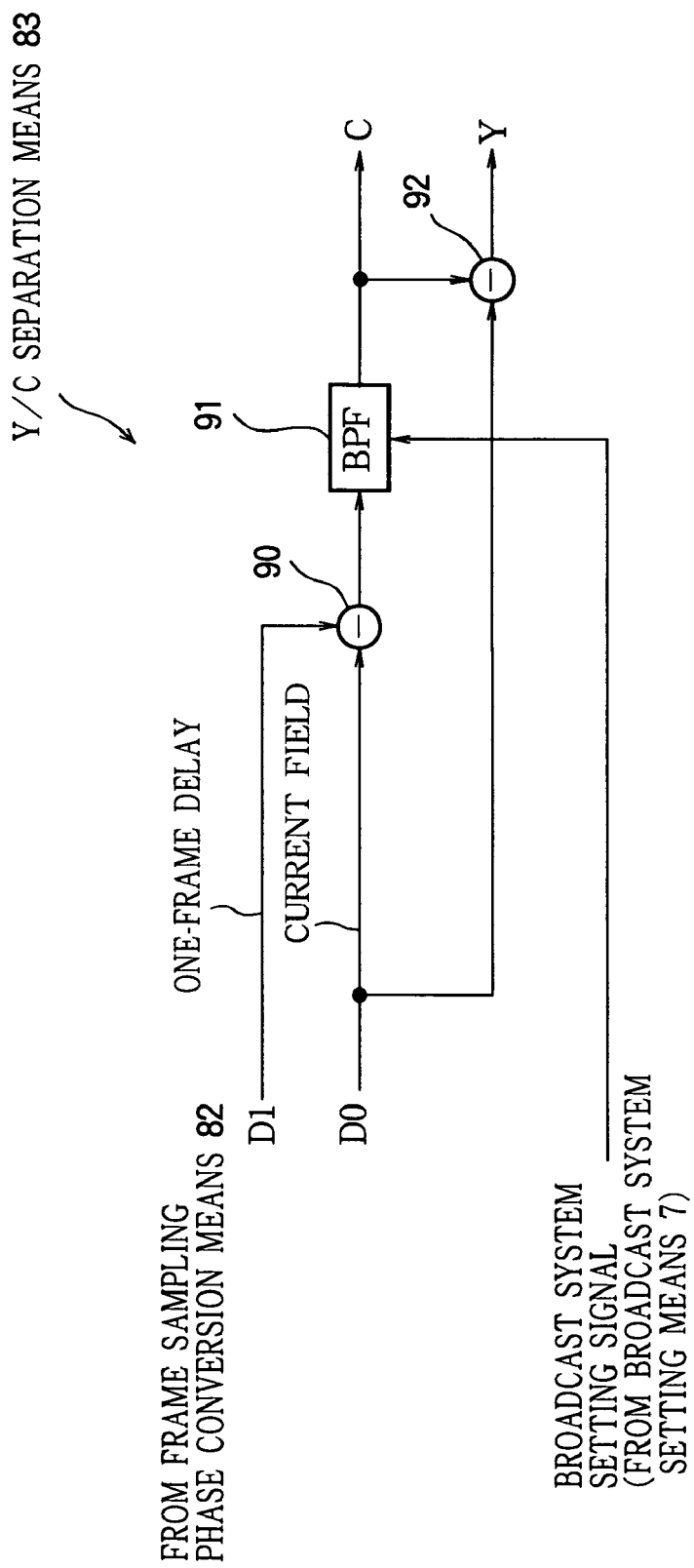
FIG. 23 is a block diagram showing an example of the structure of the Y/C separation means in the video signal processing circuit according to the fifth embodiment of the invention.

FIG. 23 is a block diagram showing an example of the structure of the Y/C separation means 83, which performs three-dimensional Y/C separation. As shown in the drawing, the Y/C separation means 83 comprises a subtractor 90, a bandpass filter (BPF) 91, and another subtractor 92.

In the Y/C separation means 83 shown in FIG. 23, the composite signal D0 of the current field from the frame sampling phase conversion means 82 is input to the subtractors 90 and 92. The composite signal D1 of the same field output with a delay of one frame from the frame sampling phase conversion means 82 is input to subtractor 90. The television broadcast system specification signal output from the broadcast system setting means 7 is input to the BPF 91.

Subtractor 90 extracts the C signal by subtracting the one-frame-delayed composite signal D1 from the current-field composite signal D0, and outputs the C signal to the BPF 91. Because the color subcarrier phase inverts between identical lines in adjacent frames, the C signal can be extracted completely through the process performed by subtractor 90, provided the composite signal has a strong frame-to-frame correlation.

The BPF 91 outputs the signal supplied from subtractor 90 to output terminal 102 (see FIG. 20) and subtractor 92, removing unnecessary components outside the frequency band of the C signal. The BPF 91 used here is a BPF corresponding to the color subcarrier frequency fsc of the specified television broadcast system, in accordance with the television broadcast system specification signal from the broadcast system setting means 7.

Subtractor 92 separates a Y signal by subtracting the C signal given by the BPF 91 from the input composite signal D0 of the current field, and outputs the Y signal to output terminal 101 (see FIG. 20).

Operation when an NTSC Composite Signal is Input

When an NTSC composite video signal is input to the input terminal 100, the following operations are performed. The color subcarrier phase of the NTSC composite signal inverts by 180° ($=\pi$) in alternate frames. The color subcarrier phase in a given line in the current frame (frame j) is inverted on the same line in the immediately preceding frame (frame j−1). The Y/C separation means 83 separates the Y and C signals by three-dimensional Y/C separation, exploiting the fact that the color subcarrier phase inverts in alternate frames.

In the phase difference calculation means 81, color subcarrier phase information p(j, k) of the target line (line k) in frame j and color subcarrier phase information p(j−1, k) of the same line k in frame j−1 are supplied to the phase error calculation means 85 as color subcarrier phase information.

The phase error calculation means 85 is supplied with the phase information p(j, k) from the burst phase detecting means 3, corresponding to the phase information of line k (the target line) in frame j, and the one-frame-delayed phase information p(j−1, k) from the one-frame delaying means 84, corresponding to the phase information of line k in frame j−1 (the same line in the field two fields before).

In consideration of the frame-to-frame phase inversion of $\pi$, the phase error calculation means 85 in the phase difference calculation means 81 calculates the phase error $\delta f$, with respect to the signal for line k in frame j, which is to be corrected in the signal of line k in frame j−1 one frame before as follows, $$\delta f = p(j-1, k) - p(j, k) + \pi$$

where $+\pi$ is a fixed phase value, and $-p(j, k)+\pi$ is equivalent to a reference phase with respect to line k in frame j. A phase error $\delta f$ is obtained as a phase difference between the phase information p(j−1, k) of line k in frame j−1 and the reference phase with respect to the target line.

For a standard NTSC input signal with a frame-to-frame phase inversion of 180°, the phase error $\delta f$ is zero. For a non-standard signal, a value equivalent to the phase offset is obtained as the phase error $\delta f$.

The phase correction conversion means 86 in the phase difference calculation means 81 obtains the amount of change $\omega$(NTSC) in NTSC color subcarrier phase per clock in accordance with the NTSC color subcarrier frequency fsc(NTSC) as follows, $$\omega(NTSC) = \pi \times fsc(NTSC)/X$$

and converts the phase error $\delta f$ to a phase correction $\Delta f$ as follows:

$$\Delta f = \delta f / \omega(NTSC)$$

In the frame sampling phase conversion means 82, when the composite signal of line k in frame j is compensated to allow for the delay by the delay compensation means 88, the composite signal of line k in frame j−1 delayed by one frame by the one-frame delaying means 87 is input to the phase conversion means 89.

The phase conversion means 89 corrects the phase of the composite signal of line k in frame j−1 in accordance with the phase correction $\Delta f$. The composite signal D1 of frame j−1 with its phase corrected by the phase conversion means 89 and the composite signal D0 of frame j with a compensating delay applied by the delay compensation means 88 are output to the Y/C separation means 9.

The data of the composite signal D1 of frame j−1 are corrected so that they are 180° ($=\pi$) out of phase with the sampling data of the composite signal D0 of frame j.

Non-standard NTSC signals are processed in the same way. The phases of the composite signal D0 of frame j and the composite signal D1 of frame j−1 one frame before are corrected by the phase correction $\Delta f$. The sampling data of the composite signals D1 and D0 are output from the frame sampling phase conversion means 82 with their phases corrected to invert between frames.

In the Y/C separation means 83, a C signal is extracted from the composite signal D0 of frame j and the composite signal D1 of frame j−1 in accordance with the NTSC color subcarrier frequency fsc(NTSC), and the Y and C signals are separated.

Operation when a PAL Composite Signal is Input

When a PAL composite video signal is input to the input terminal 100, the following operations are performed. In a PAL composite signal, the color subcarrier phase changes by 270° per frame. The phase inverts by 180° ($=\pi$) at intervals of two frames. If the current frame is frame j, there is a phase offset of $3\pi/2$ between the color subcarrier phase of frame j and the color subcarrier phase of frame j−1 one frame before. Frame j and frame j−2 two frames before have opposite color subcarrier phases. The Y/C separation means 83 exploits the correlatedness of frames, and separates the C and Y signals through three-dimensional Y/C separation taking the frame-to-frame color subcarrier phase inversion of 180° into consideration.

In the PAL system, the color subcarrier of the current frame inverts by 180° in the second preceding frame, but these two frames will generally have a weak signal correlation. A weak frame correlation will adversely affect three-dimensional Y/C separation, and good Y/C separation cannot be performed. Accordingly, it is inadvisable to use the current frame and the second preceding frame for three-dimensional Y/C separation.

In the PAL system, the phase difference calculation means 81 obtains a phase correction for correcting the phases to invert by 180° between frames, allowing for frame-to-frame phase error between the current frame and the immediately preceding frame, as in the NTSC system.

As in the NTSC system, the phase error calculation means 85 in the phase difference calculation means 81 calculates phase error δf, with respect to the signal for line k in frame j, which is to be corrected in the signal of line k in frame j−1 one frame before, from color subcarrier phase information p(j, k) of the target line, which is line k in frame j, and color subcarrier phase information p(j−1, k) of line k in frame j−1, as follows $$\delta f = p(j-1) - p(j) + \pi$$

For a standard PAL signal input with a frame-to-frame phase shift of 270°, $$p(j-1, k) = p(j, k) + 3\pi/2$$

Therefore $$\delta f = (3\pi/2) + \pi = 2\pi + \pi/2$$

That is $$\delta f = \pi/2$$

Accordingly, a signal with a phase of 0° (corresponding to a phase of 270° in the current field) is corrected to a phase of 90°. For a non-standard signal, the phase error δf is obtained by adding a value equivalent to the phase offset to π/2.

The phase correction conversion means 86 in the phase difference calculation means 81 obtains the change ω(PAL) in PAL color subcarrier phase per clock in accordance with the PAL color subcarrier frequency fsc(PAL) as follows:

$$\omega(PAL) = 2\pi \times fsc(PAL)X$$

and converts phase error δf to a phase correction Δf as follows:

$$\Delta f = \delta f / \omega(PAL)$$

In the frame sampling phase conversion means 82, the phase of composite signal D1 of frame j−1 is corrected by the phase correction Δf so that the sampling data of the composite signal D1 of frame j−1 and the composite signal D0 of frame j become 180° (=π) out of phase, as in the NTSC system.

Non-standard PAL signals are processed in the same way. Since the phase correction Δf includes a value equivalent to the phase offset, the phase is corrected by the phase correction Δf between frames, and the sampling data of the composite signal D0 of frame j and the composite signal D1 of frame j−1 one frame before are output from the frame sampling phase conversion means 82 with their phases corrected to invert between frames.

In the Y/C separation means 83, a C signal is extracted from the composite signals D0 and D1 of frames j and j−1 in accordance with the PAL color subcarrier frequency fsc (PAL), and the Y and C signals are separated.

In the above calculation of phase error δf, π is added to take the inversion of phase between frames into consideration, but the value taken into consideration is not limited to π. The frame-to-frame phase relationship in each television broadcast system should be considered, and the phase error should take the offset into consideration so that the difference in color subcarrier phase becomes 180°.

If the phase error calculation means 85 in the phase difference calculation means 81 obtains a phase error to be corrected from the frame-to-frame phase information so that Y/C separation can be performed on the assumption of a 180° inversion of the color subcarrier phase between frames, the frame sampling phase conversion means 82 can correct the phase for other television broadcast systems, and these television broadcast systems can also be easily supported.

According to the fifth embodiment, the phase difference calculation means 81 calculates a phase error between frames from the color subcarrier phase information of the composite signal, regardless of the television broadcast system, and even from a non-standard signal; a phase correction is obtained such that the difference in color subcarrier phase between frames becomes 180°; the sampling phase of the composite signal is corrected through sampling phase conversion; and then Y/C separation is performed. Accordingly, excellent three-dimensional Y/C separation can be performed, regardless of the frame-to-frame phase relationship, even with a non-standard signal, and degradation of picture quality after Y/C separation can be prevented.

The phase difference calculation means 81 in the fifth embodiment described above obtains a phase correction by comparing the color subcarrier phase between frames, but the phase difference calculation means 81 may obtain a phase correction by comparing the color subcarrier phase with a fixed phase value as in the second embodiment.

Figure 24:
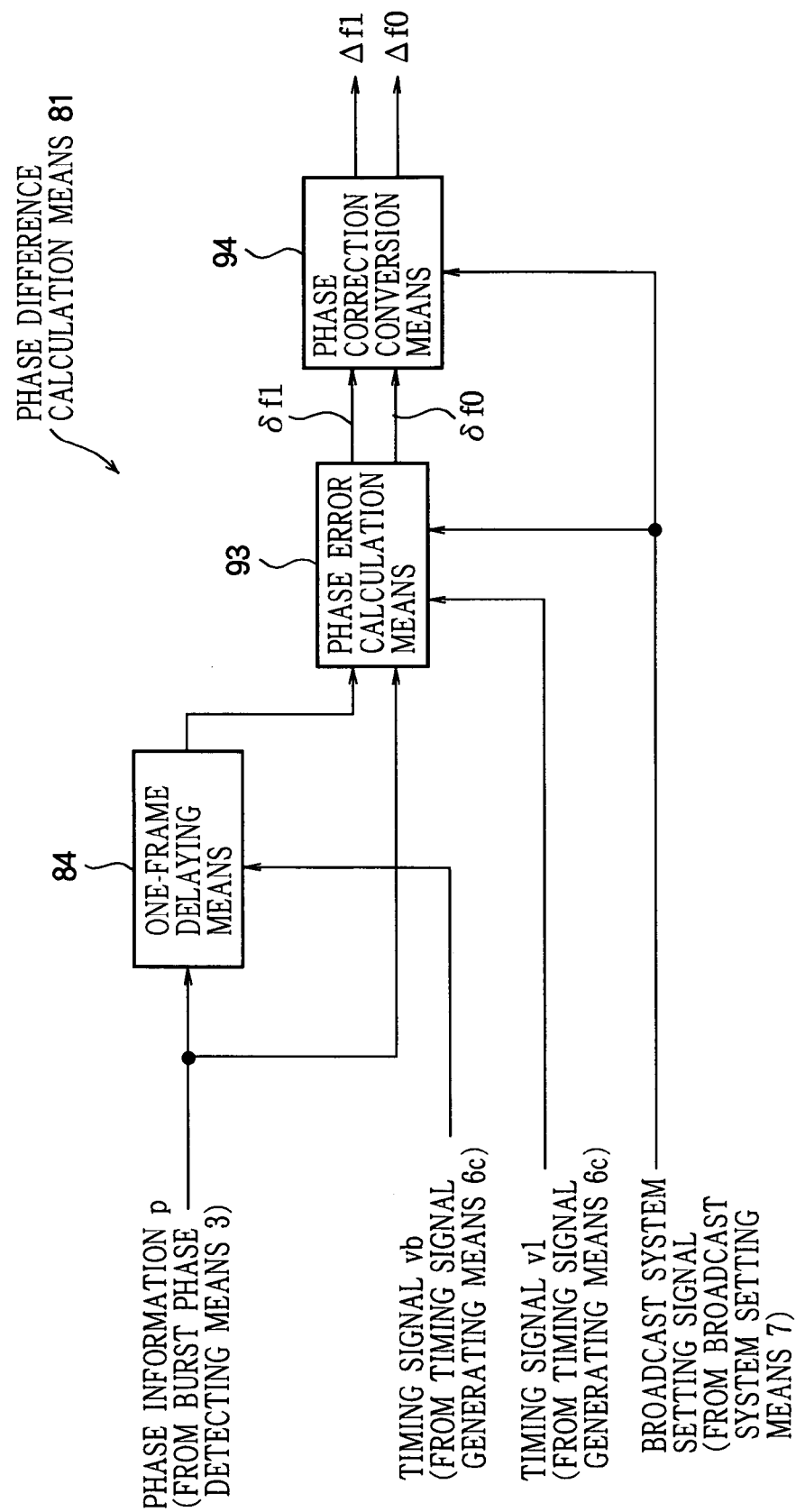
FIG. 24 is a block diagram showing another example of the structure of the phase difference calculation means in the video signal processing circuit according to the fifth embodiment of the invention.

The phase difference calculation means 81 of the fifth embodiment can be configured as shown in FIG. 24. In that case, the frame sampling phase conversion means 82 can be configured as shown in FIG. 25.

The phase difference calculation means 81 shown in FIG. 24 comprises a one-frame delaying means 84, a phase error calculation means 93, and a phase correction conversion means 94. In FIG. 24, elements identical to elements of the phase difference calculation means 81 in FIG. 21 are denoted by the same reference numerals. The phase error calculation means 93 specifies a comparison reference phase value based on a change in color subcarrier phase between frames, switches the value in accordance with the specified television broadcast system and a timing signal v1 from the timing signal generating means 6c, compares both the phase information p of the current field and phase information p of the same field of the immediately preceding frame output from the one-frame delaying means 84 with the reference phase value, calculates phase differences, and obtains the phase error δf0 to be corrected in the signal of the current field and the phase error δf1 to be corrected in the signal of the immediately preceding frame. In the phase correction conversion means 94, the phase errors δf0 and δf1 output from the phase error calculation means 93 are converted to phase corrections Δf0 and Δf1 for correcting the phases.

Figure 25:
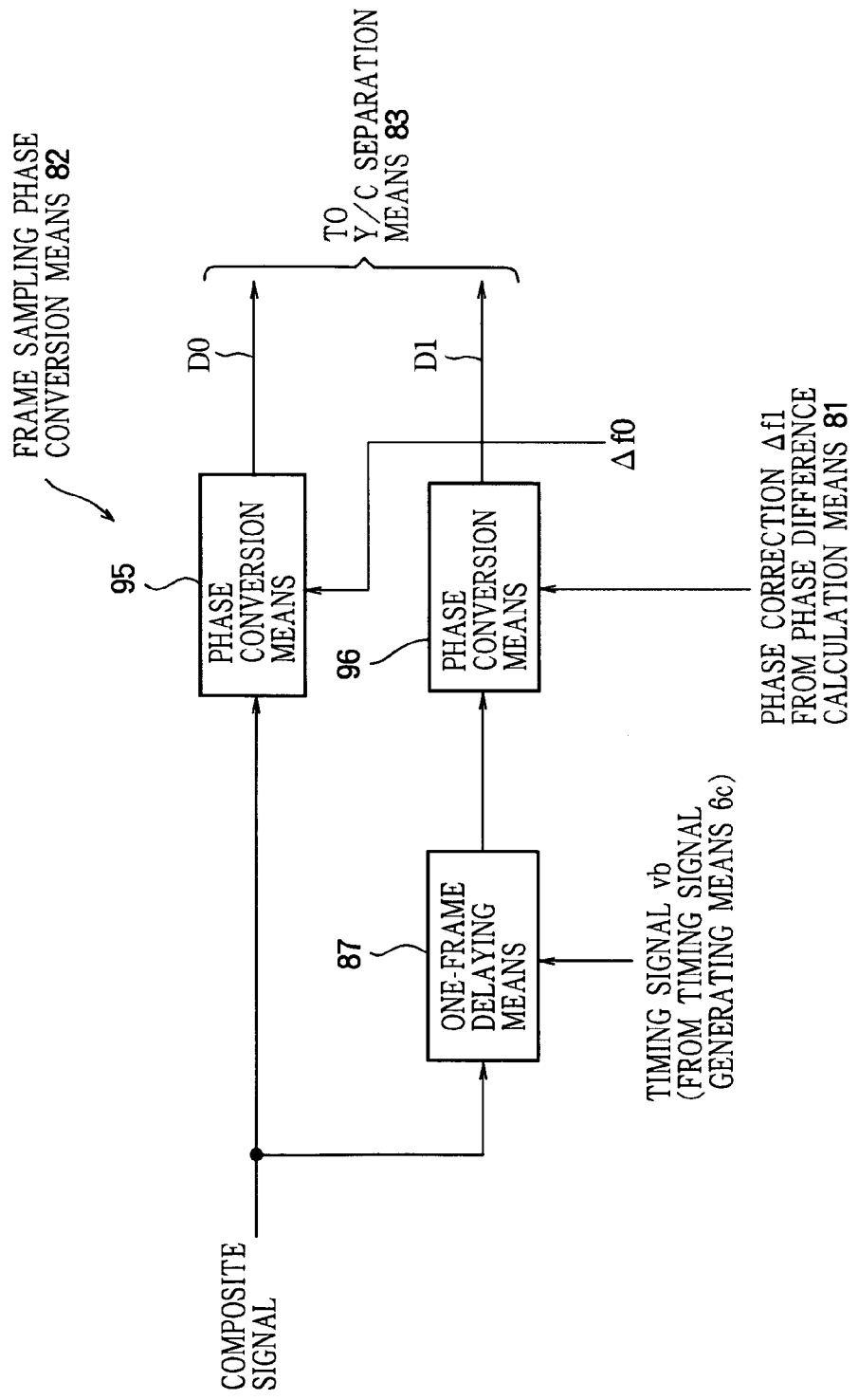
FIG. 25 is a block diagram showing another example of the structure of the frame sampling phase conversion means in the video signal processing circuit according to the fifth embodiment of the invention.

The frame sampling phase conversion means 82 shown in FIG. 25 comprises a one-frame delaying means 87 and phase conversion means 96, 96. In FIG. 25, elements identical to elements of the frame sampling phase conversion means 82 in FIG. 22 are denoted by the same reference numerals. The phase conversion means 95 corrects the phase of the composite signal of the current field by applying a delay equal to phase correction Δf0. The phase conversion means 96 corrects the phase of the composite signal in the field one frame before the current field by applying a delay equal to phase correction Δf1.

In the fifth embodiment described above, the phase of the video signal is corrected by a phase correction output from the phase difference calculation means 81, but if the phase of the sampling clock used for sampling is corrected as in the third embodiment, a phase relationship useful in three-dimensional Y/C separation can be established, and the same effect is produced.

Sixth Embodiment

In the fifth embodiment, a separate burst phase detecting means 3 is provided to detect color subcarrier phase information. In a sixth embodiment, as in the fourth embodiment, the phase information is generated by the burst signal phase detecting means 10 that generates the color subcarrier reference signal used in color demodulation to obtain the R-Y and B-Y signals from the chrominance signal.

Figure 26:
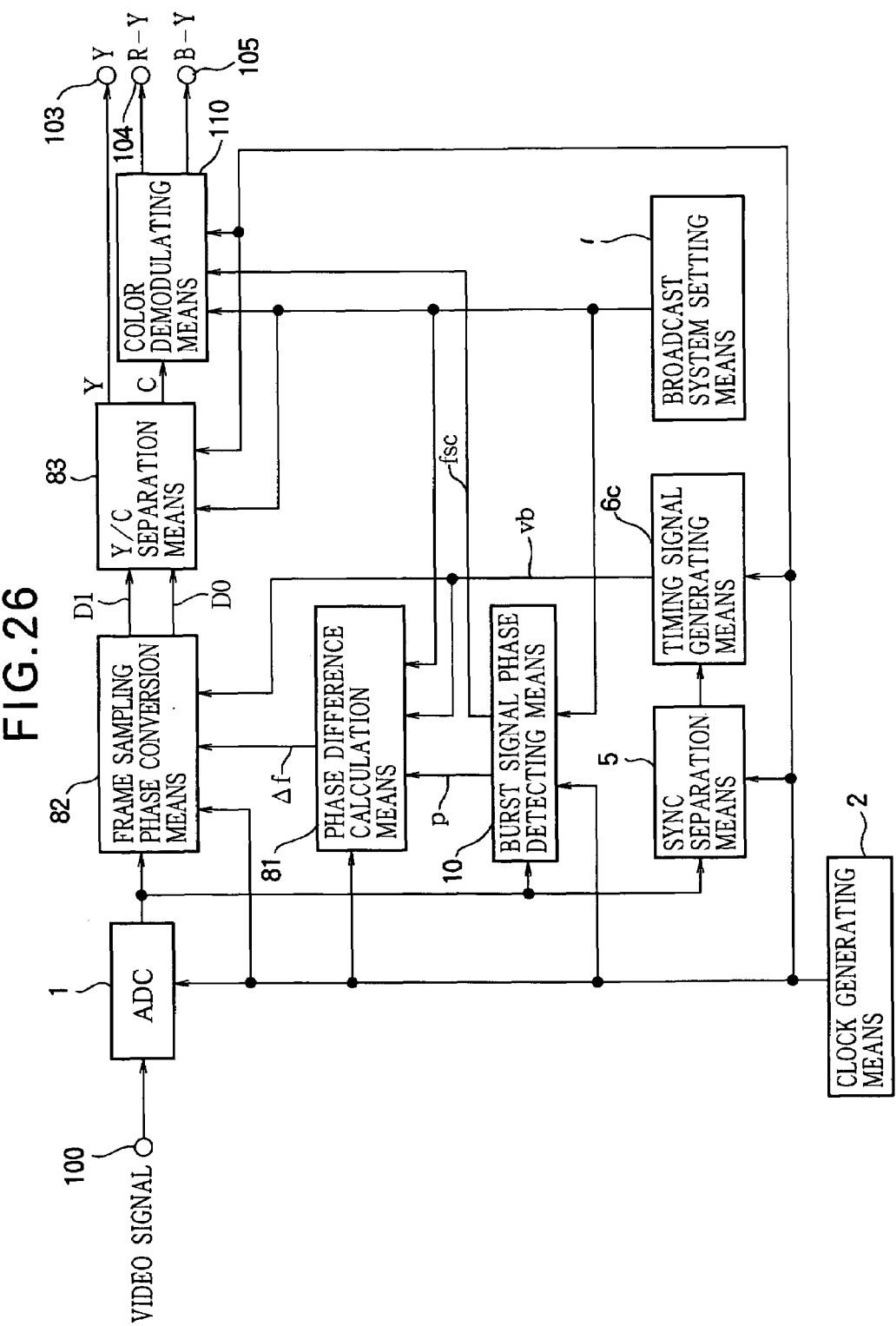
FIG. 26 is a block diagram showing an example of the structure of a video signal processing circuit according to a sixth embodiment of the invention.

FIG. 26 is a block diagram showing an example of the structure of a video signal processing circuit according to the sixth embodiment of the invention, denoting elements identical to elements shown in FIG. 18 or 20 by the same reference numerals. As shown in FIG. 26, the video signal processing circuit comprises an A/D conversion means 1, a clock generating means 2, a sync separation means 5, a timing signal generating means 6c, a broadcast system setting means 7, a burst signal phase detecting means 10, a phase difference calculation means 81, a frame sampling phase conversion means 82, a Y/C separation means 83, an input terminal 100, output terminals 103, 104, 105, and a color demodulating means 110.

The video signal processing circuit of the sixth embodiment differs from the video signal processing circuit of the fourth embodiment (see FIG. 18) in that the phase difference calculation means 4 is replaced by the phase difference calculation means 81, the timing signal generating means 6 is replaced by the timing signal generating means 6c, the sampling phase conversion means 8 is replaced by the frame sampling phase conversion means 82, and the Y/C separation means 9 is replaced by the Y/C separation means 83.

The video signal processing circuit of the sixth embodiment differs from the video signal processing circuit of the fifth embodiment (see FIG. 20) in that the color demodulating means 110 is provided, and the burst phase detecting means 3 is replaced by the burst signal phase detecting means 10.

In the video signal processing circuit of the sixth embodiment, the configuration and operation of the burst signal phase detecting means 10 and the color demodulating means 110 are the same as in the fourth embodiment, and the configuration and operation of the other parts are the same as in the fifth embodiment.

According to the sixth embodiment, the phase difference calculation means 81 calculates a frame-to-frame phase error from the color subcarrier phase information in a composite signal for any of a plurality of television broadcast systems or for a non-standard signal; a phase correction is obtained to provide a frame-to-frame color subcarrier phase difference of 180°; and Y/C separation is carried out after the sampling phase of the composite signal is corrected by sampling phase conversion. Accordingly, excellent three-dimensional Y/C separation is carried out, regardless of the frame-to-frame phase relationship, even with a non-standard signal, and degradation of picture quality after Y/C separation can be prevented. The color subcarrier phase information is obtained from the burst signal phase detection means that generates a color reference signal for color demodulation, so that excellent Y/C separation is carried out without any great increase in the size of the circuitry, and degradation of picture quality after Y/C separation can be prevented.

Seventh Embodiment

In the first to third embodiments and the fifth embodiment, a composite signal is input; excellent two-dimensional or three-dimensional Y/C separation is carried out, regardless of the line-to-line or frame-to-frame phase relationship, even with a non-standard signal; and Y and C signals are obtained. In the seventh embodiment, a video signal display device receives a composite video signal and, after Y/C separation, displays the Y and C signals.

Figure 27:
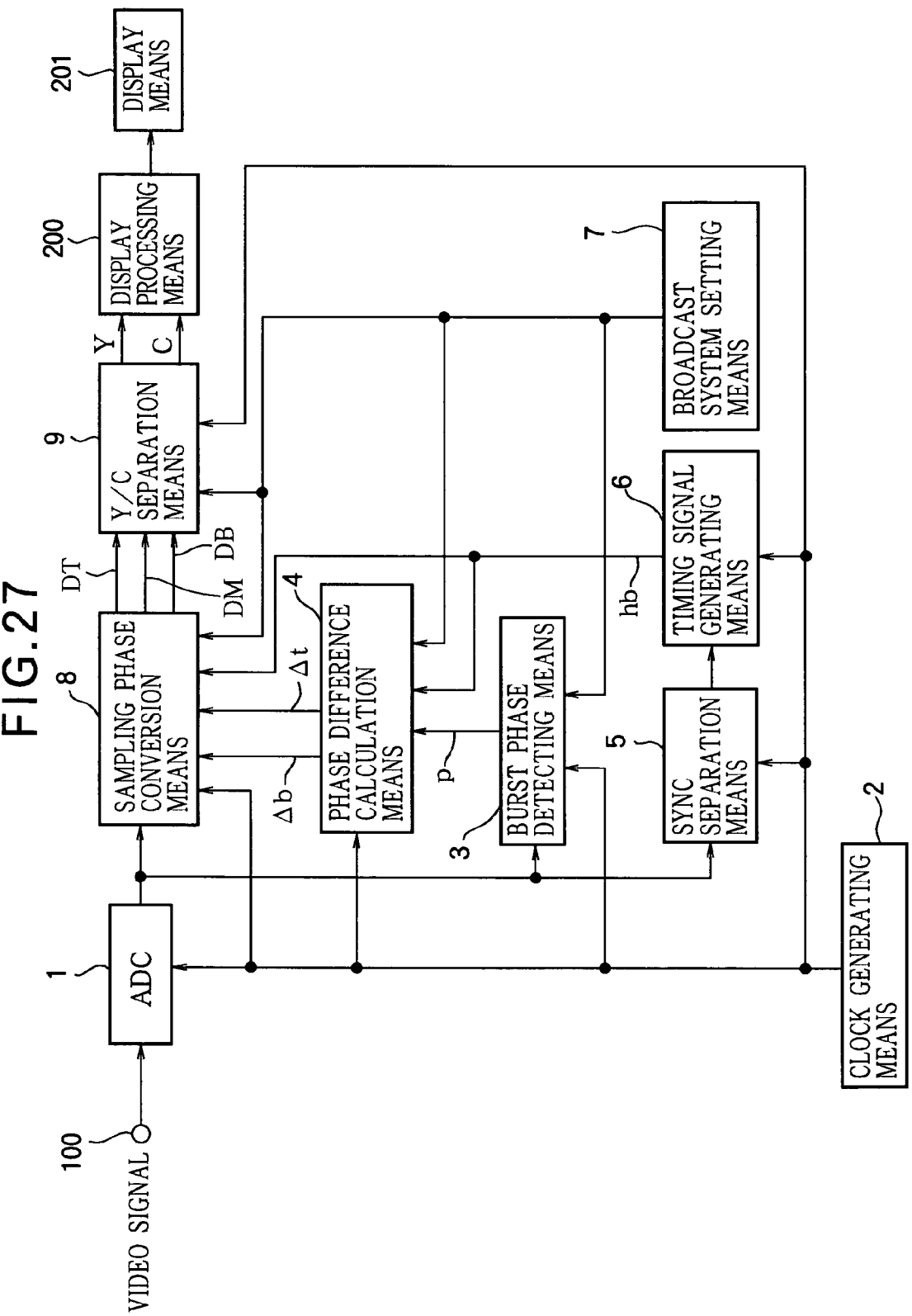
FIG. 27 is a block diagram showing an example of the structure of a video signal display device according to a seventh embodiment of the invention.

FIG. 27 is a block diagram showing an example of the structure of the video signal display device of the seventh embodiment, based the first embodiment shown in FIG. 1, denoting elements identical to elements in FIG. 1 by the same reference numerals. As shown in FIG. 27, the video signal display apparatus of the seventh embodiment comprises an A/D conversion means 1, a clock generating means 2, a burst phase detecting means 3, a phase difference calculation means 4, a sync separation means 5, a timing signal generating means 6, a broadcast system setting means 7, a sampling phase conversion means 8, a Y/C separation means 9, a display processing means 200, and a display means 201.

Video signal display devices for displaying signals from television broadcast systems, VTRs, DVDs, video games, and the like generally have an input terminal for a composite signal; the input composite signal is converted to a digital signal; Y/C separation is performed; and the resulting Y and C signals are processed and displayed as an image. The video signal display device of the seventh embodiment differs from the video signal processing circuit of the first embodiment (see FIG. 1) in that a display processing means 200 and a display means 201 for processing the Y and C signals output from the Y/C separation means 9 are provided to display a video image, following Y/C separation. The configuration and operation of the parts other than the display processing means 200 and display means 201 are the same as in the first embodiment described above.

Display Processing Means 200

The display processing means 200 receives the Y and C signals separated by the Y/C separation means 9, obtains R-Y and B-Y color difference signals through color demodulation of the C signal in accordance with the Y and C signals, converts the color difference signals to, for example, red, green, and blue (RGB) signals, performs further signal processing, such as scaling processing, to convert these signals to display signals, and outputs the display signals to the display means 201.

Display Means 201

The display means 201 displays the signals output from the display processing means 200. A video image based on the Y and C signals separated by the Y/C separation means 9 is thereby displayed.

According to the seventh embodiment, the sampling phase of the composite signal for any of a plurality of television broadcast systems or for a non-standard signal is corrected through sampling phase conversion, then Y/C separation is carried out. Excellent Y/C separation is carried out, regardless of the line-to-line phase relationship, even with a non-standard signal, and a video image based on the separated Y and C signals is displayed. Accordingly, a superior video image is displayed, without luminance-chrominance crosstalk, dot crawl, and other types of picture quality degradation.

Figure 28:
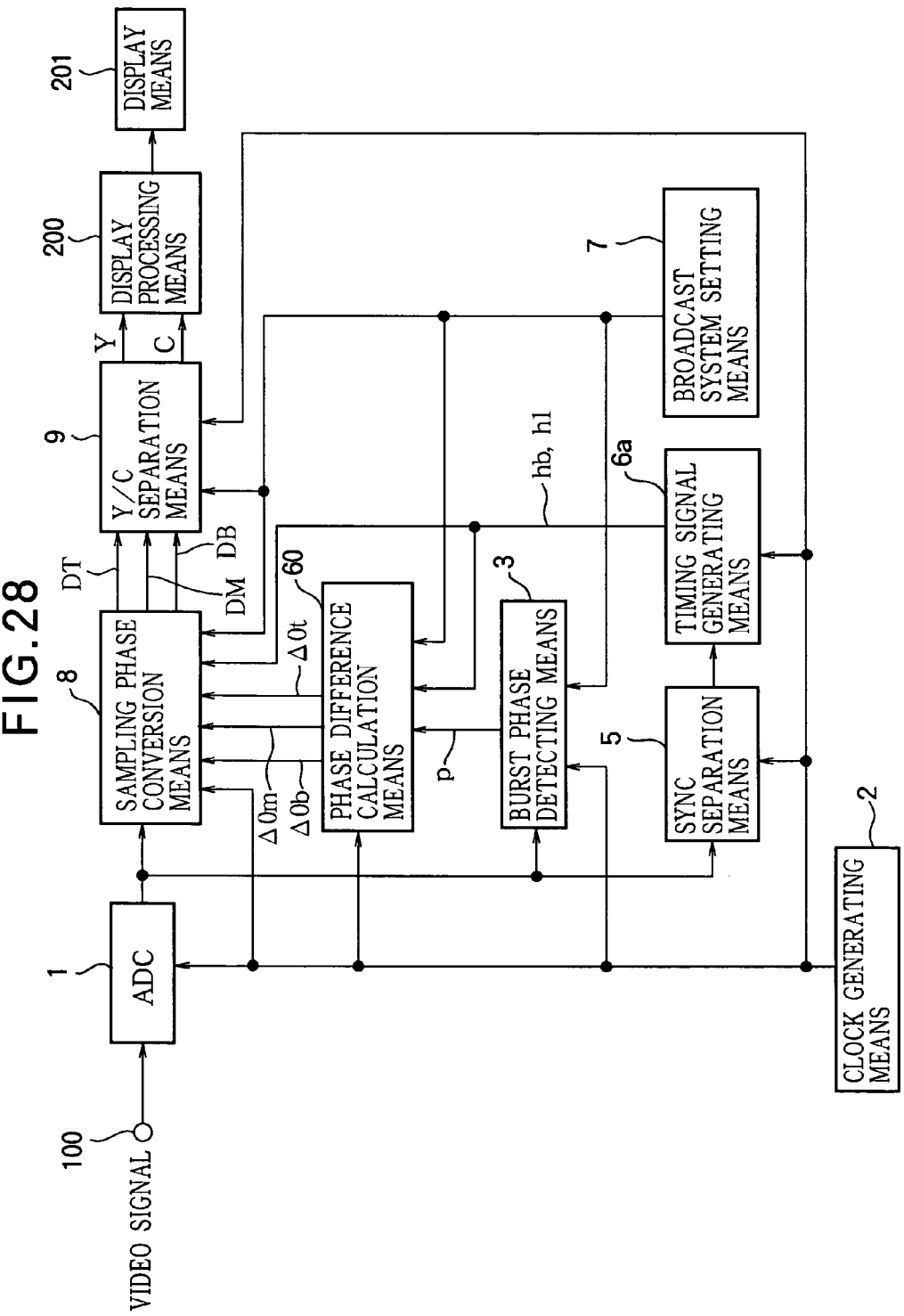
FIG. 28 is a block diagram showing another example of the structure of the video signal display device according to the seventh embodiment of the invention.
Figure 29:
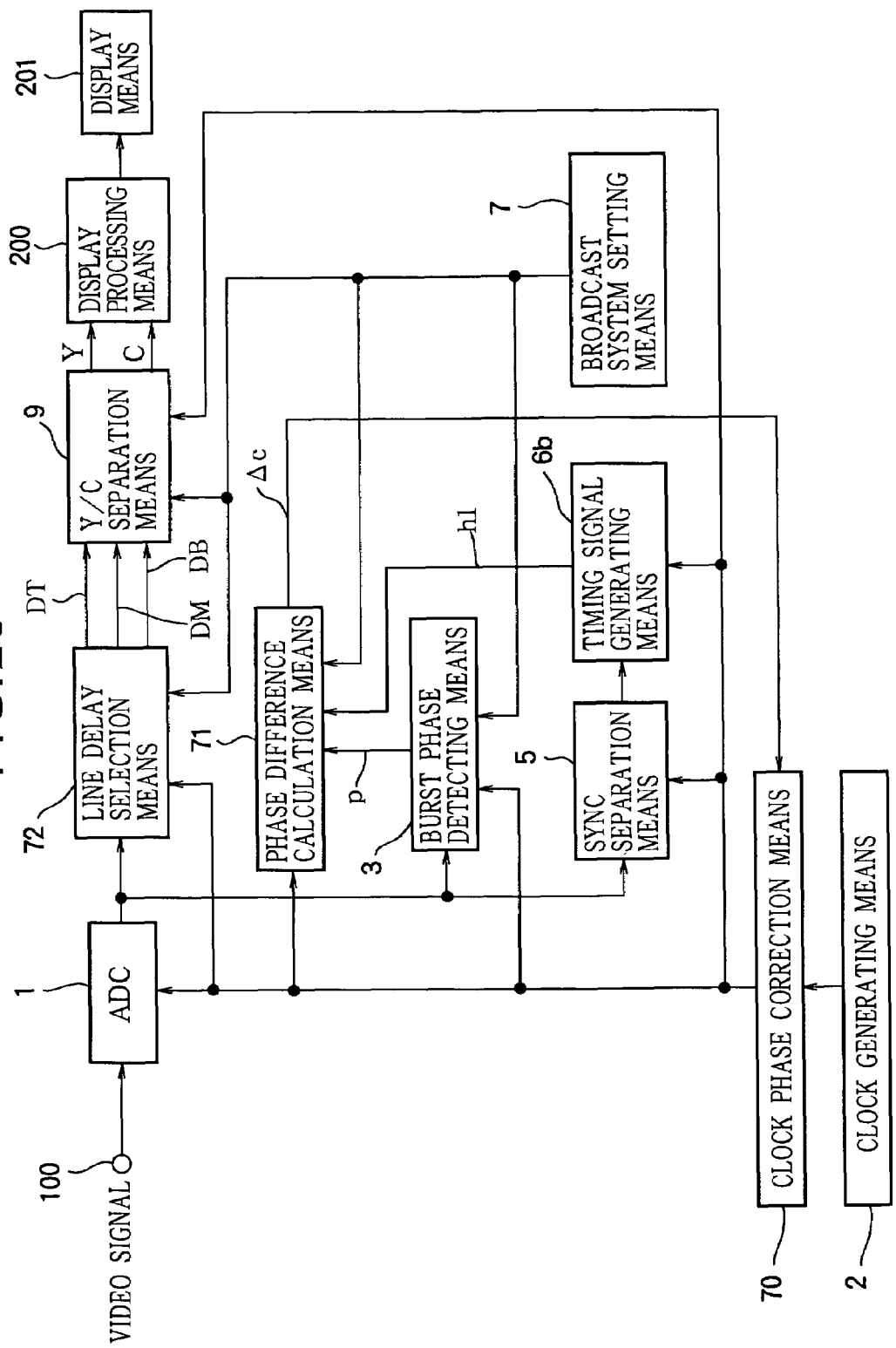
FIG. 29 is a block diagram showing yet another example of the structure of the video signal display device according to the seventh embodiment of the invention.
Figure 30:
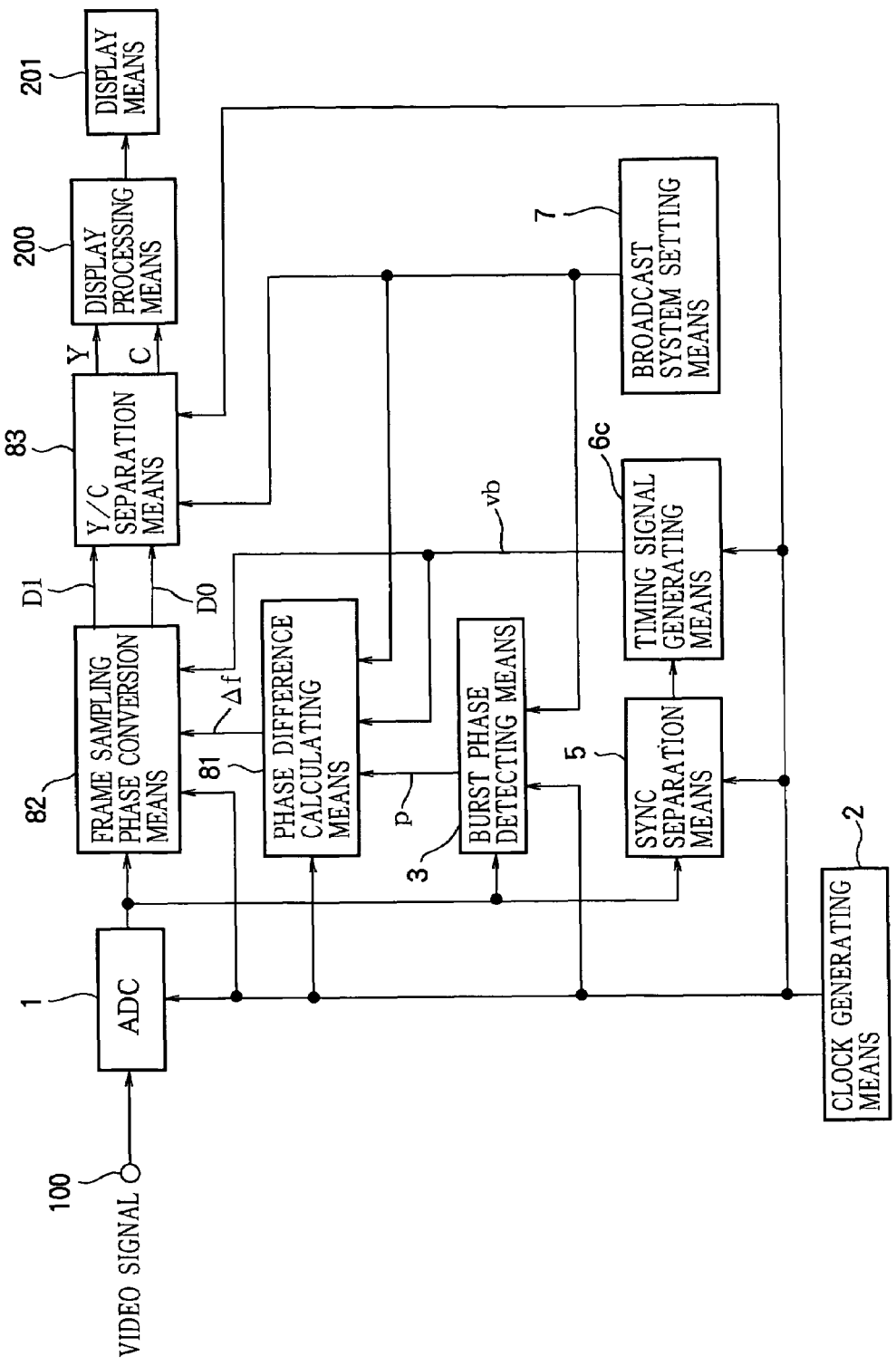
FIG. 30 is a block diagram showing still another example of the structure of the video signal display device according to the seventh embodiment of the invention.

The seventh embodiment as described above differs from the first embodiment in that the display processing means 200 and display means 201 are provided to display the output from the Y/C separation means 9, but the same effect is produced if the display processing means 200 and display means 201 are added to the second embodiment, as shown in FIG. 28, or to the third embodiment, as shown in FIG. 29, or if the display processing means 200 and display means 201 are provided following the Y/C separation means 83 in the fifth embodiment, as shown in FIG. 30.

Eighth Embodiment

In the fourth and sixth embodiments, a composite signal is input; excellent two-dimensional or three-dimensional Y/C separation is performed, regardless of the line-to-line or frame-to-frame phase relationship, even with a non-standard signal, and Y and C signals are obtained from the input composite signal; after color demodulation, a set of signals including the Y signal and R-Y and B-Y signals is obtained. In the eighth embodiment, a video signal display device receives an input composite signal and displays the Y signal and the R-Y and B-Y signals resulting from Y/C separation and color demodulation.

Figure 31:
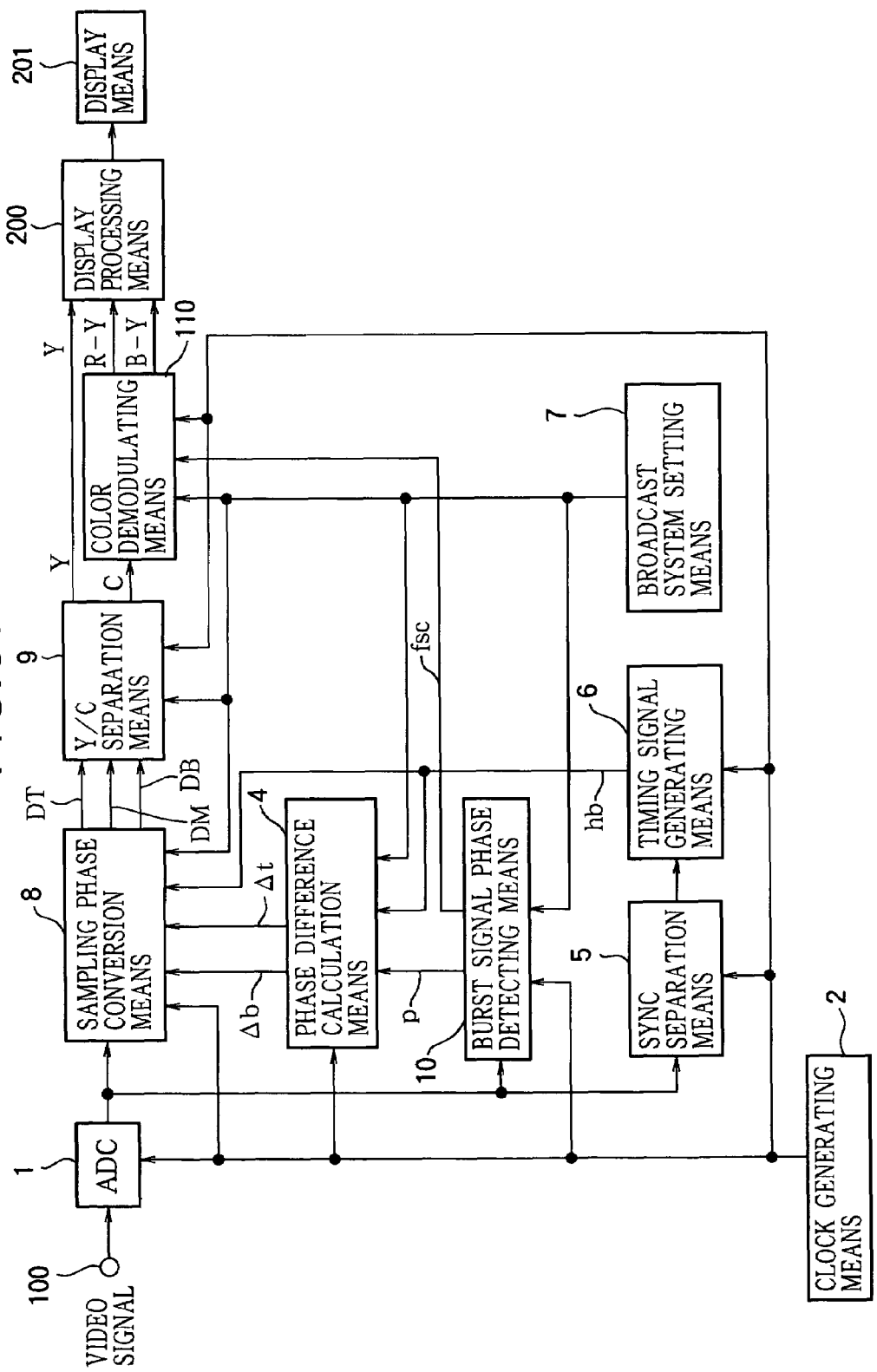
FIG. 31 is a block diagram showing an example of the structure of a video signal display device according to an eighth embodiment of the invention.

FIG. 31 is a block diagram showing an example of the structure of the video signal display device of the eighth embodiment, based on the fourth embodiment shown in FIG. 18, denoting elements identical to elements shown in FIG. 18 by the same reference numerals. As shown in FIG. 31, the video signal display device according to the eighth embodiment comprises an A/D conversion means 1, a clock generating means 2, a phase difference calculation means 4, a sync separation means 5, a timing signal generating means 6, a broadcast system setting means 7, a sampling phase conversion means 8, a Y/C separation means 9, a burst signal phase detecting means 10, a color demodulating means 110, a display processing means 202, and a display means 201.

Video signal display devices for displaying signals from television broadcast systems, VTRs, DVDs, video games, and the like generally have an input terminal for a composite signal; the input composite signal is converted to a digital signal; Y/C separation and color demodulation are carried out; and the resulting Y, R-Y, and B-Y signals are displayed as an image. The video signal display device of the eighth embodiment differs from the video signal processing circuit of the fourth embodiment (see FIG. 18) in that the display processing means 202 for processing the Y signal output from the Y/C separation means 9 and the R-Y and B-Y signals output from the color demodulating means 110 and the display means 201 are provided to display a video image following Y/C separation and color demodulation. The configuration and operation of the parts other than the display processing means 202 and display means 201 are the same as in the fourth embodiment, and the configuration and operation of the display means 201 are the same as in the seventh embodiment described above.

Display Processing Means 202

The display processing means 202 receives the Y signal separated by the Y/C separation means 9 and the R-Y and B-Y signals output from the color demodulating means 110, converts the Y, R-Y, and B-Y signals to RGB signals, for example, performs further signal processing, such as scaling processing, to convert these signals to display signals, and outputs the display signals to the display means 201. The display means 201 displays the display signals from the display processing means 202. A video image based on the Y signal separated by the Y/C separation means 9 and the R-Y and B-Y signals output from the color demodulating means 110 is thereby displayed.

According to the eighth embodiment, the sampling phase of the composite signal for any of a plurality of television broadcast systems or for a non-standard signal is corrected through sampling phase conversion, then Y/C separation is carried out. Excellent Y/C separation is carried out, regardless of the line-to-line phase relationship, even with a non-standard signal, and a video image based on the Y, R-Y, and B-Y signals is displayed. Accordingly, a superior video image is displayed, without luminance-chrominance crosstalk, dot crawl, and other types of picture quality degradation.

Figure 32:
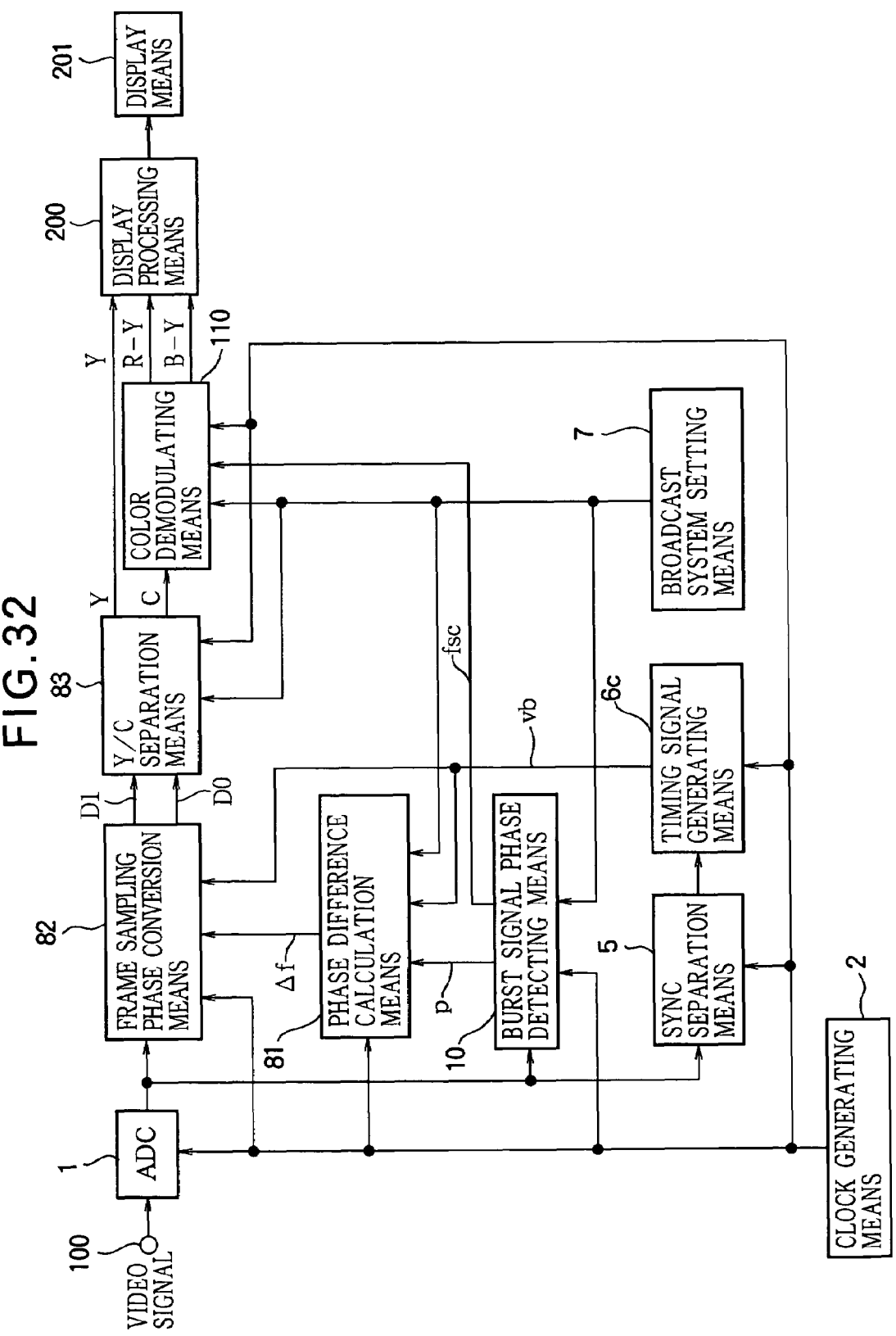
FIG. 32 is a block diagram showing another example of the structure of the video signal display device according to the eighth embodiment of the invention.

The eighth embodiment described above differs from the fourth embodiment in that the display processing means 202 and display means 201 are provided to display the output from the Y/C separation means 9 and color demodulating means 110, but the same effect is produced if the display processing means 202 and display means 201 are provided following the Y/C separation means 83 and color demodulating means 110 of the sixth embodiment, as shown in FIG. 32.

Ninth Embodiment

In the first to third embodiments and the fifth embodiment, a composite signal is input; excellent two-dimensional or three-dimensional Y/C separation is performed, regardless of the line-to-line or frame-to-frame phase relationship, even with a non-standard signal; and Y and C signals are obtained. In the ninth embodiment, a video signal recording device receives an input composite signal and records a video signal based on the Y and C signals resulting from Y/C separation.

Figure 33:
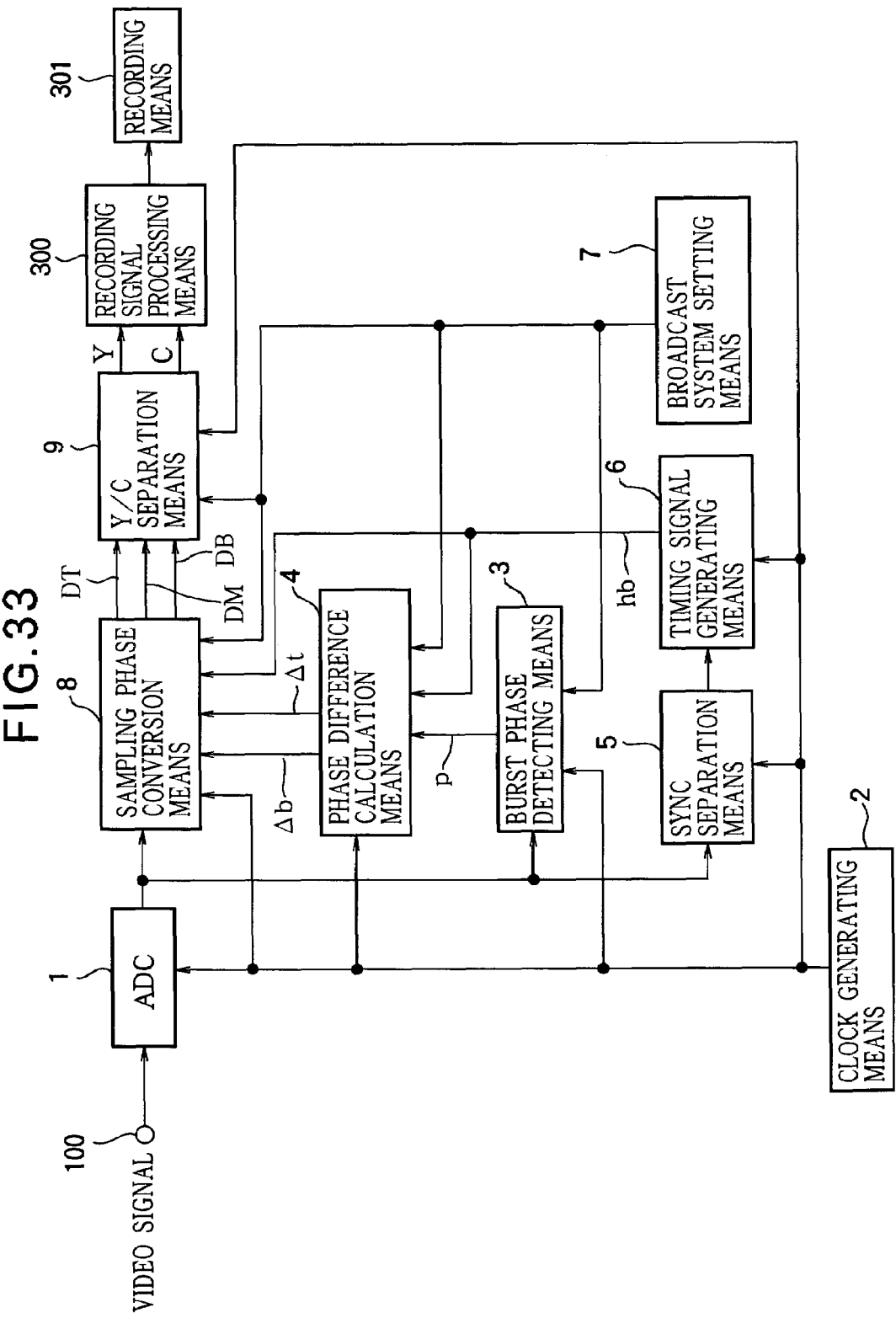
FIG. 33 is a block diagram showing an example of the structure of a video signal recording device according to a ninth embodiment of the invention.

FIG. 33 is a block diagram showing an example of the structure of the video signal recording device of the ninth embodiment, based on the first embodiment shown in FIG. 1, denoting elements identical to elements in FIG. 1 by the same reference numerals. As shown in FIG. 33, the video signal recording device according to the ninth embodiment comprises an A/D conversion means 1, a clock generating means 2, a burst phase detecting means 3, a phase difference calculation means 4, a sync separation means 5, a timing signal generating means 6, a broadcast system setting means 7, a sampling phase conversion means 8, a Y/C separation means 9, a recording signal processing means 300, and a recording means 301.

Video signal recording devices for recording signals from television broadcast systems, VTRs, DVDs, video games, and the like generally have an input terminal for a composite signal; the input composite signal is converted to a digital signal; Y/C separation is performed; and the resulting Y and C signals are processed and recorded as an image. The video signal recording device of the ninth embodiment adds to the video signal processing circuit of the first embodiment (see FIG. 1) further circuitry to record the signals after Y/C separation, the added circuitry comprising the recording signal processing means 300 for processing the Y and C signals output from the Y/C separation means 9, and the recording means 301. The configuration and operation of the parts other than the recording signal processing means 300 and recording means 301 are the same as in the first embodiment.

Recording Signal Processing Means 300

The recording signal processing means 300 receives the Y and C signals separated by the Y/C separation means 9; converts them to RGB signals or to Y, R-Y, and B-Y signals, for example; performs signal processing necessary for recording, including an encoding process such as MPEG2 image compression and a recording modulation process; and outputs a recording signal to the recording means 301.

Recording Means 301

The recording means 301 records the recording signal from the recording signal processing means 300 in a video tape cassette, DVD, hard disk, or other recording media. A video signal based on the Y and C signals separated by the Y/C separation means 9 is recorded on the recording medium.

According to the ninth embodiment, the sampling phase of the composite signal for any of a plurality of television broadcast systems or for a non-standard signal is corrected through sampling phase conversion, then Y/C separation is carried out. Excellent Y/C separation is carried out, regardless of the line-to-line phase relationship, even with a non-standard signal, and a video signal based on the resulting Y and C signals is recorded. Accordingly, a good video signal can be recorded without picture degradation such as luminance-chrominance crosstalk and dot crawl.

Figure 34:
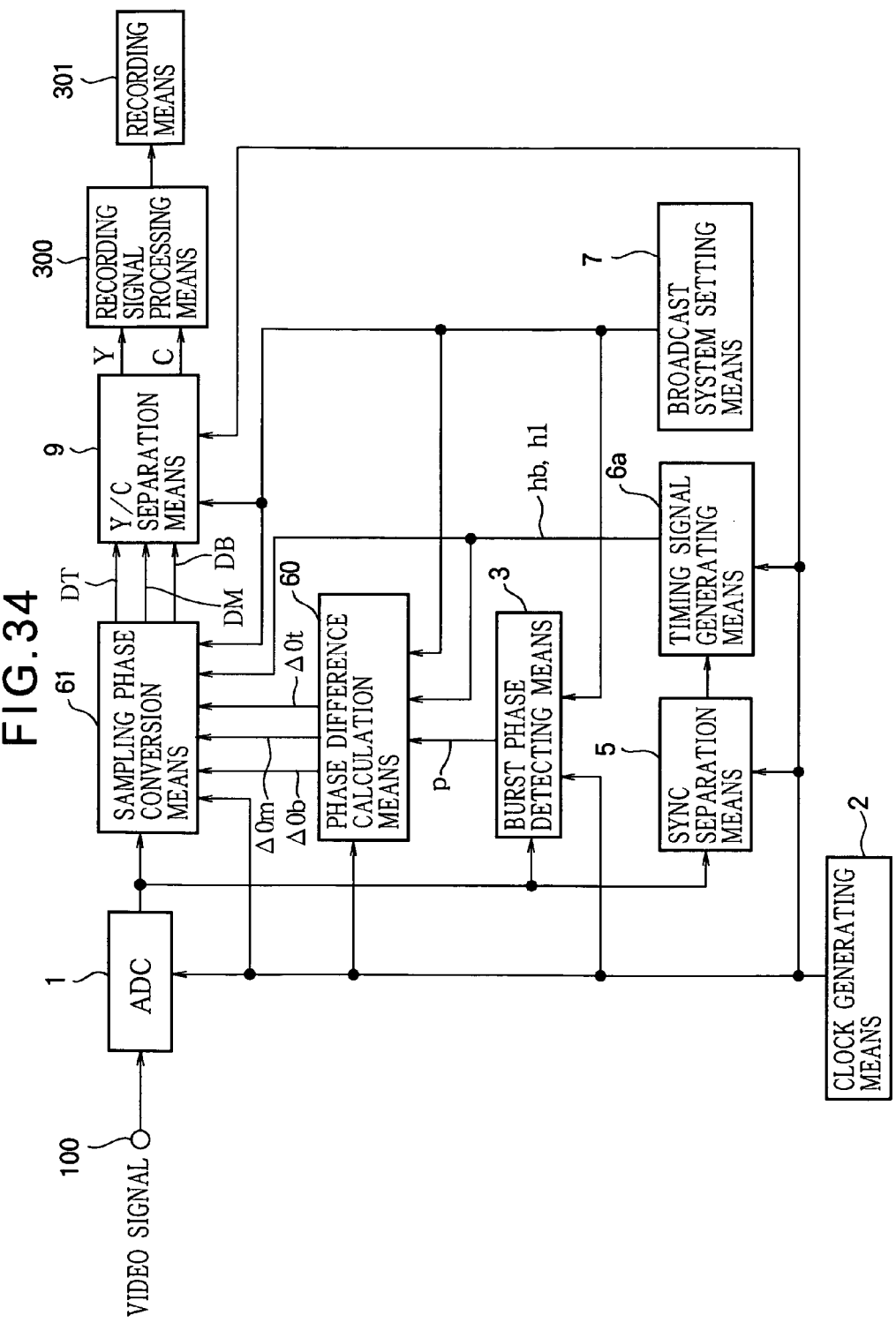
FIG. 34 is a block diagram showing another example of the structure of the video signal recording device according to the ninth embodiment of the invention.
Figure 35:
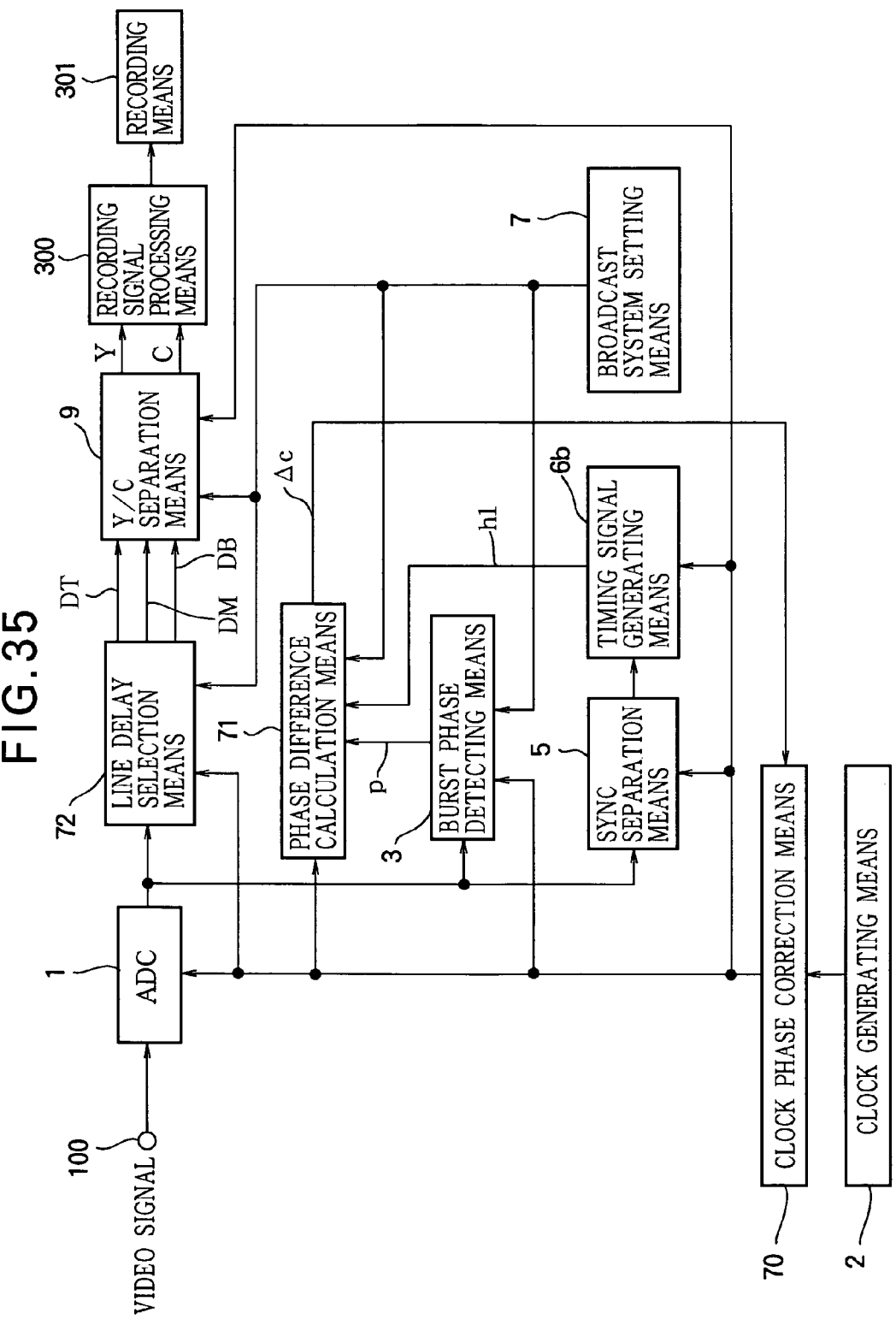
FIG. 35 is a block diagram showing yet another example of the structure of the video signal recording device according to the ninth embodiment of the invention.
Figure 36:
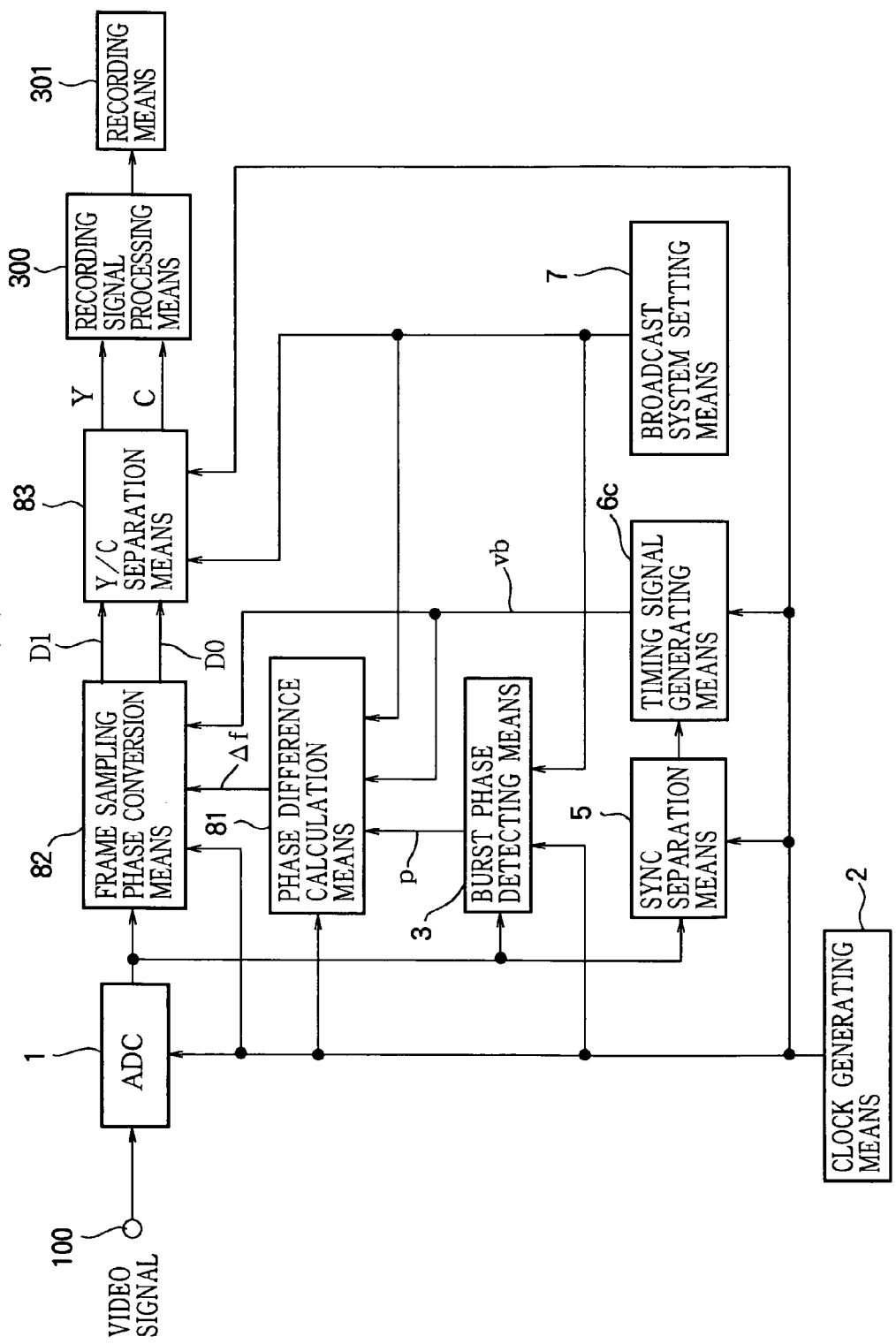
FIG. 36 is a block diagram showing still another example of the structure of the video signal recording device according to the ninth embodiment of the invention.

The ninth embodiment as described above adds the recording signal processing means 300 and recording means 301 to the first embodiment to record the output from the Y/C separation means 9, but the same effect is produced if the recording signal processing means 300 and recording means 301 are added to the second embodiment, as shown in FIG. 34, or to the third embodiment, as shown in FIG. 35, or if the recording signal processing means 300 and recording means 301 are provided following the Y/C separation means 83 of the fifth embodiment, as shown in FIG. 36.

Tenth Embodiment

In the fourth and sixth embodiments, a composite signal is input; excellent two-dimensional or three-dimensional Y/C separation is performed, regardless of the line-to-line or frame-to-frame phase relationship, even with a non-standard signal; and after color demodulation, a Y signal and R-Y and B-Y signals are obtained. In the tenth embodiment, a video signal recording device receives an input composite signal and records a video signal based on the Y, R-Y, and B-Y signals after Y/C separation and color demodulation.

Figure 37:
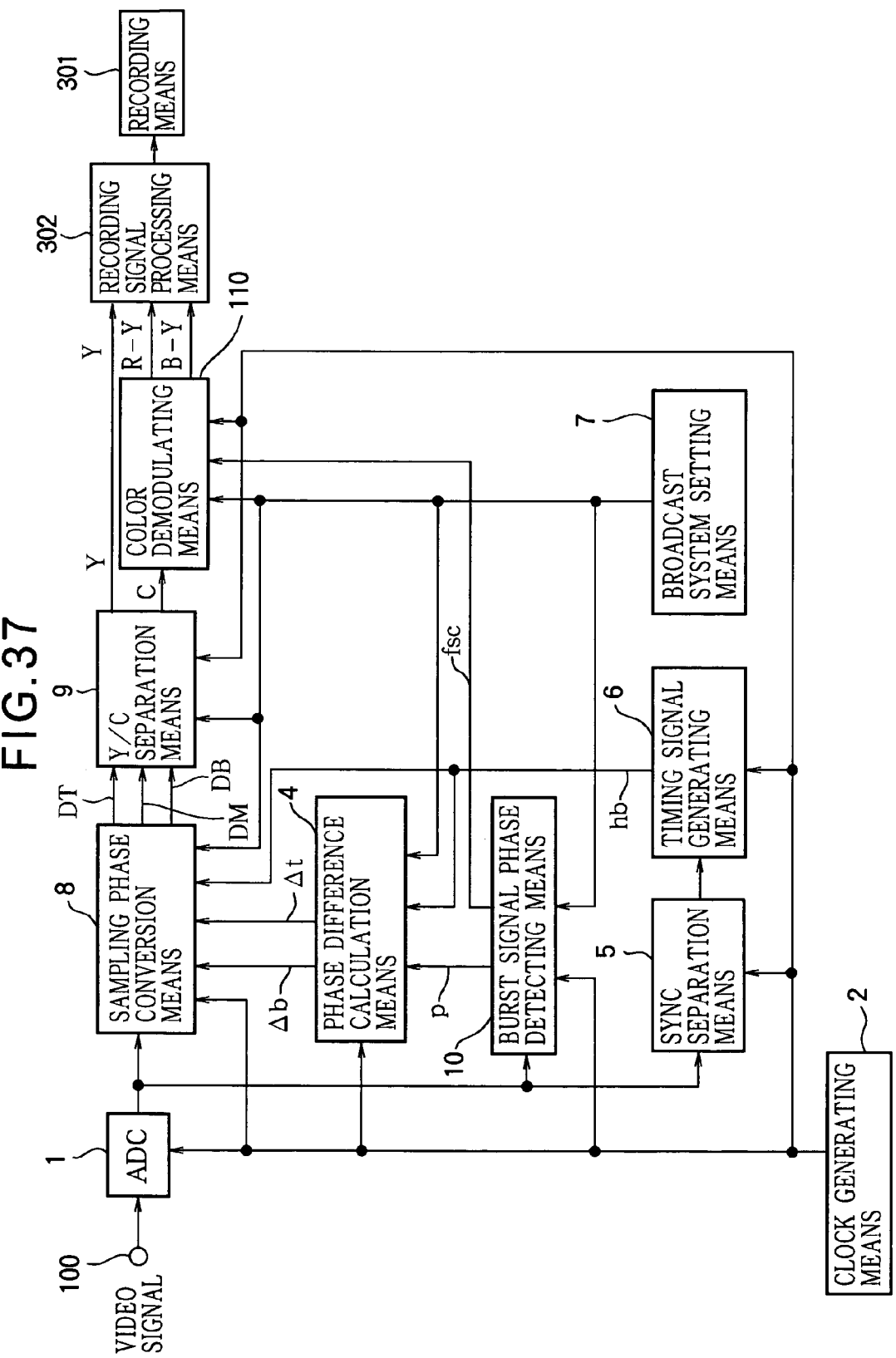
FIG. 37 is a block diagram showing an example of the structure of a video signal recording device according to a tenth embodiment of the invention.

FIG. 37 is a block diagram showing an example of the structure of the video signal recording device of the tenth embodiment, based on the fourth embodiment shown in FIG. 18, denoting elements identical to elements shown in FIG. 18 by the same reference numerals. As shown in FIG. 37, the video signal recording device according to the tenth embodiment comprises an A/D conversion means 1, a clock generating means 2, a phase difference calculation means 4, a sync separation means 5, a timing signal generating means 6, a broadcast system setting means 7, a sampling phase conversion means 8, a Y/C separation means 9, a burst signal phase detecting means 10, a color demodulating means 110, a recording signal processing means 302, and a recording means 301.

Video signal recording devices for recording signals from television broadcast systems, VTRs, DVDs, video games, and the like generally have an input terminal for a composite signal; the input composite signal is converted to a digital signal; Y/C separation and color demodulation are performed; and Y, R-Y, and B-Y signals are recorded as an image. The video signal recording device of the tenth embodiment adds to the video signal processing circuit of the fourth embodiment (see FIG. 18) further circuitry to record the signals after Y/C separation and color demodulation, the added circuitry being the recording signal processing means 302 for processing the Y signal output from the Y/C separation means 9 and the R-Y and B-Y signals output from the color demodulating means 110, and the recording means 301. The configuration and operation of the parts other than the recording means 301 and recording signal processing means 302 are the same as in the fourth embodiment, and the configuration and operation of the recording means 301 are the same as in the ninth embodiment.

Recording Signal Processing Means 302

The recording signal processing means 302 receives a Y signal separated by the Y/C separation means 9 and R-Y and B-Y signals output from the color demodulating means 110, performs signal processing necessary for recording, including an encoding process such as MPEG2 image compression and a recording modulation process, in accordance with the Y, R-Y, and B-Y signals; and outputs a recording signal to the recording means 301. The recording means 301 records the recording signal from the recording signal processing means 302 on a recording medium.

According to the tenth embodiment, the sampling phase of the composite signal for any of a plurality of television broadcast systems or for a non-standard signal is corrected through sampling phase conversion, then Y/C separation is carried out. Excellent Y/C separation is carried out, regardless of the line-to-line phase relationship, even with a non-standard signal, and a video signal based on the resulting Y, R-Y, and B-Y signals is recorded. Accordingly, a good video signal can be recorded without picture degradation such as luminance-chrominance crosstalk and dot crawl.

Figure 38:
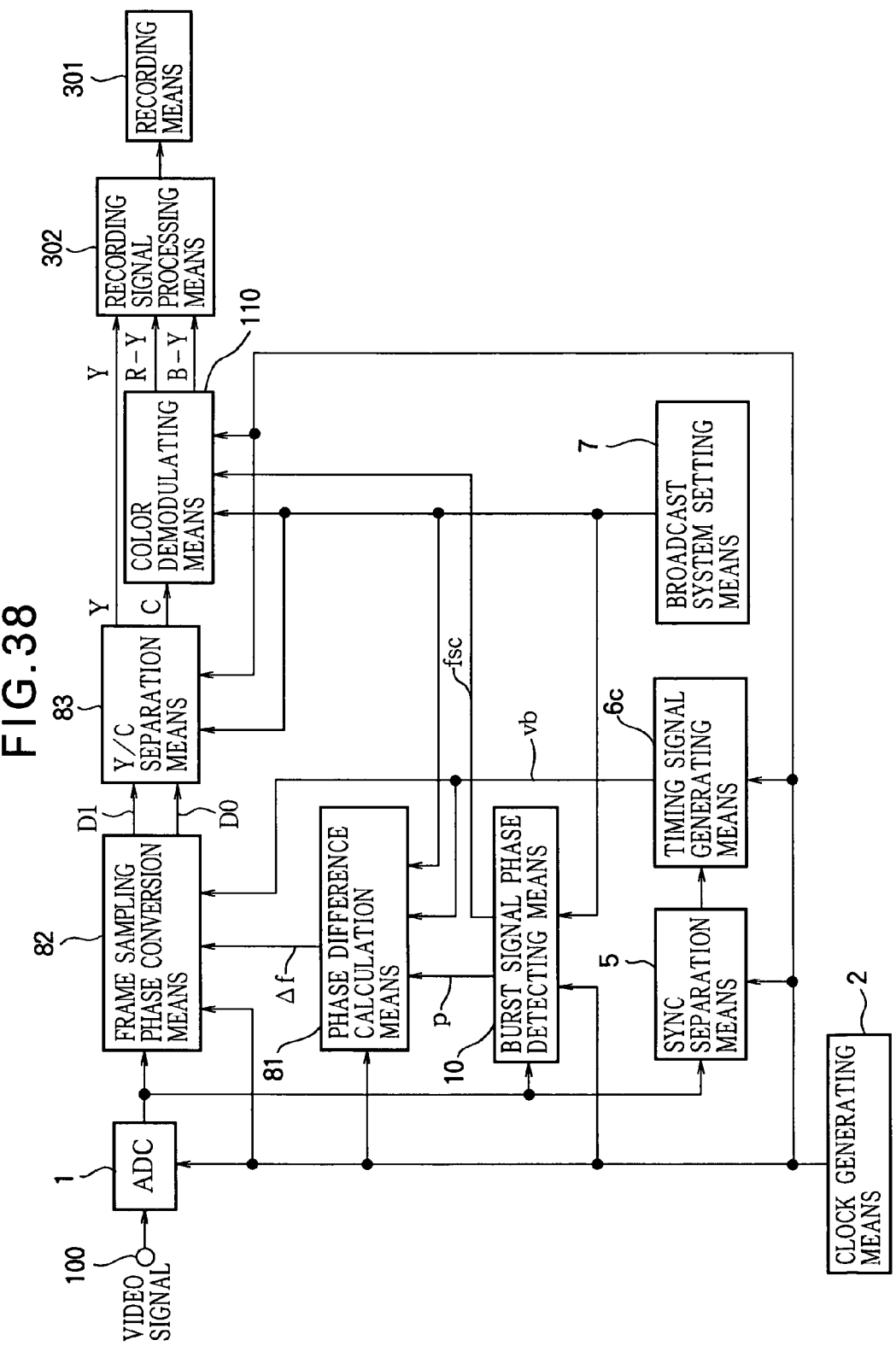
FIG. 38 is a block diagram showing another example of the structure of the video signal recording device according to the tenth embodiment of the invention.

The tenth embodiment as described above adds the recording signal processing means 302 and recording means 301 to the fourth embodiment to record outputs from the Y/C separation means 9 and color demodulating means 110, but the same effect is produced if the recording signal processing means 302 and recording means 301 are added after the Y/C separation means 83 and color demodulating means 110 of the sixth embodiment, as shown in FIG. 38.

What is claimed is:

1. A video signal processing circuit that samples an analog composite video signal, converts the composite video signal to a digital signal, and processes the composite video signal by using a prescribed clock signal, comprising:

a clock generating means generating the prescribed clock signal;

a phase detecting means detecting color subcarrier phase information in each line of the composite video signal;

a phase difference calculation means calculating a phase difference between phase information obtained from the phase detecting means and a prescribed reference phase, calculating a phase correction from the phase difference, and outputting the phase correction, said phase difference calculation means including a delaying means applying a delay of a prescribed number of lines or fields to the phase information from the phase detecting means;

a sampling phase conversion means correcting the phase at which the composite video signal is sampled according to the phase correction output from the phase difference calculation means; and a luminance/chrominance (Y/C) separation means separating a luminance signal and a chrominance signal from the composite video signal output from the sampling phase conversion means.

2. The video signal processing circuit of claim 1, wherein the phase detecting means, detects a burst phase in each line of the composite video signal and outputs the burst phase as the color subcarrier phase information of the line.

3. The video signal processing circuit of claim 1, further comprising a color demodulating means demodulating the chrominance signal separated by the Y/C separation means according to a color subcarrier reference signal to obtain color difference signals, wherein:
the phase detecting means detects the burst phase in each line of the composite video signal, outputs the burst phase as the color subcarrier phase information of the line, and generates the color subcarrier reference signal according to the detected burst phase.

4. The video signal processing circuit of claim 1, wherein the prescribed reference phase is the reference phase of a target line determined by a prescribed fixed phase value and the phase information of the target line; and
the phase difference calculation means calculates a phase difference between the phase information of a certain line and the reference phase of the target line, the certain line being separated by the prescribed number of lines or fields from the target line.

5. The video signal processing circuit of claim 4, wherein the phase difference calculation means further comprises:
a phase error calculation means obtaining a phase difference between the phase information of the certain line and the reference phase of the target line, including phase information of the target line, as a phase error; and
a correction conversion means converting the phase error to a phase correction with reference to one period of the clock generated by the clock generating means.

6. The video signal processing circuit of claim 1, wherein the prescribed reference phase includes a fixed phase value predetermined by the line position of the composite video signal; and
the phase difference calculation means calculates a phase difference between the phase information and the fixed reference phase.

7. The video signal processing circuit of claim 6, wherein the phase difference calculation means further comprises:
a phase error calculation means obtaining both a phase difference between the phase information of the target line and the fixed reference phase and a phase difference between the phase information of the certain line separated by the prescribed number of lines or fields from the target line and the fixed reference phase as phase errors; and
a correction conversion means converting the phase error to a phase correction with reference to one period of the clock.

8. The video signal processing circuit of claim 6, wherein the phase difference calculation means further comprises:
a phase error calculation means obtaining a phase difference between the phase information from the phase detecting means and the fixed reference phase as a phase error; and
a correction conversion means converting the phase error to a phase correction with reference to one period of the clock.

9. The video signal processing circuit of claim 1, wherein the sampling phase conversion means comprises:

a delaying means applying a delay of a prescribed number of lines or fields to the composite video signal; and
a phase correction means correcting the phase at which the composite video signal of a certain line separated by a prescribed lines or fields from the target line, or the composite video signal of the target line and the composite video signal of the prescribed line, is sampled, in accordance with the output from the phase difference calculation means.

10. The video signal processing circuit of claim 9, wherein the phase correction means comprises:
a coefficient generating means generating coefficients of a filter having a group delay corresponding to the output from the phase difference calculation means; and
a filter means performing filtering of the composite video signal in accordance with the coefficients.

11. The video signal processing circuit of claim 9, wherein the phase correction means comprises:
a plurality of delaying means applying a certain delay to the composite video signal; and
a selection means selecting the output of the plurality of delaying means in accordance with the output from the phase difference calculation means.

12. The video signal processing circuit of claim 9, wherein the phase correction means comprises:
a coefficient generating means generating an interpolation filter coefficient for obtaining the value of a point corresponding to a position offset from the sampling position of the composite video signal by the phase difference corresponding to the output of the phase difference calculation means; and
a filter means performing filtering of the composite video signal in accordance with the coefficient.

13. A video signal processing circuit that samples an analog composite video signal, converts the composite video signal to a digital signal, and processes the composite video signal by using a prescribed clock signal, comprising:
a clock generating means generating the prescribed clock signal;
a phase detecting means detecting color subcarrier phase information in each line of the composite video signal;
a phase difference calculation means calculating a phase difference between phase information obtained from the phase detecting means and a prescribed reference phase, calculating a phase correction from the phase difference, and outputting the phase correction;
a sampling phase conversion means correcting the phase at which the composite video signal is sampled according to the phase correction output from the phase difference calculation means;
a luminance/chrominance (Y/C) separation means separating a luminance signal and a chrominance signal from the composite video signal output from the sampling phase conversion means; and
an A/D conversion means converting the input analog composite video signal to a digital composite video signal,
the sampling phase conversion means comprising:
a clock phase correction means correcting the phase of the clock, generated by the clock generating means in accordance with the output from the phase difference calculation means; and
a delaying means applying a delay of a prescribed number of lines or fields to the digitized composite video signal;
wherein the A/D conversion means converts the composite video signal to a digital signal by using a clock with a phase corrected by the clock phase correction means.

14. The video signal processing circuit of claim 1, wherein the Y/C separation means separates the luminance signal and the chrominance signal from the composite video signal by means of a line comb filter or frame comb filter, by using the composite video signal output from the sampling phase conversion means in a plurality of lines.

15. The video signal processing circuit of claim 1, wherein the clock generating means generates a clock signal with a frequency equal to an integer multiple of 13.5 MHz, regardless of the television broadcast system of the composite video signal, for the processing of the composite video signal.

16. The video signal processing circuit of claim 1, wherein the clock generating means generates a burst locked clock in phase with the burst signal in the composite video signal for the processing of the composite video signal.

17. The video signal processing circuit of claim 1, wherein the clock generating means generates a line locked clock in phase with the horizontal sync signal in the composite video signal for the processing of the composite video signal.

18. A video signal processing circuit that samples an analog composite video signal, converts the composite video signal to a digital signal, and processes the composite video signal by using a prescribed clock signal, comprising:

a clock generating means generating the prescribed clock signal;

a phase detecting means detecting color subcarrier phase information in each line of the composite video signal;

a phase difference calculation means calculating a phase difference between phase information obtained from the phase detecting means and a prescribed reference phase, calculating a phase correction from the phase difference, and outputting the phase correction;

a sampling phase conversion means correcting the phase at which the composite video signal is sampled according to the phase correction output from the chase difference calculation means;

a luminance/chrominance (Y/C) separation means separating a luminance signal and a chrominance signal from the composite video signal output from the sampling phase conversion means; and a television broadcast system setting means specifying a broadcast system of the composite video signal, wherein:

the phase detecting means detects a color subcarrier phase in accordance with the broadcast system specified by the television broadcast system setting means;

the phase difference calculation means obtains the phase difference in accordance with the specified television broadcast system; and the Y/C separation means separates the luminance signal and the chrominance signal from the composite video signal in accordance with the specified television broadcast system.

19. A video signal display device comprising the video signal processing circuit of claim 1.

20. A video signal recording device comprising the video signal processing circuit of claim 1.

21. A video signal display device comprising the video signal processing circuit of claim 13.

22. A video signal recording device comprising the video signal processing circuit of claim 13.

23. A video signal display device comprising the video signal processing circuit of claim 18.

24. A video signal recording device comprising the video signal processing circuit of claim 18.

* * * * *